(12) United States Patent
Mosier et al.

(10) Patent No.: US 9,596,301 B2
(45) Date of Patent: Mar. 14, 2017

(54) DISTRIBUTED-LEADER-ELECTION SERVICE FOR A DISTRIBUTED COMPUTER SYSTEM

(75) Inventors: Timothy J. Mosier, Boise, ID (US); Douglas L. Voigt, Boise, ID (US); Michael E. Lutz, Boise, ID (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 968 days.

(21) Appl. No.: 11/523,442

(22) Filed: Sep. 18, 2006

(65) Prior Publication Data

US 2008/0071853 A1   Mar. 20, 2008

(51) Int. Cl.
*G06F 15/16* (2006.01)
*H04L 29/08* (2006.01)

(52) U.S. Cl.
CPC .......... *H04L 67/1095* (2013.01); *H04L 67/34* (2013.01)

(58) Field of Classification Search
CPC .................................................... H04L 67/1095
USPC ................ 709/201, 203, 208, 209, 223, 224
See application file for complete search history.

(56) References Cited

U.S. PATENT DOCUMENTS

| | | | |
|---|---|---|---|
| 7,421,578 B1 * | 9/2008 | Huang et al. | 713/163 |
| 2005/0005200 A1 * | 1/2005 | Matena et al. | 714/38 |
| 2006/0190243 A1 * | 8/2006 | Barkai et al. | 704/8 |
| 2007/0011226 A1 * | 1/2007 | Hinni et al. | 709/203 |

OTHER PUBLICATIONS

Flaviu Cristian et al., "Agreeing on Processor Group Membership in Asynchronous Distributed Systems," Technical Report CSE95-428, UC San Diego, 1995, 77 pages.
Leslie Lamport, "The Part-Time Parliament," May 1998, ACM Transactions on Computer Systems 16.2 (1998): pp. 133-169, <https://people.cs.umass.edu/~arun/cs677/reading/Paxos.pdf>.
Leslie Lamport, "The Part-Time Parliament," Technical Report 49, Systems Research Center, Digital Equipment Corp, Palo Alto, Sep. 1989, 48 pages.
Lorenzo Alvisi, "Leader Election," Sep. 4, 2001, 59 pages, <http://www.cs.utexas.edu/users/lorenzo/corsi/cs380d/past/01F/notes/Leader.ppt>.

(Continued)

*Primary Examiner* — Adnan Mirza
(74) *Attorney, Agent, or Firm* — Olympic Patent Works PLLC

(57) ABSTRACT

Embodiments of the present invention provide methods and systems for leadership allocation in a distributed computer system. In certain embodiments of the present invention, a leader-election-service process runs within each node of a distributed computer system, together cooperatively providing a distributed-leader-election service. The distributed-leader-election service employs a distributed consensus service to manage distributed state information related to roles and leadership allocation within a distributed computer system. Client processes within each node interface with the leader-election-service process of the node in order to assume leadership of particular roles within the distributed computer system. Leadership-allocation management is thus centralized, within each node. In alternative embodiments, the distributed-leader-election service may be implemented as a collection of library routines that run in the context of client processes.

18 Claims, 49 Drawing Sheets

(56) References Cited

OTHER PUBLICATIONS

Massimo Franceschetti et al., "A Leader Election Protocol for Fault Recovery in Asynchronous Fully-Connected Networks," 1998, 18 pages, <http://authors.library.caltech.edu/26050/1/etr024.pdf>.

Navneet Malpani et al., "Leader Election Algorithms for Mobile Ad Hoc Networks," Proceedings of the 4th international workshop on Discrete algorithms and methods for mobile computing and communications, ACM, 2000, Boston, MA, 9 pages.

Scott Stoller, "Leader Election in Distributed Systems with Crash Failures," Technical report, Indiana University, Apr. 1997, 169, 15 pages, <http://www3.cs.stonybrook.edu/~stoller/papers/leader-election.pdf>.

Sudarshan Vasudevan et al. "Design and Analysis of a Leader Election Algorithm for Mobile Ad Hoc Networks," Proceedings of the 12th IEEE International Conference on Network Protocols, 2004, ICNP 2004, 11 pages, <http://www.ieee-icnp.org/2004/papers/9-3.pdf>.

Valerie King et al., "Scalable Leader Election," Jan. 22-26, 2006, SODA '06, Miami, Florida, 10 pages, <http://ce.sharif.edu/~ghodsi/archive/d-papers/ACM%20SODA/2006/Scalable%20Leader%20Election.pdf>.

* cited by examiner

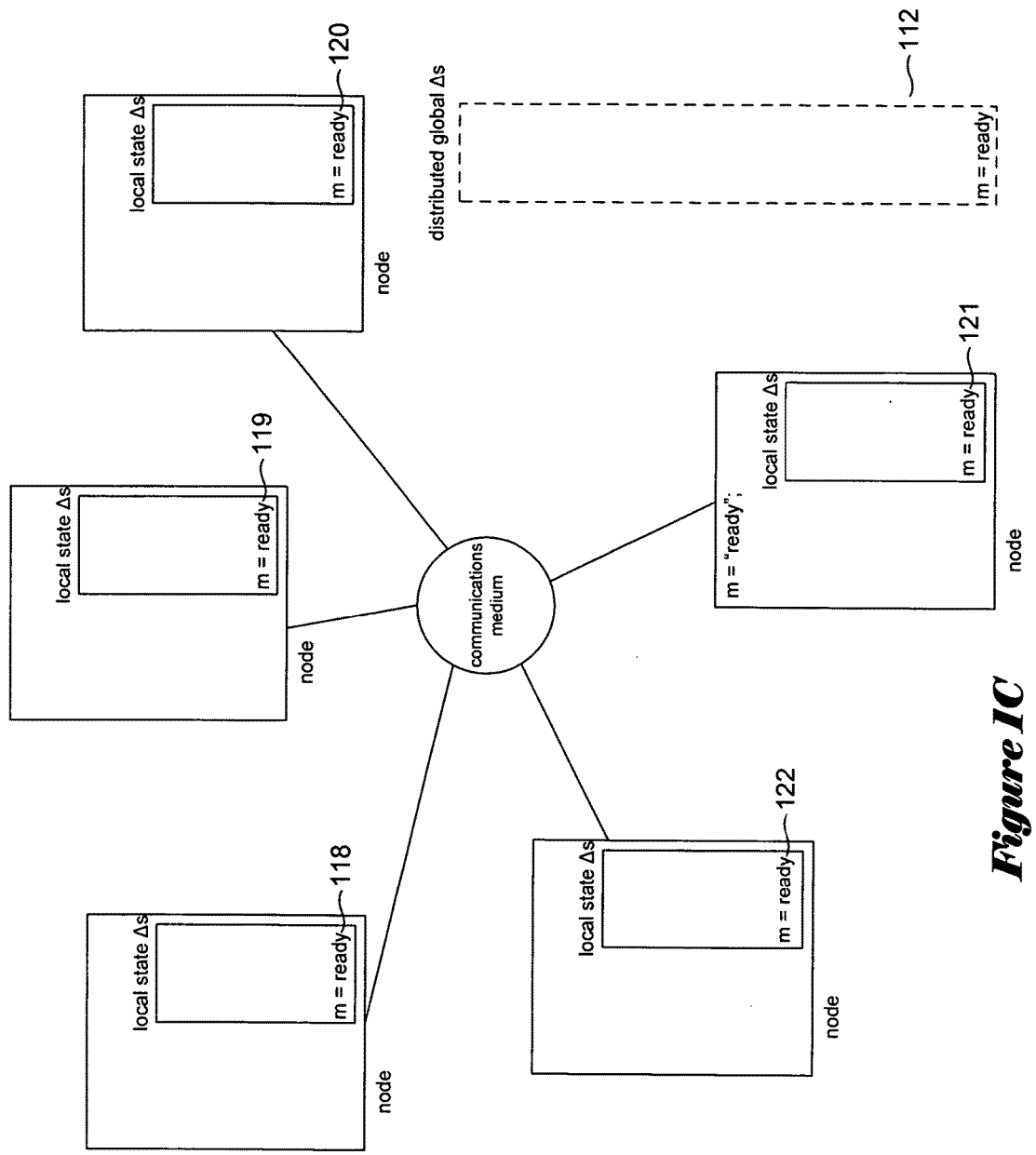

```
1:  procedure read()                                              1104
2:      replies ← majority([Read, val-ts])
3:      if the status in all replies is true then return val
4:      else return recover()

1:  procedure write(val)                                          1108
2:      ts ← new TS()
3:      replies ← majority([Order, ts])
4:      if any status in a reply is false then return NOK
5:      replies ← majority([Write, val, ts])
6:      if the status in all replies is true then return OK
7:      else return NOK 1:  procedure recover()                                           1106
2:      ts ← new TS()
3:      replies ← majority([Order&Read, ts])
4:      if any status in a reply is false then return NIL
5:      val ← the value with highest val-ts from replies
6:      replies ← majority([Write, val, ts])
7:      if the status in all replies is true then return val
8:      else return NIL 1:  procedure majority(msg)                                       1102
2:      Send msg to all, retransmitting periodically
3:      await receive(rep) from ⌈(n+1)/2⌉ processes
4:          such that rep matches msg
5:      return set of received replies read Handler()                                                    1110
1:      when receive [Read, ts] from coordinator
2:          status ← (ts = val-ts and ts ≥ ord-ts)
3:          reply [Read-R, status] to coordinator write Handler ()                                                  1112
1:      when receive [Write, new-val, ts] from coordinator
2:          status ← (ts > val-ts and ts ≥ ord-ts)
3:      if status then
4:          val ← new-val; store(val)
5:          val-ts ← ts; store(val-ts)
6:      reply [Write-R, status] to coordinator order & read Handler ()                                           1114
1:      when receive [Order&Read, ts] from coordinator
2:          status ← (ts > max(val-ts, ord-ts))
3:      if status then ord-ts ← ts; store(ord-ts)
4:      reply [Order&Read-R, val-ts, val, status]

order Handler()                                                   1116
1:      when receive [Order, ts] from coordinator
2:          status ← (ts > max(val-ts, ord-ts))
3:      if status then ord-ts ← ts; store(ord-ts)
4:      reply [Order-R, status] to coordinator
```

*Figure 11*

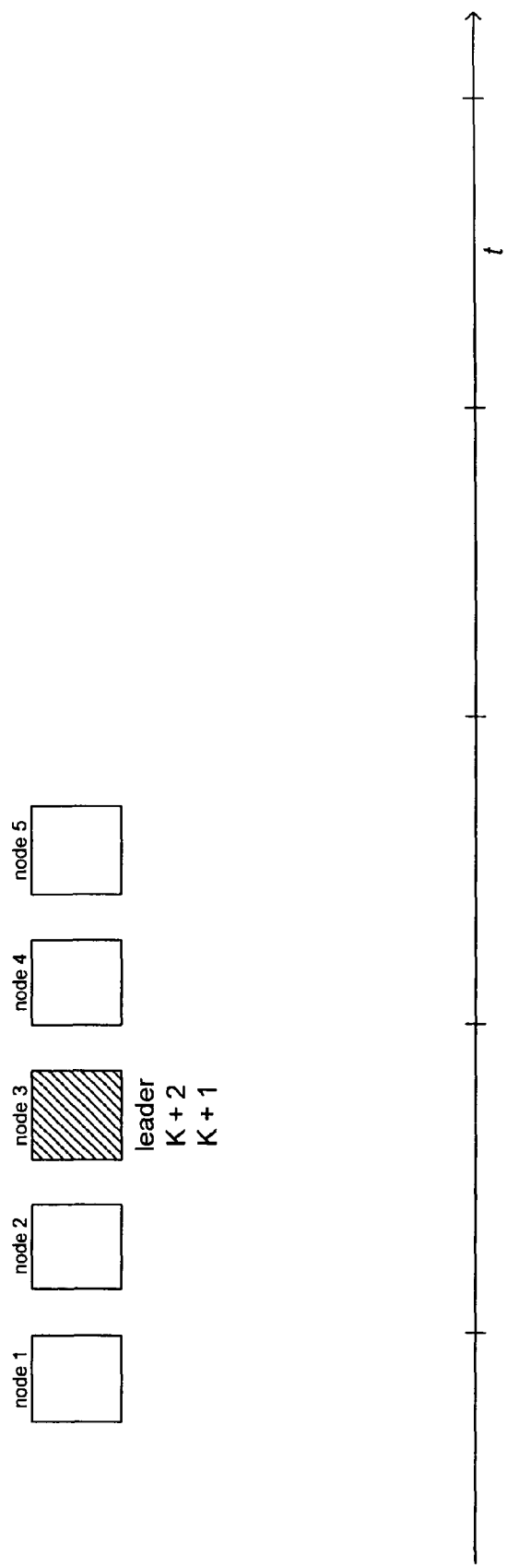

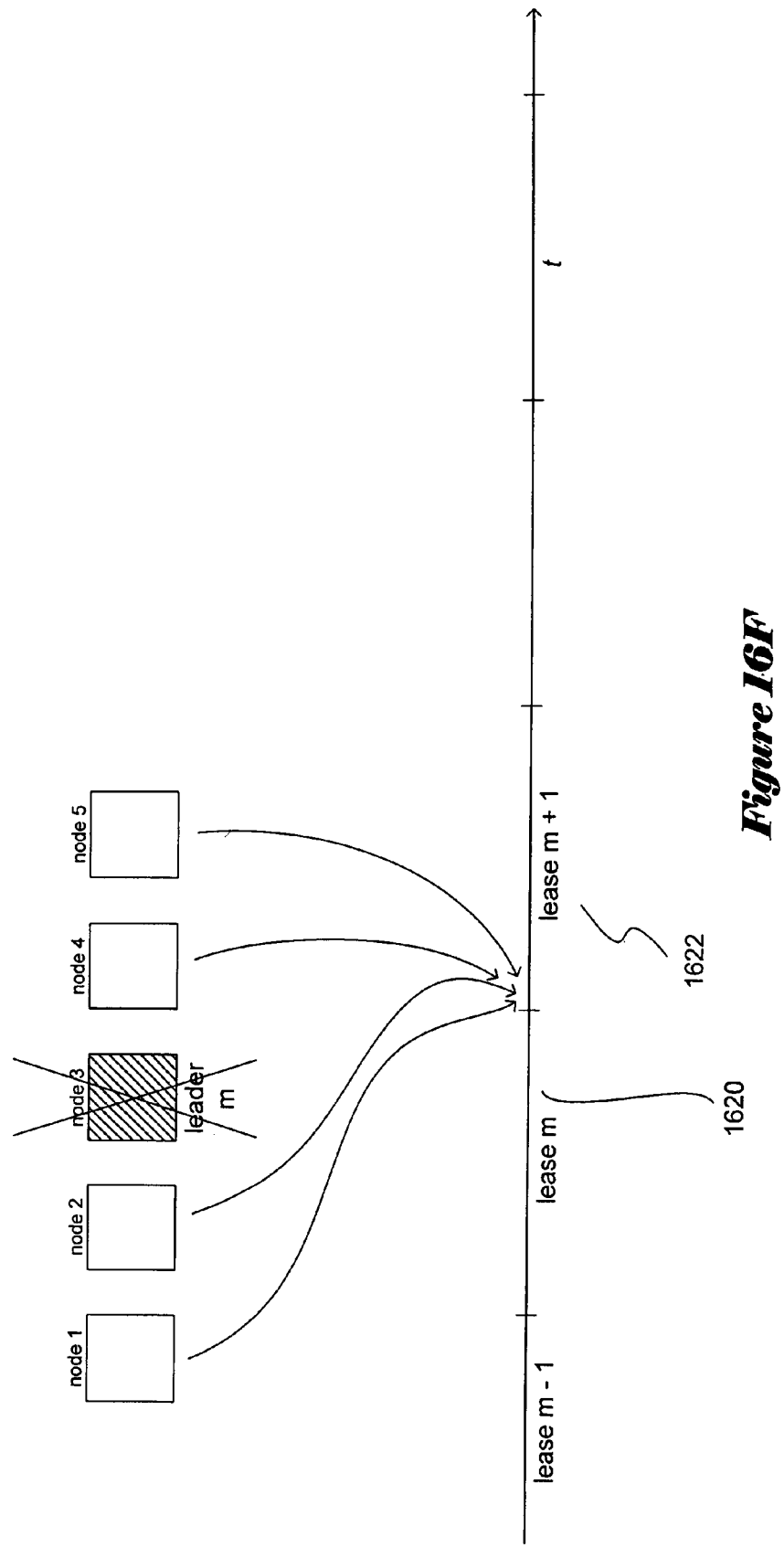

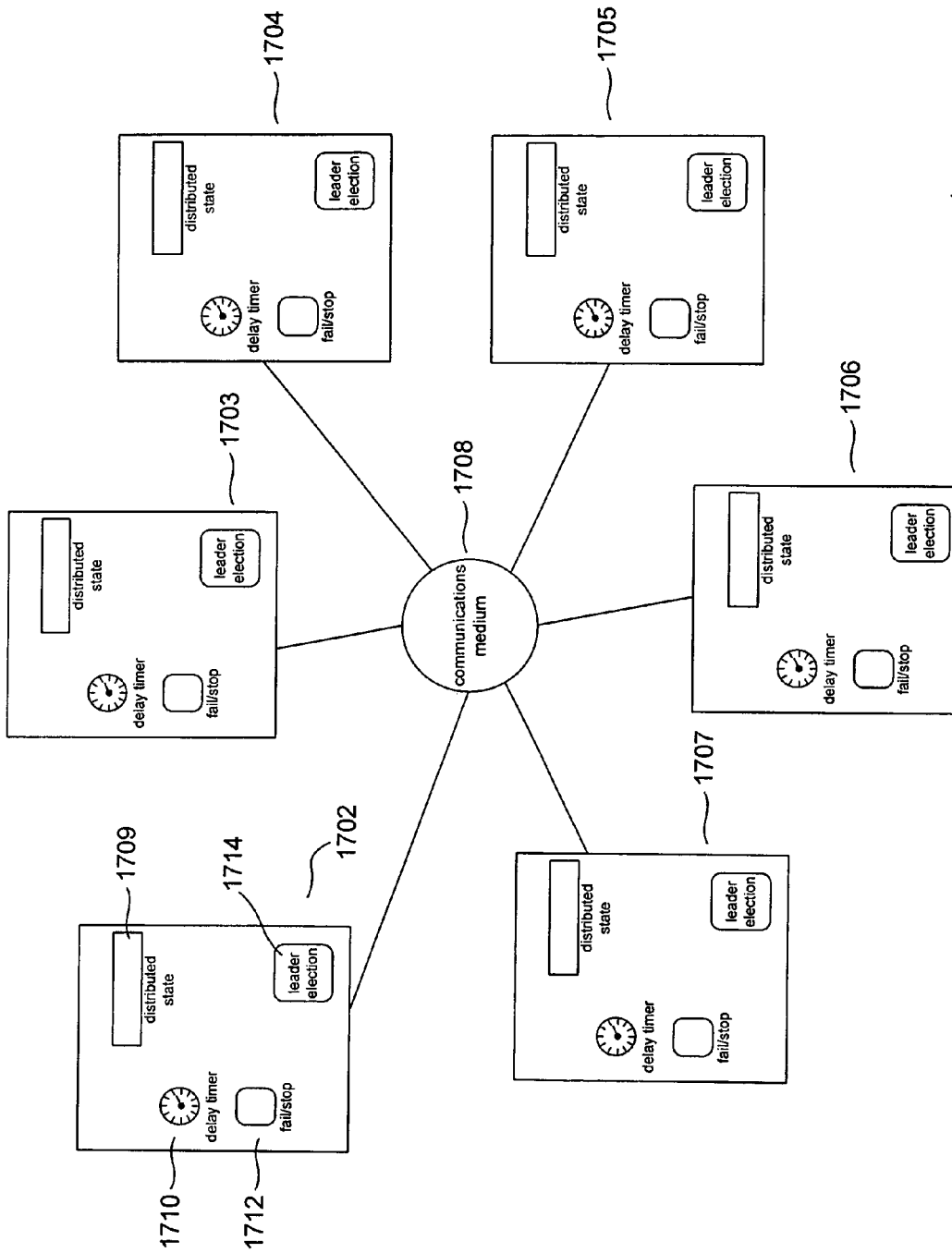

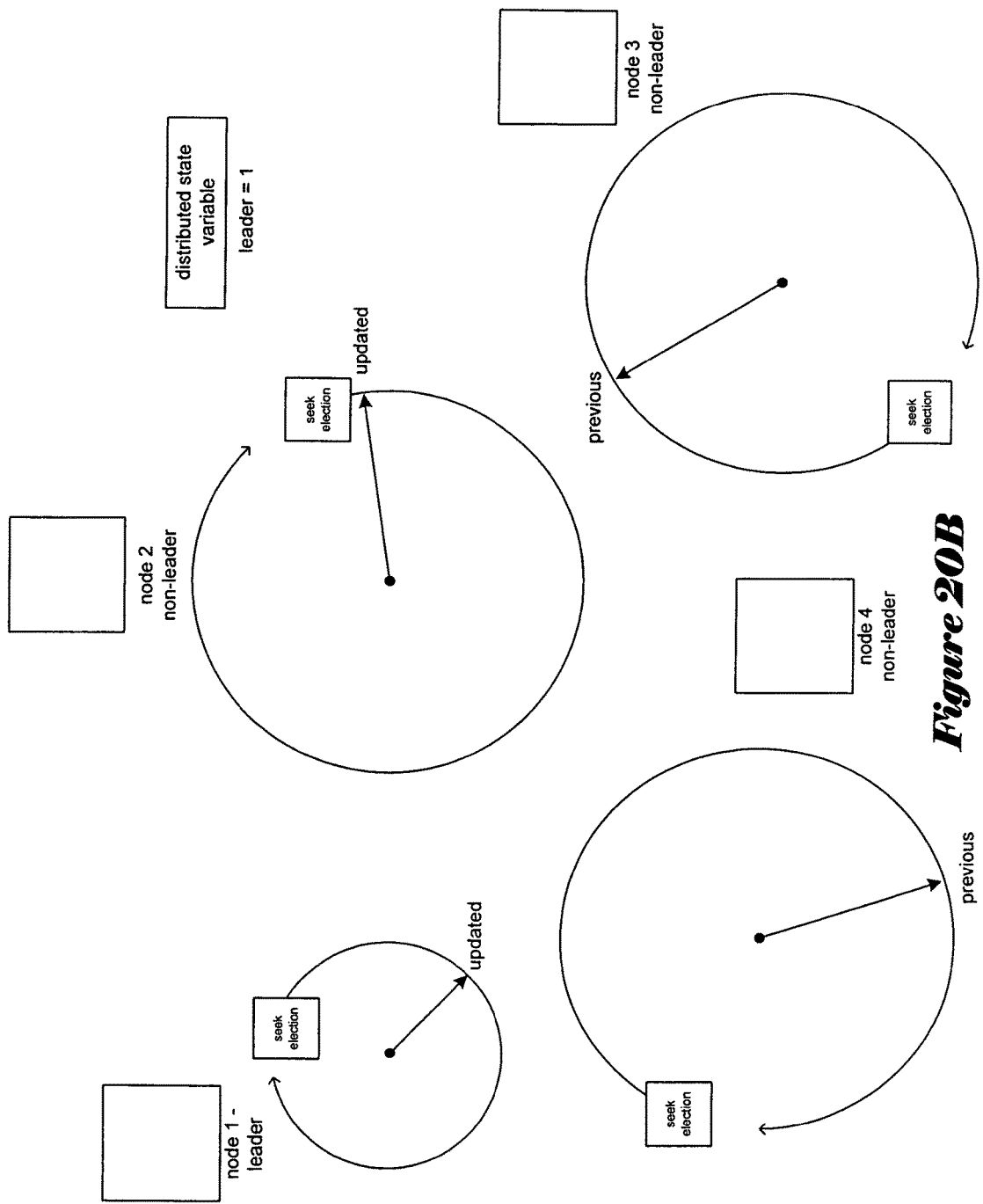

Roles (2312)

| Role ID | Role Description | | | | |
|---|---|---|---|---|---|
| A | software installation manager | | | | |

2310

Global Role Assignments (2304) — 2302

| Role ID | Node ID | Leader Service ID | Time Assumed | | | | |
|---|---|---|---|---|---|---|---|
| A | X | PROC 3204 | 8361299873162 | | | | |
| B | Y | PROC 6612 | 8361299874661 | | | | |

DISTRIBUTED-LEADER-ELECTION SERVICE FOR A DISTRIBUTED COMPUTER SYSTEM

TECHNICAL FIELD OF THE INVENTION

The present invention is related to distributed computing and, in particular, to a method and system for efficiently and robustly allocating leadership within a distributed computer system.

BACKGROUND OF THE INVENTION

In the early days of computing, computer systems were stand-alone devices accessed by computer users via input/output ("I/O") peripheral components, including control-panel toggle switches, Hollerith-card readers, line printers, and eventually cathode-ray-tube ("CRT") 24-line terminals and keyboards. When a user wished to carry out a computational task on more than one computer system, the user would manually transfer data between the computer systems via Hollerith cards, magnetic tape, and, later, removable magnetic-disk packs.

With the advent of multi-tasking operating systems, computer scientists discovered and addressed the need for synchronizing access by multiple, concurrently executing tasks to individual resources, including peripheral devices, memory, and other resources, and developed tools for synchronizing and coordinating concurrent computation of decomposable problems by independent, concurrently executing processes. With the advent of computer networking, formerly independent computer systems were able to be electronically interconnected, allowing computer systems to be linked together to form distributed computer systems. Although initial distributed computer systems were relatively loosely coupled, far more complex, tightly coupled distributed computer systems based on distributed operating systems and efficient, distributed computation models, have since been developed.

There are many different models for, and types of, distributed computing. In some models, relatively independent, asynchronous, peer computational entities execute relatively autonomously on one or more distributed computer systems, with sufficient coordination to produce reliable, deterministic solutions to computational problems and deterministic behavior with respect to external inputs. In other distributed systems, tightly controlled computational entities execute according to pre-determined schedules on distributed computer systems, closely synchronized by various protocols and computational tools. In many fault-tolerant and highly available distributed computer systems, computational tasks are distributed among individual nodes, or computers, of the distributed computer system in order to fairly distribute the computational load across the nodes. In the event of failure of one or more nodes, surviving nodes can assume, or be assigned, tasks originally distributed to failed nodes so that the overall distributed computational system is robust and resilient with respect to individual node failure. However, even in distributed systems of relatively independent peer nodes, it is frequently the case that, for certain tasks, a single node needs to be chosen to be responsible for the task, rather than simply allowing any of the peer nodes to contend for the task, or for subtasks that together compose the task. In other words, a single node is assigned to be, or elected to be, the leader with respect to one or more tasks that require investing responsibility for the one or more tasks in a single node. Tasks for which leaders need to be assigned are generally tasks that are not efficiently decomposed, iterative tasks with high, initial-iteration computational overheads, and tasks that require assembling complex sets of privileges and controls over resources. Examples of such tasks include coordinator-type tasks in which a single node needs to be responsible for distributed state changes related to distributed-system management, distributed-system-updating tasks, including installation of software or software updates on nodes within the distributed system, system-state-reporting tasks, in which a single node needs be responsible for accessing and reporting the distributed state of a distributed computer system, and, in certain systems, scheduling, distribution, and control tasks for the distributed system.

A leadership-role allocation can be hard wired, or statically assigned at distributed-system initialization, for all, a subset of, or individual tasks needing a leader. However, relatively static leader assignment may lead to time-consuming and difficult leader-reassignment problems when a leader node fails or becomes incapable of carrying out those tasks required of the leader node. Alternatively, all nodes can constantly contend for leader roles for tasks requiring a leader on an on-demand basis, but constant leader-role contention may be inefficient and may even lead to thrashing. Strong-leader self-election based on a distributed consensus service is a useful model for certain of these distributed computer systems and distributed computing tasks. The strong-leader-election method based on a distributed consensus service can be extended to provide strong-leader election for multiple roles within a distributed computer system. However, in more complex distributed computer systems, leadership may need to be allocated for multiple roles on a continuing basis, and leadership may need to be distributed among individual processes running on nodes within a distributed computer system. For these environments, researchers, developers, manufacturers, and users of distributed computer systems have recognized the need for a practical and efficient means for continuous, dynamic allocation of leadership among processes within nodes of a multi-node distributed computer system.

SUMMARY OF THE INVENTION

Embodiments of the present invention provide methods and systems for leadership allocation in a distributed computer system. In certain embodiments of the present invention, a leader-election-service process runs within each node of a distributed computer system, together cooperatively providing a distributed-leader-election service. The distributed-leader-election service employs a distributed consensus service to manage distributed state information related to roles and leadership allocation within a distributed computer system. Client processes within each node interface with the leader-election-service process of the node in order to assume leadership of particular roles within the distributed computer system. Leadership-allocation management is thus centralized, within each node. In alternative embodiments, the distributed-leader-election service may be implemented as a collection of library routines that run in the context of client processes.

BRIEF DESCRIPTION OF THE DRAWINGS

FIGS. 1A-G illustrate the Paxos distributed consensus service.

FIG. 11 shows pseudocode implementations for the routine handlers and operational routines shown diagrammatically in FIG. 9.

FIGS. 16A-G illustrate operation of a strong-leader election method.

FIG. 17 illustrates, in similar fashion to FIG. 13, an alternative distributed computer system in which strong-leader election may be practiced.

FIGS. 20A-C illustrate operation of the alternative strong-leader-election method, described above.

FIG. 23 illustrates a portion of the distributed state information maintained cooperatively by leader-election services within a distributed computer system according to one embodiment of the present invention.

DETAILED DESCRIPTION OF THE INVENTION

The present invention is related to distributed computing. Certain embodiments of the present invention rely on previously developed techniques for distributing state information among the nodes of a distributed system. One such technique is the Paxos distributed consensus service, described below in a first subsection. Another, related technique provides a distributed storage register to multiple nodes in a distributed system, described in a second subsection, below. Using the Paxos distributed consensus service, or related disk-Paxos services, described below in a third subsection, a robust and efficient leader-election method can be devised. The efficient leader-election method is described in a fourth subsection, below. For more complex distributed computer systems, a higher-level, distributed-leader-election service may be provided, according to method and system embodiments of the present invention, described below in a fifth subsection.

Paxos Distributed Computing Model

Figure 1A:
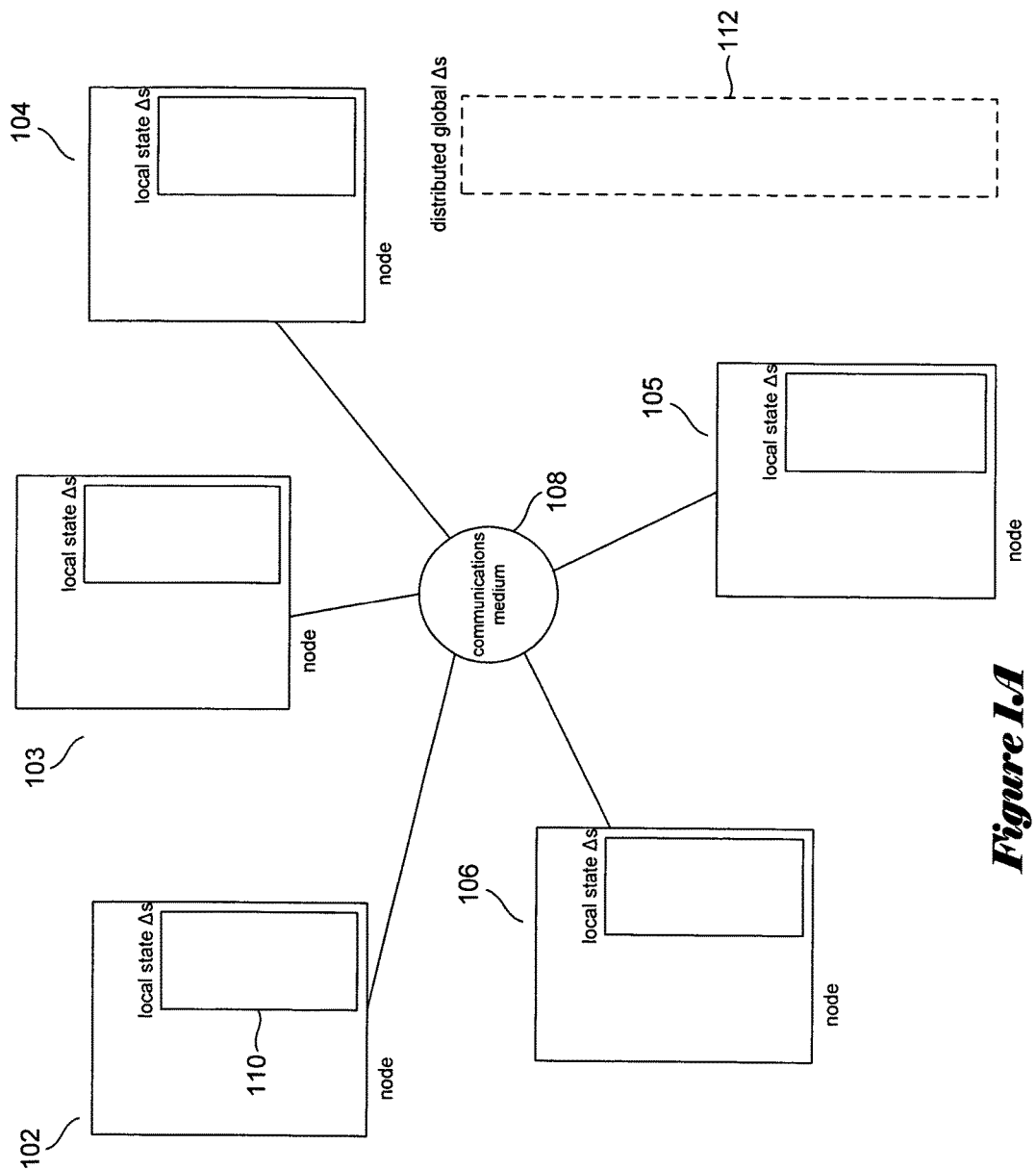

FIGS. 1A-G illustrate the Paxos distributed consensus service. FIGS. 1A-G employ the same illustration conventions, next described with reference to FIG. 1A. In FIG. 1A, five nodes 102-106 are interconnected by a communications medium 108. Each node can send messages to, and receive messages from, each of the remaining nodes. Each node includes an ordered, sequential list of state changes, such as local state change list 110 within node 102. Together, the nodes constitute a distributed computer system that manages a global, master, ordered and sequential list of state changes 112. The global list of state changes 112 is shown as a dashed-line rectangle, to indicate that the distributed system may not contain a single, full copy of the global list of state changes, but may instead maintain the global list of state changes in various pieces distributed across the nodes of the distributed computer system.

Figure 1B:
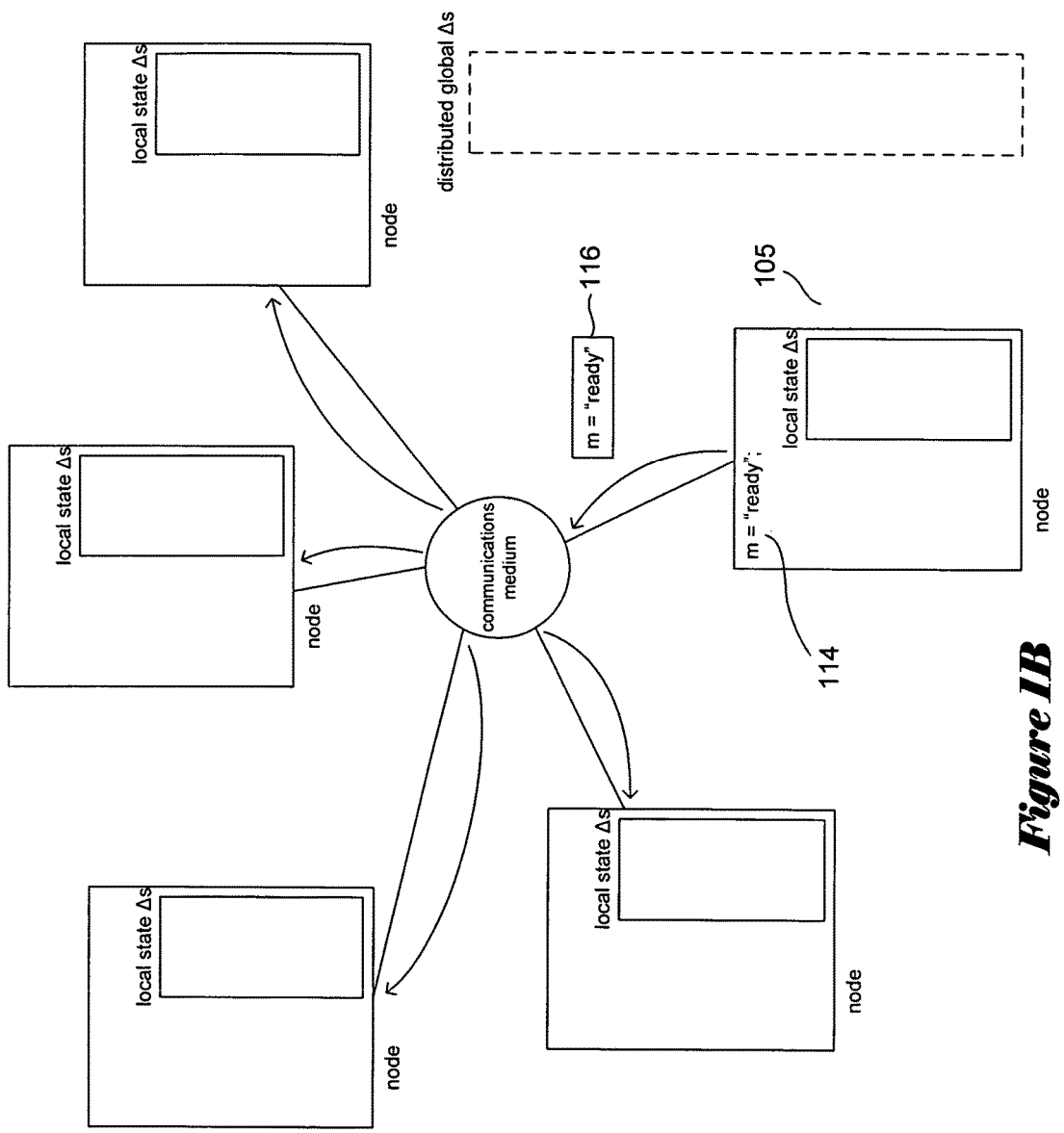

Any node can request a state change. For example, as shown in FIG. 1B, node 105 has formulated the state change request: m="ready."114. This state change is directed to setting the contents of variable m to the string "ready." Node 105 asserts the state-change request by sending a state-change request message 116 to all active nodes in the distributed system. Either of two outcomes is possible. In one outcome, the state-change request is successful, and all or a portion of the active nodes in the distributed system update their local state change lists 118-122 to indicate the state change. The global distributed state-change list 112 is always updated as a product of committing a state-change request. In a second outcome, the state-change request is denied, or is unsuccessful, and no local state-change list is updated, and, of course, the global distributed state-change list 112 is also not updated.

Figure 1D:
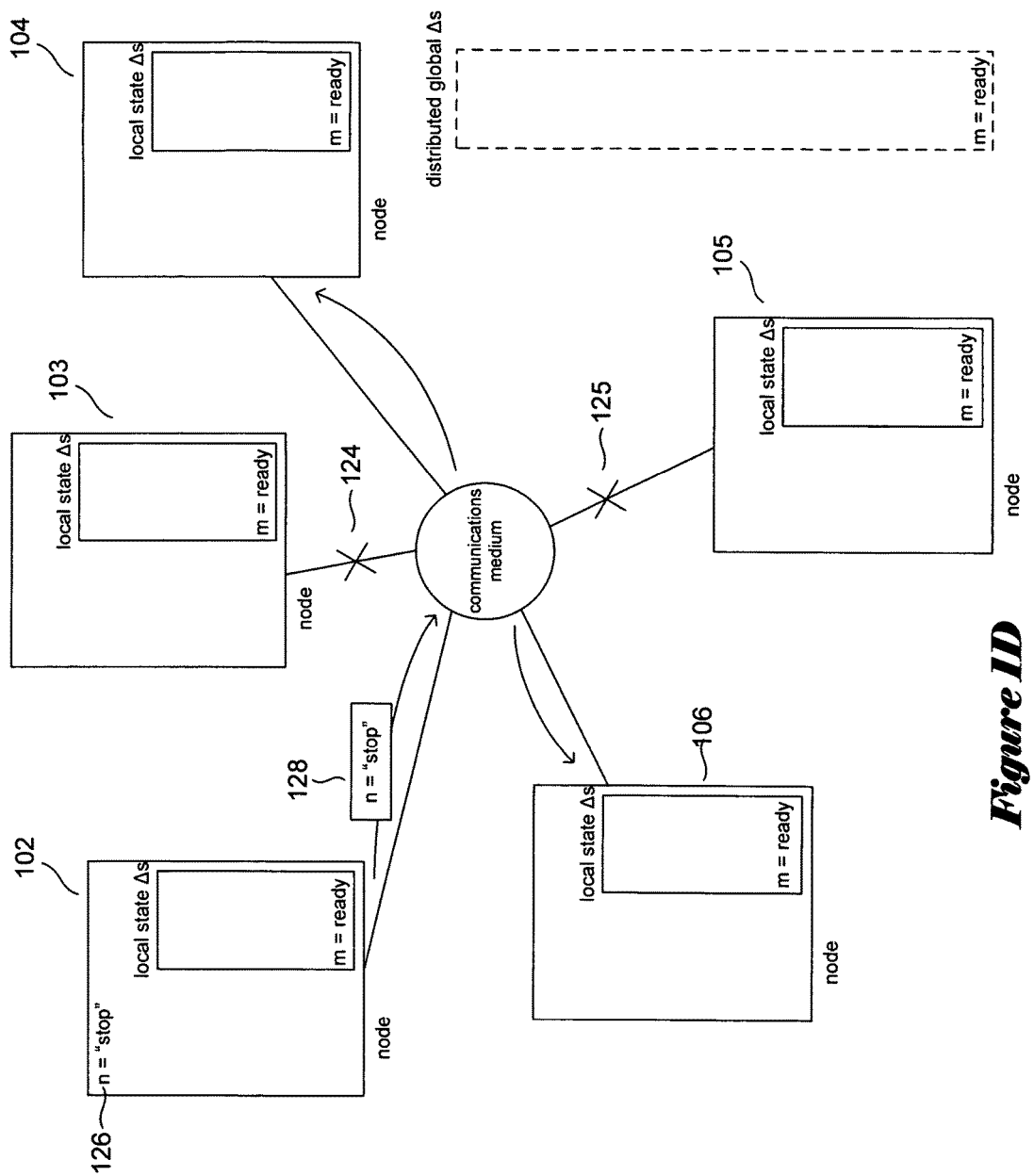
Figure 1E:
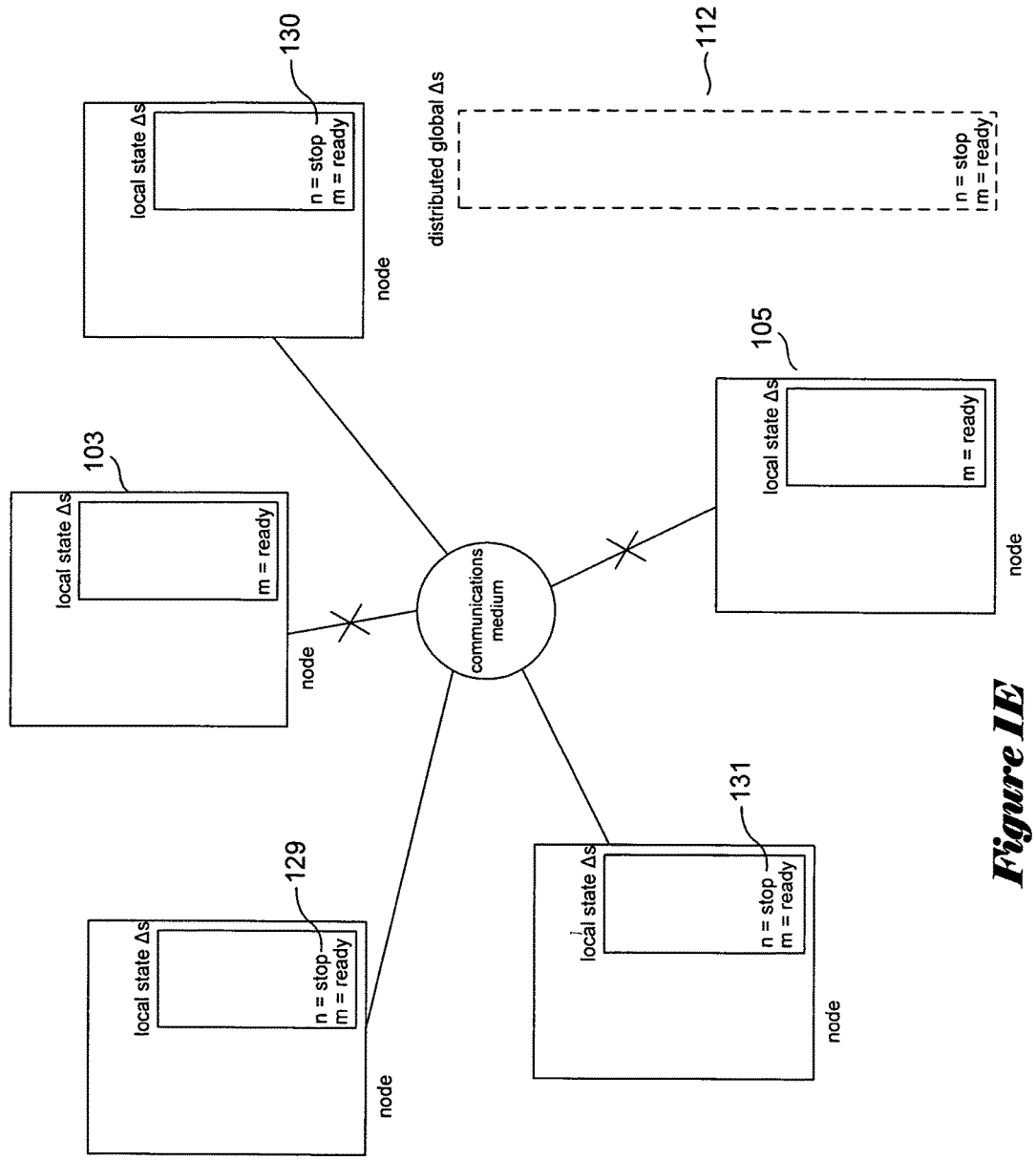
Figure 1F:
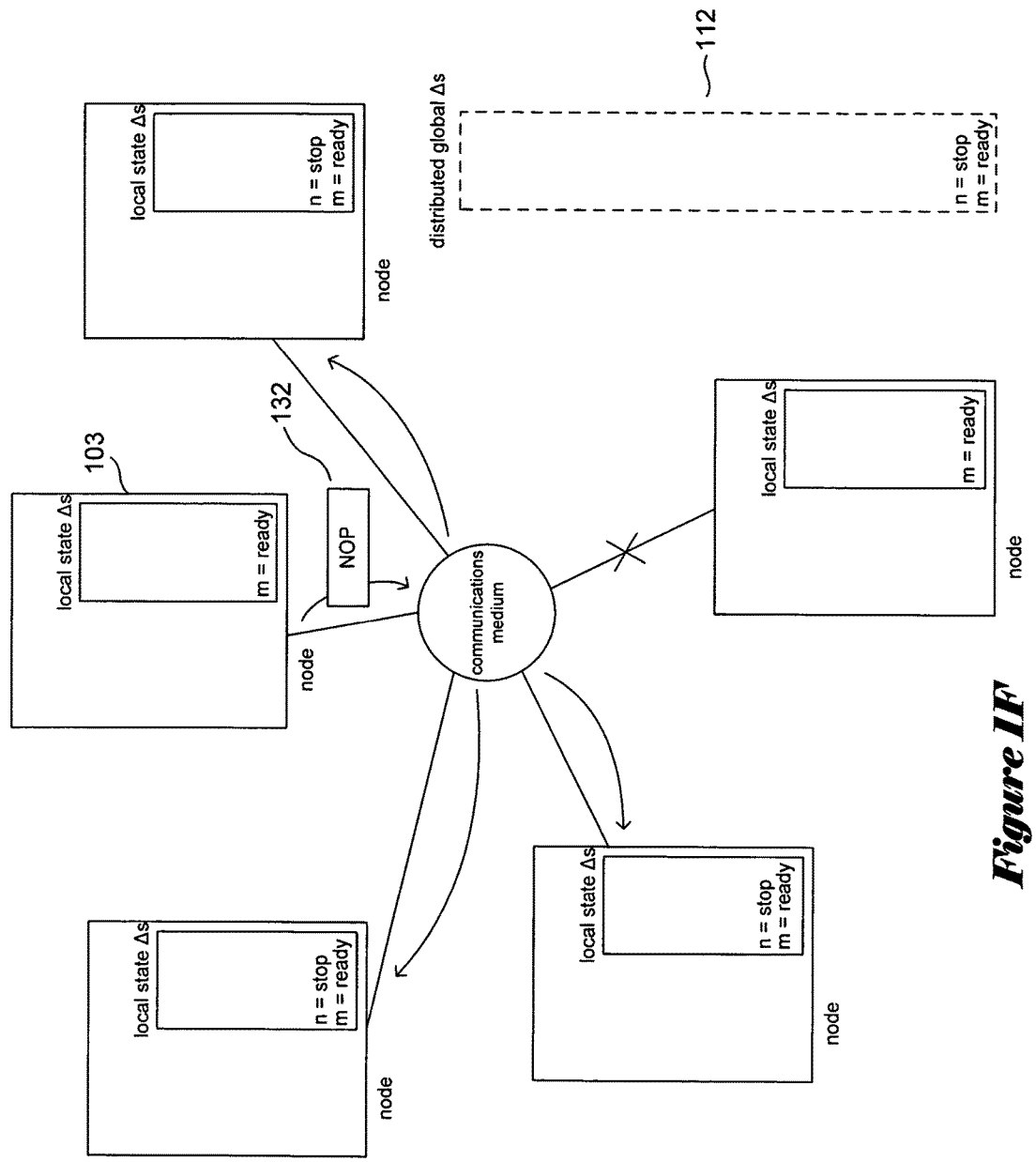
Figure 1G:
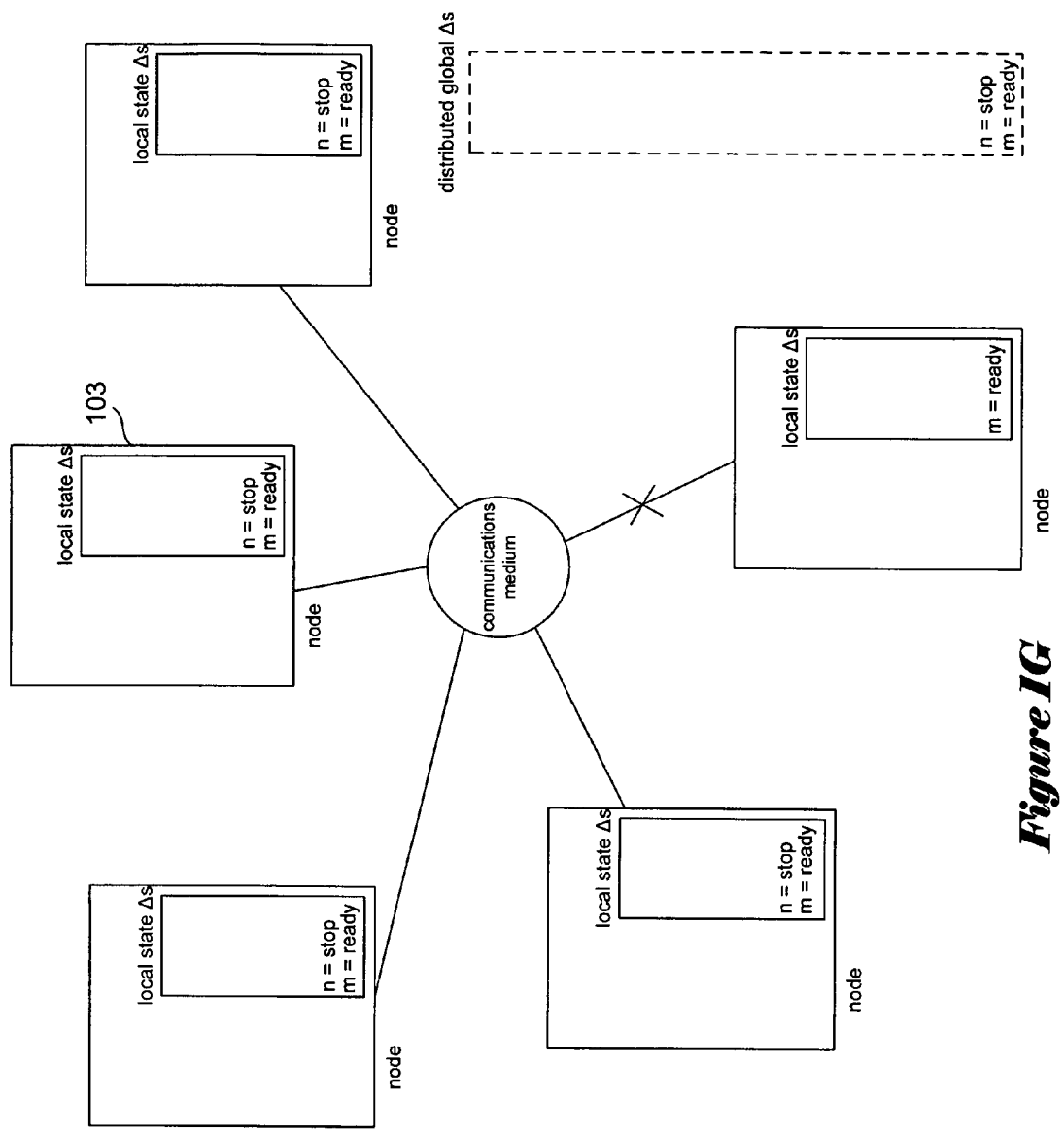

At any point in time, certain of the nodes may become inactive, due to node failure, communications medium failure, or other failures within the distributed computer system. For example, as shown in FIG. 1D by "X" symbols 124-125, the communications links to nodes 103 and 105 may fail, leaving only nodes 102, 104, and 105 active within the distributed computer system. Following failure of nodes 103 and 105, an active node may wish to request a subsequent state change. In FIG. 1D, node 102 has formulated the state change request: n="stop" 126. Node 102 requests this state change by sending a state-change request message 128 to the active nodes 104 and 105 within a distributed computer system. When there are sufficient active nodes to constitute a quorum of nodes, where a quorum is, in many situations, at least a majority of the nodes in a distributed system, a state-change request may succeed. In the case shown in FIG. 1D, the state-change request made by node 102 succeeds, resulting in updates to the local state-change lists of the active nodes 129-131, as shown in FIG. 1E. Inactive nodes 103 and 105 do not reflect the most recently successful state-change request, since they are not in communication with the active nodes. The distributed global state-change list 112 necessarily reflects the most recent state change. Should a formerly failed, or inactive, node be rehabilitated, and rejoin the distributed computer system, as in the case of node 103 in FIG. 1F, the reactivated node can update its local state-change list by issuing a no-operation ("NOP") request 132 to the distributed computer system. A by-product of issuing any request, including a state-change request, is that the local state-change list of the node issuing the request is brought up to date with respect to the global, master state-change list 112 prior to the request being issued. This guarantees that there is a global ordering of issued and executed requests, memorialized in the distributed global state-change list 112. Following execution of the NOP request, reactivated node 103 has an updated local state-change list, shown in FIG. 1G.

When a sufficient number of nodes have failed that a quorum of nodes is not active, no state-change request can succeed. The Paxos distributed consensus services employs a communications protocol to achieve a distributed global state-change list and to manage state-change requests and state-change-request execution. Two or more nodes may simultaneously issue state-change requests, or issue state-change requests in a sufficiently short period of time that the state-change requests cannot be distinguished from one another in time-precedence order. In such cases, the Paxos protocol chooses one of the contending state-change requests for execution, and fails the remaining, simultaneous state-change requests. Depending on the particular Paxos implementation, a local state-change list may not be updated as a result of commitment of a next state-change request, if the containing node is not a member of the quorum for commitment of the next state-change request. However, when the node itself next makes a state=change request or issues a NOP request, the node's local state-change list is guaranteed to include all previous, committed state-change requests.

In summary, the Paxos distributed consensus service is a protocol that provides for a global ordering of committed state-change requests requested by individual nodes of a distributed computer system. Each node has a local state-change list that the node can access at any time, locally, to review all committed requests up through the latest committed request within the local state-change list, or a pruned subset of such all committed requests. When a node remains active, its local state-change list generally accurately reflects a global, distributed, master state-change list maintained via the Paxos protocol within the distributed computer system, with a possible lag in updates due to not being involved in recent quorums. If a node loses communications contact with the remaining nodes of the distributed computer system, the node may still use the local state-change list for stand-alone computation. When node rejoins the distributed computer system, the node can update its local state-change list by issuing a state-change request, including a NOP request. Thus, a node learns of any committed requests not yet known to the node no later than the point in time at which the node makes a next state-change request.

In the next subsection, a distributed storage register implementation is discussed. A distributed storage register is less complex than a global state-change list, and may be used as the basis for more complex, globally consistent data sets. The distributed storage register implementation is illustrative of the types of techniques used to implement quorum-based distributed-computing service, such as Paxos.

Storage Register Model

As discussed in the previous section, a distributed storage register is a relatively simple distributed-computing entity that can be implemented by quorum-based techniques similar to those employed in the Paxos protocol. A distributed storage register is a globally shared data entity that is distributed across the nodes of a distributed computer system and that can be updated by any of the nodes according to a Paxos-like protocol.

Figure 2:
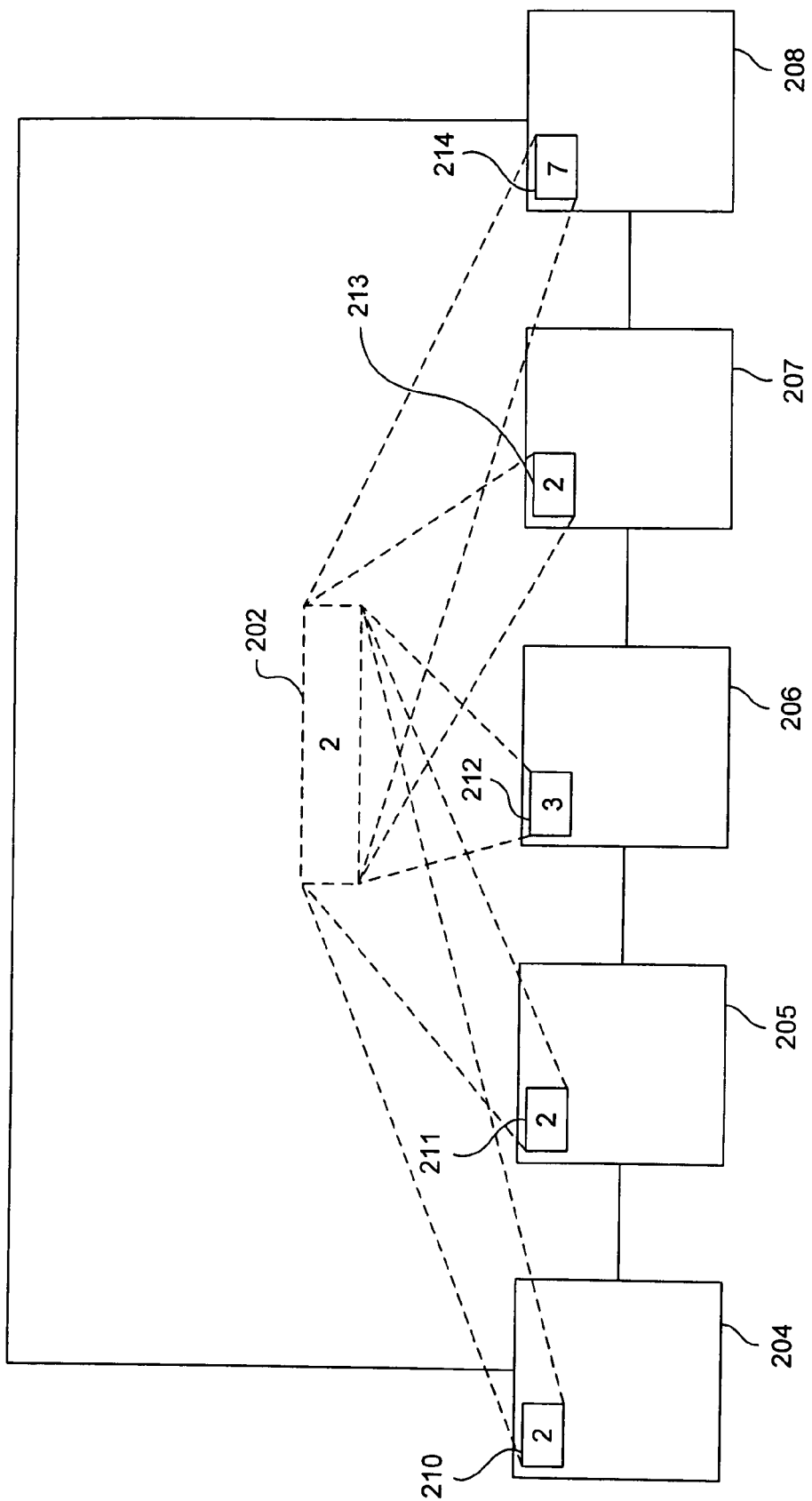
FIGS. 2-8 illustrate the basic operation of a distributed storage register.

FIGS. 2-8 illustrate the basic operation of a distributed storage register. As shown in FIG. 2, the distributed storage register 202 is preferably an abstract, or virtual, register, rather than a physical register implemented in the hardware of one particular electronic device. Each process running on a processor or computer system 204-208 employs a small number of values stored in dynamic memory, and optionally backed up in non-volatile memory, along with a small number of distributed-storage-register-related routines, to collectively implement the distributed storage register 202. At the very least, one set of stored values and routines is associated with each processing entity that accesses the distributed storage register. In some implementations, each process running on a physical processor or multi-processor system may manage its own stored values and routines and, in other implementations, processes running on a particular processor or multi-processor system may share the stored values and routines, providing that the sharing is locally coordinated to prevent concurrent access problems by multiple processes running on the processor.

In FIG. 2, each computer system maintains a local value 210-214 for the distributed storage register. In general, the local values stored by the different computer systems are normally identical, and equal to the value of the distributed storage register 202. However, occasionally the local values may not all be identical, as in the example shown in FIG. 2, in which case, if a majority of the computer systems currently maintain a single locally stored value, then the value of the distributed storage register is the majority-held value.

Figure 3:
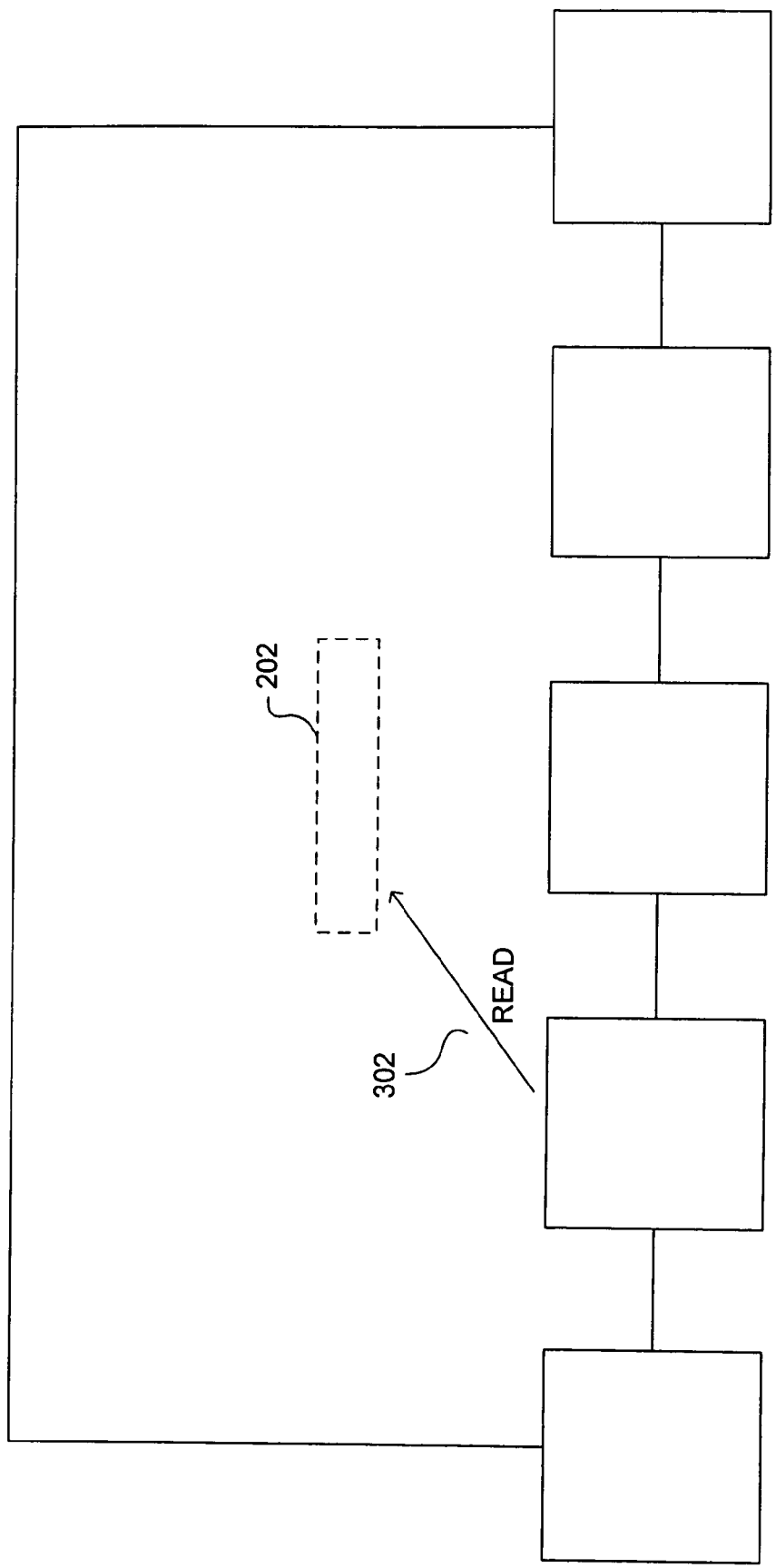
Figure 4:
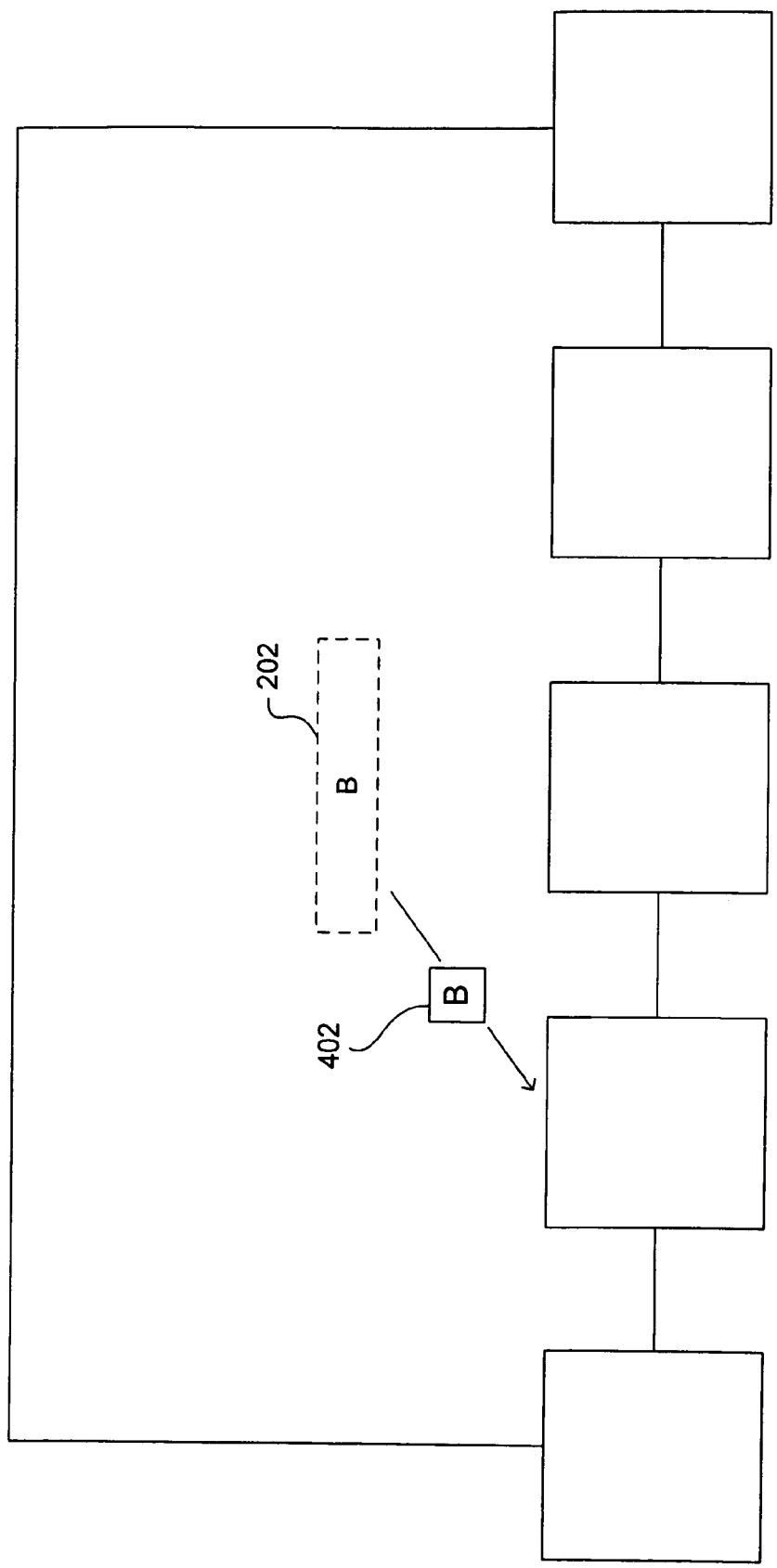
Figure 5:
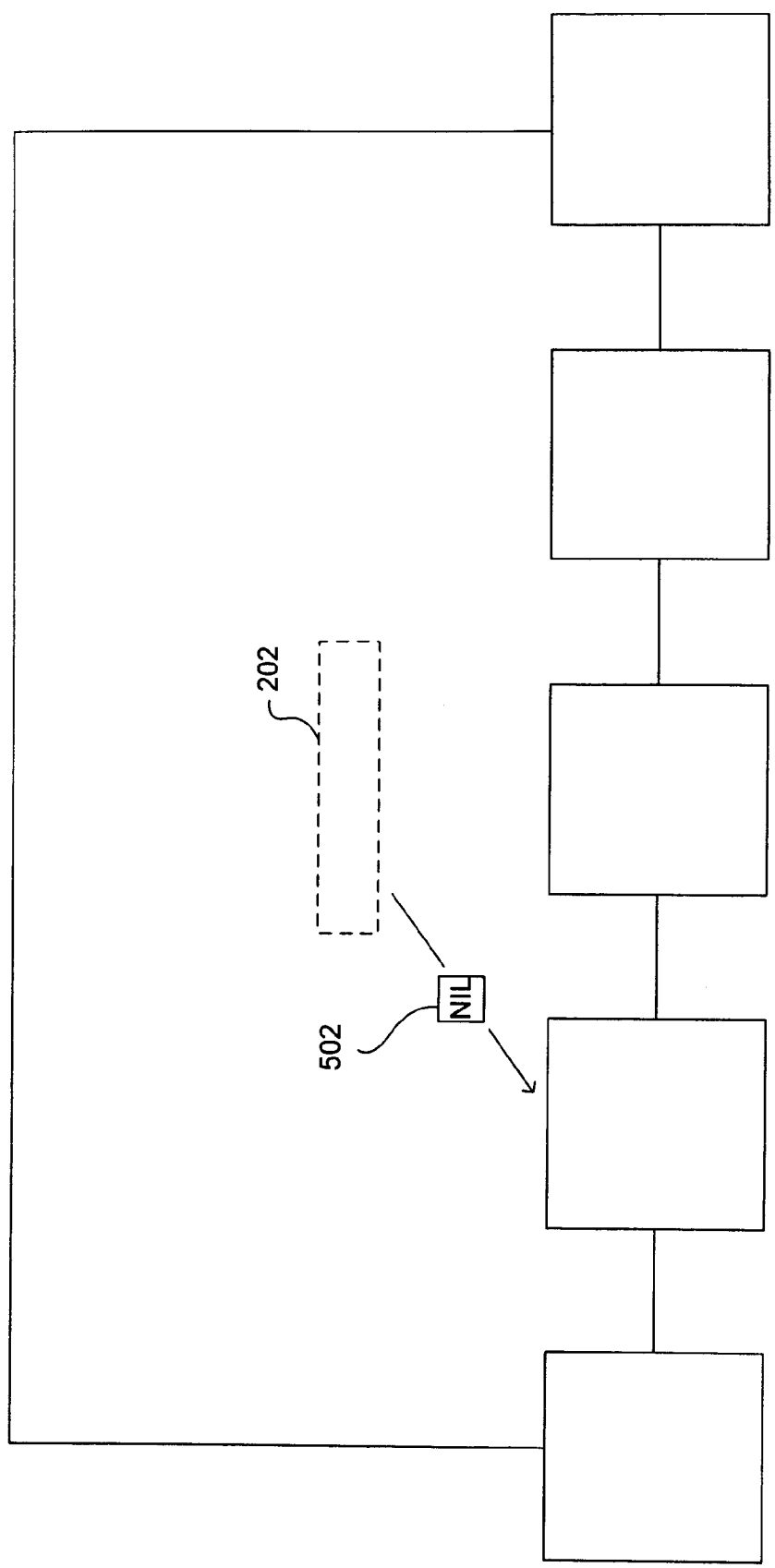

A distributed storage register provides two fundamental high-level functions to a number of intercommunicating processes that collectively implement the distributed storage register. As shown in FIG. 3, a process can direct a READ request 302 to the distributed storage register 202. If the distributed storage register currently holds a valid value, as shown in FIG. 4 by the value "B" within the distributed storage register 202, the current, valid value is returned 402 to the requesting process. However, as shown in FIG. 5, if the distributed storage register 202 does not currently contain a valid value, then the value NIL 502 is returned to the requesting process. The value NIL is a value that cannot be a valid value stored within the distributed storage register.

Figure 6:
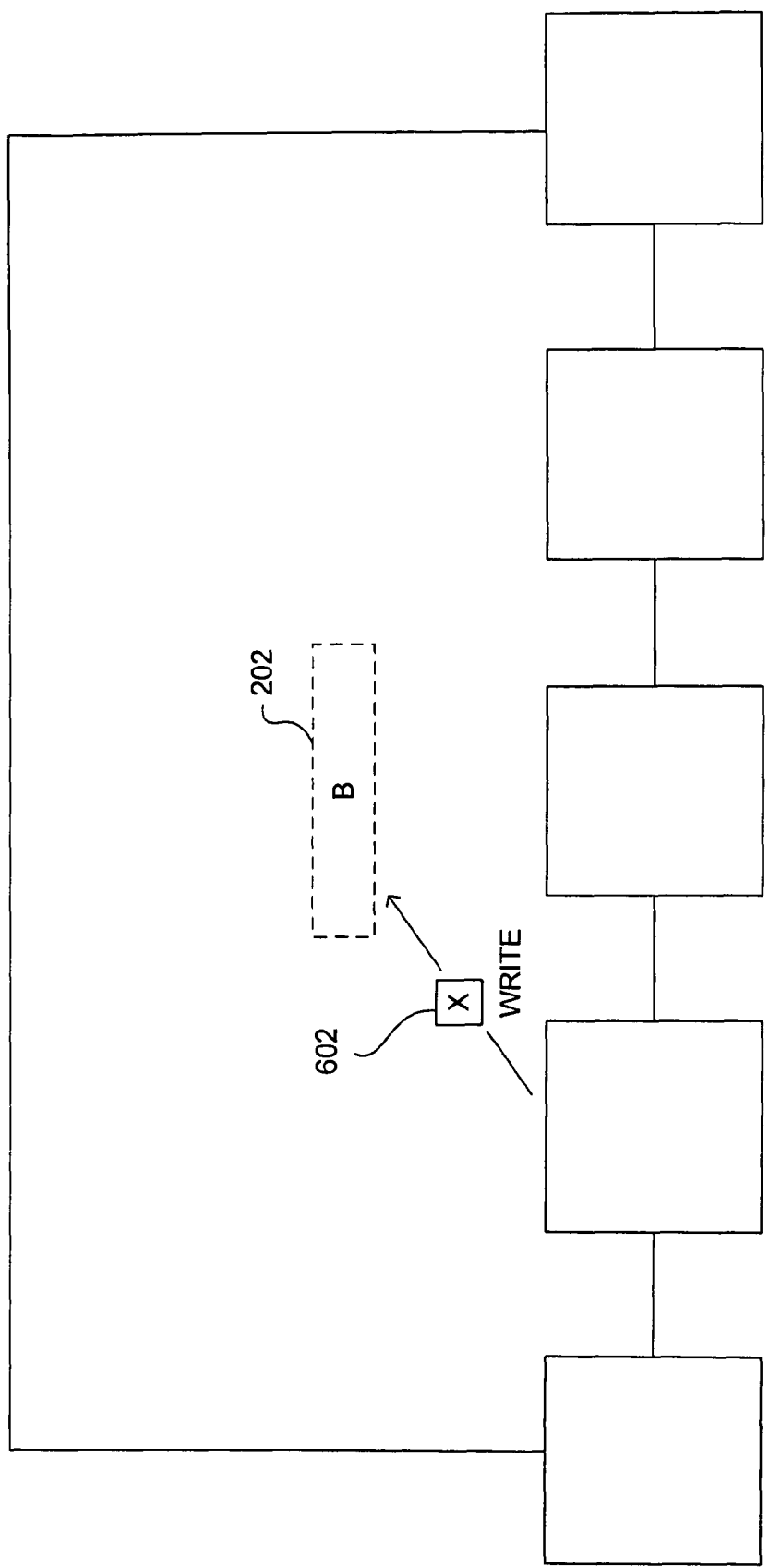
Figure 7:
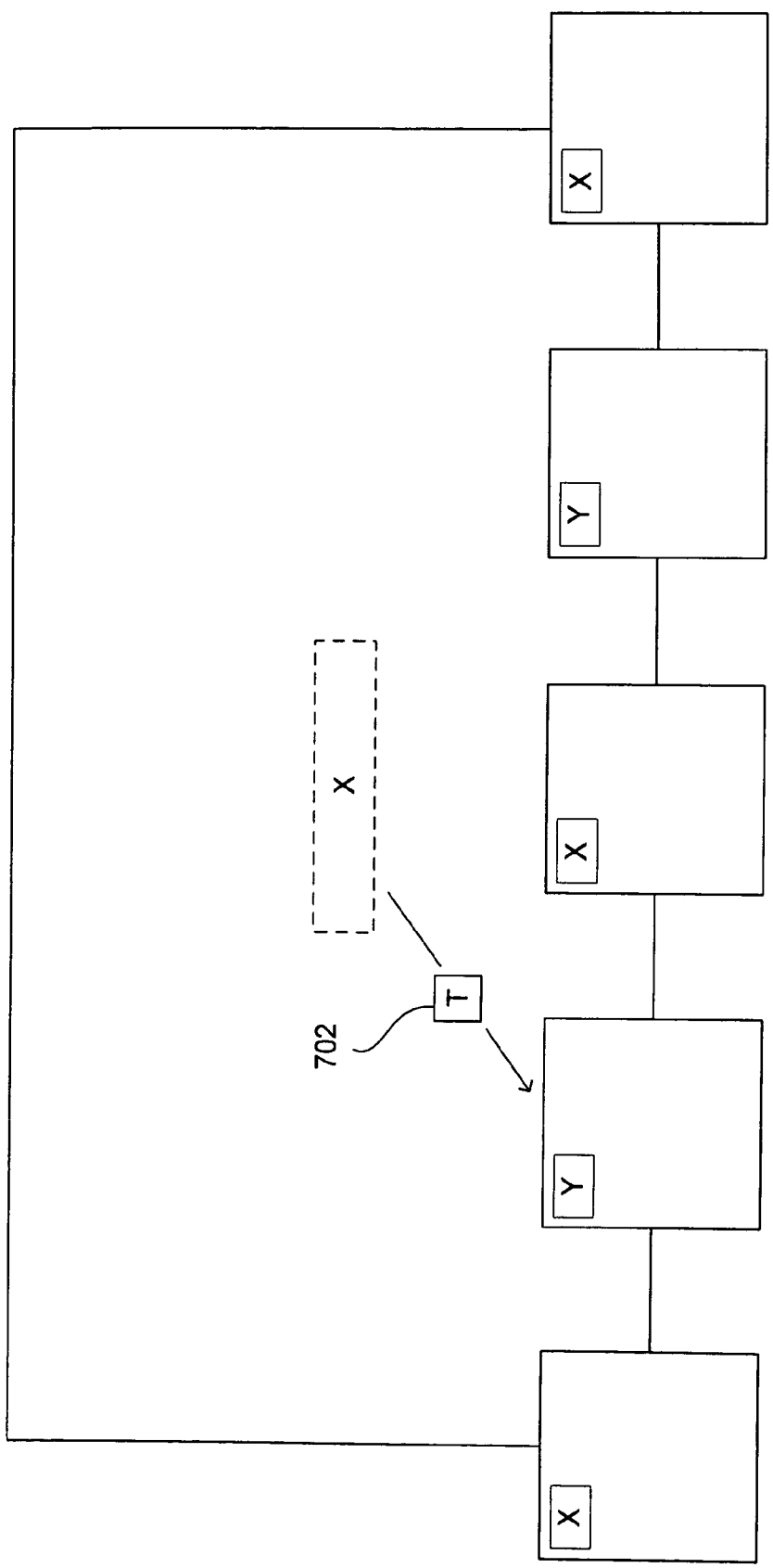
Figure 8:
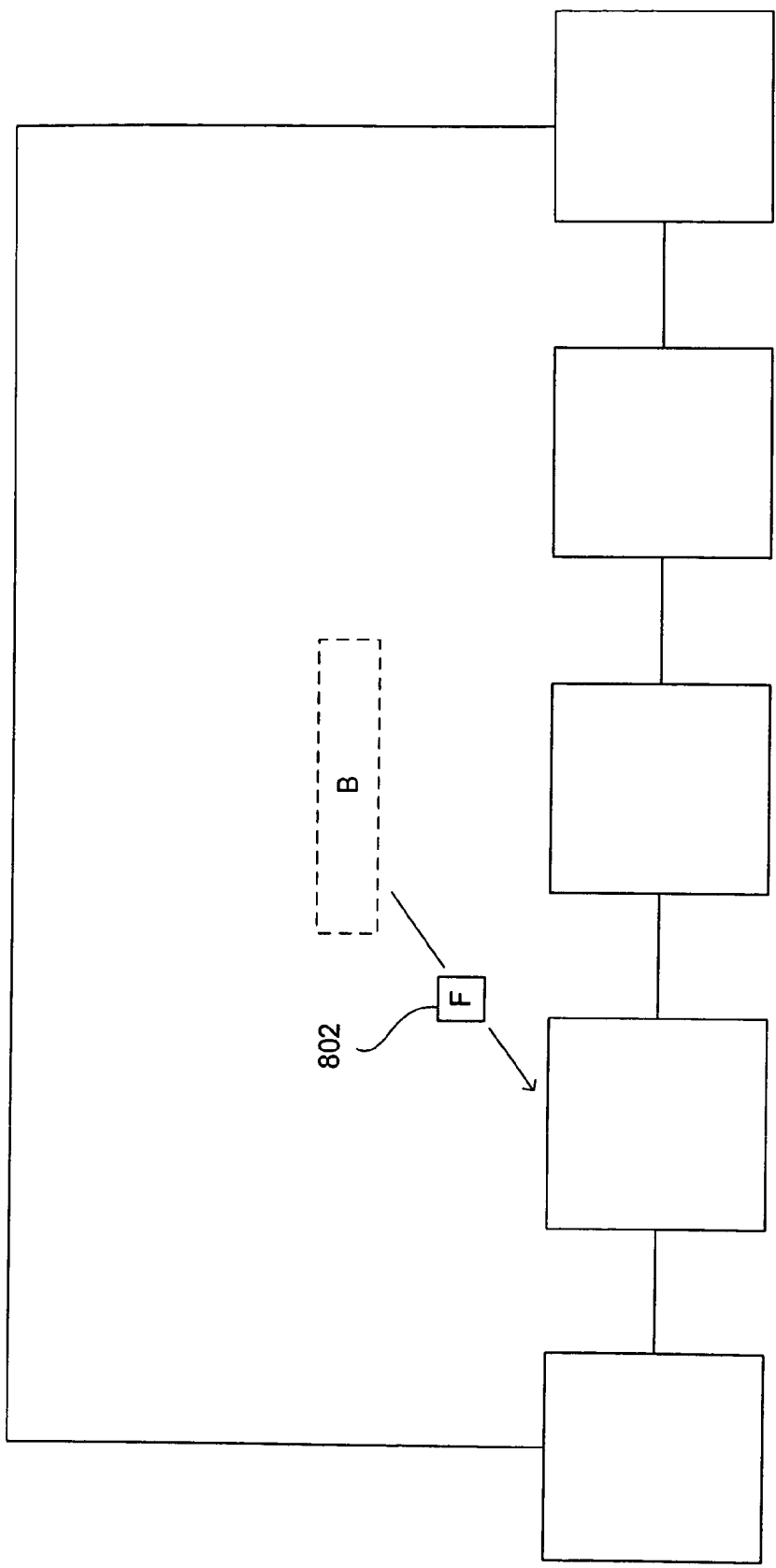

A process may also write a value to the distributed storage register. In FIG. 6, a process directs a WRITE message 602 to the distributed storage register 202, the WRITE message 602 including a new value "X" to be written to the distributed storage register 202. If the value transmitted to the distributed storage register successfully overwrites whatever value is currently stored in the distributed storage register, as shown in FIG. 7, then a Boolean value "TRUE" is returned 702 to the process that directed the WRITE request to the distributed storage register. Otherwise, as shown in FIG. 8, the WRITE request fails, and a Boolean value "FALSE" is returned 802 to the process that directed the WRITE request to the distributed storage register, the value stored in the distributed storage register unchanged by the WRITE request. In certain implementations, the distributed storage register returns binary values "OK" and "NOK," with OK indicating successful execution of the WRITE request and NOK indicating that the contents of the distributed storage register are indefinite, or, in other words, that the WRITE may or may not have succeeded.

Figure 9:
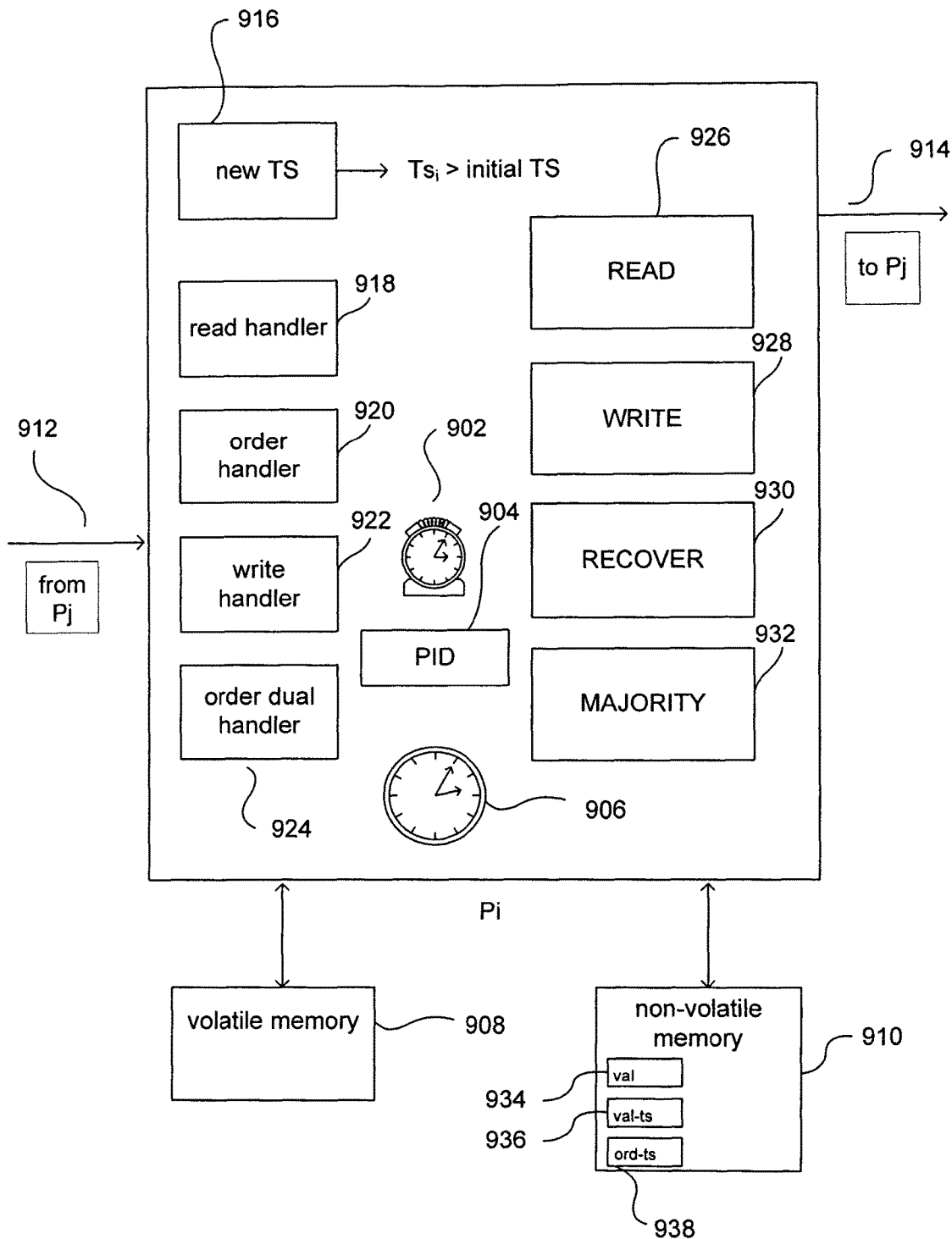
FIG. 9 shows the components used by a process or processing entity $P_i$ that implements, along with a number of other processes and/or processing entities, $P_{j\neq i}$, a distributed storage register.

FIG. 9 shows the components used by a process or processing entity $P_i$ that implements, along with a number of other processes and/or processing entities, $P_{j\neq i}$, a distributed storage register. A processor or processing entity uses three low level primitives: a timer mechanism 902, a unique ID 904, and a clock 906. The processor or processing entity $P_i$ uses a local timer mechanism 902 that allows $P_i$ to set a timer for a specified period of time, and to then wait for that timer to expire, with $P_i$ notified on expiration of the timer in order to continue some operation. A process can set a timer and continue execution, checking or polling the timer for expiration, or a process can set a timer, suspend execution, and be re-awakened when the timer expires. In either case, the timer allows the process to logically suspend an operation, and subsequently resume the operation after a specified period of time, or to perform some operation for a specified period of time, until the timer expires. The process or processing entity $P_i$ also has a reliably stored and reliably retrievable local process ID ("PID") 904. Each processor or processing entity has a local PID that is unique with respect to all other processes and/or processing entities that together implement the distributed storage register. Finally, the processor processing entity $P_i$ has a real-time clock 906 that is roughly coordinated with some absolute time. The real-time clocks of all the processes and/or processing entities that together collectively implement a distributed storage register need not be precisely synchronized, but should be reasonably reflective of some shared conception of absolute time. Most computers, including personal computers, include a battery-powered system clock that reflects a current, universal time value. For most purposes, including implementation of a distributed storage register, these system clocks need not be precisely synchronized, but only approximately reflective of a current universal time.

Each processor or processing entity $P_i$ includes a volatile memory 908 and, in some embodiments, a non-volatile memory 910. The volatile memory 908 is used for storing instructions for execution and local values of a number of variables used for the distributed-storage-register protocol. The non-volatile memory 910 is used for persistently storing the variables used, in some embodiments, for the distributed-storage-register protocol. Persistent storage of variable values provides a relatively straightforward resumption of a process's participation in the collective implementation of a distributed storage register following a crash or communications interruption. However, persistent storage is not required for resumption of a crashed or temporally isolated processor's participation in the collective implementation of the distributed storage register. Instead, provided that the variable values stored in dynamic memory, in non-persistent-storage embodiments, if lost, are all lost together, provided that lost variables are properly re-initialized, and provided that a quorum of processors remains functional and interconnected at all times, the distributed storage register protocol correctly operates, and progress of processes and processing entities using the distributed storage register is maintained. Each process $P_i$ stores three variables: (1) val 934, which holds the current, local value for the distributed storage register; (2) val-ts 936, which indicates the timestamp value associated with the current local value for the distributed storage register; and (3) ord-ts 938, which indicates the most recent timestamp associated with a WRITE operation. The variable val is initialized, particularly in non-persistent-storage embodiments, to a value NIL that is different from any value written to the distributed storage register by processes or processing entities, and that is, therefore, distinguishable from all other distributed-storage-register values. Similarly, the values of variables val-ts and ord-ts are initialized to the value "initialTS," a value less than any time-stamp value returned by a routine "newTS" used to generate time-stamp values. Providing that val, val-ts, and ord-ts are together re-initialized to these values, the collectively implemented distributed storage register tolerates communications interruptions and process and processing entity crashes, provided that at least a majority of processes and processing entities recover and resume correction operation.

Each processor or processing entity $P_i$ may be interconnected to the other processes and processing entities $P_{j\neq i}$ via a message-based network in order to receive 912 and send 914 messages to the other processes and processing entities $P_{j\neq i}$. Each processor or processing entity $P_i$ includes a routine "newTS" 916 that returns a timestamp $TS_i$ when called, the timestamp $TS_i$ greater than some initial value "initialTS." Each time the routine "newTS" is called, it returns a timestamp $TS_i$ greater than any timestamp previously returned. Also, any timestamp value $TS_i$ returned by the newTS called by a processor or processing entity $P_i$ should be different from any timestamp $TS_j$ returned by newTS called by any other processor processing entity $P_j$. One practical method for implementing newTS is for newTS to return a timestamp TS comprising the concatenation of the local PID 904 with the current time reported by the system clock 906. Each processor or processing entity $P_i$ that implements the distributed storage register includes four different handler routines: (1) a READ handler 918; (2) an ORDER handler 920; (3) a WRITE handler 922; and (4) an ORDER&READ handler 924. It is important to note that handler routines may need to employ critical sections, or code sections single-threaded by locks, to prevent race conditions in testing and setting of various local data values. Each processor or processing entity $P_i$ also has four operational routines: (1) READ 926; (2) WRITE 928; (3) RECOVER 930; and (4) MAJORITY 932. Both the four handler routines and the four operational routines are discussed in detail, below.

Correct operation of a distributed storage register, and liveness, or progress, of processes and processing entities using a distributed storage register depends on a number of assumptions. Each process or processing entity $P_i$ is assumed to not behave maliciously. In other words, each processor or processing entity $P_i$ faithfully adheres to the distributed-storage-register protocol. Another assumption is that a majority of the processes and/or processing entities $P_i$ that collectively implement a distributed storage register either never crash or eventually stop crashing and execute reliably. As discussed above, a distributed storage register implementation is tolerant to lost messages, communications interruptions, and process and processing-entity crashes. When a number of processes or processing entities are crashed or isolated that is less than sufficient to break the quorum of processes or processing entities, the distributed storage register remains correct and live. When a sufficient number of processes or processing entities are crashed or isolated to break the quorum of processes or processing entities, the system remains correct, but not live. As mentioned above, all of the processes and/or processing entities are fully interconnected by a message-based network. The message-based network may be asynchronous, with no bounds on message-transmission times. However, a fair-loss property for the network is assumed, which essentially guarantees that if $P_i$ receives a message m from $P_j$, then $P_j$ sent the message m, and also essentially guarantees that if $P_i$ repeatedly transmits the message m to $P_j$, $P_j$ will eventually receive message m, if $P_j$ is a correct process or processing entity. Again, as discussed above, it is assumed that the system clocks for all processes or processing entities are all reasonably reflective of some shared time standard, but need not be precisely synchronized.

These assumptions are useful to prove correctness of the distributed-storage-register protocol and to guarantee progress. However, in certain practical implementations, one or more of the assumptions may be violated, and a reasonably functional distributed storage register obtained. In addition, additional safeguards may be built into the handler routines and operational routines in order to overcome particular deficiencies in the hardware platforms and processing entities.

Figure 10:
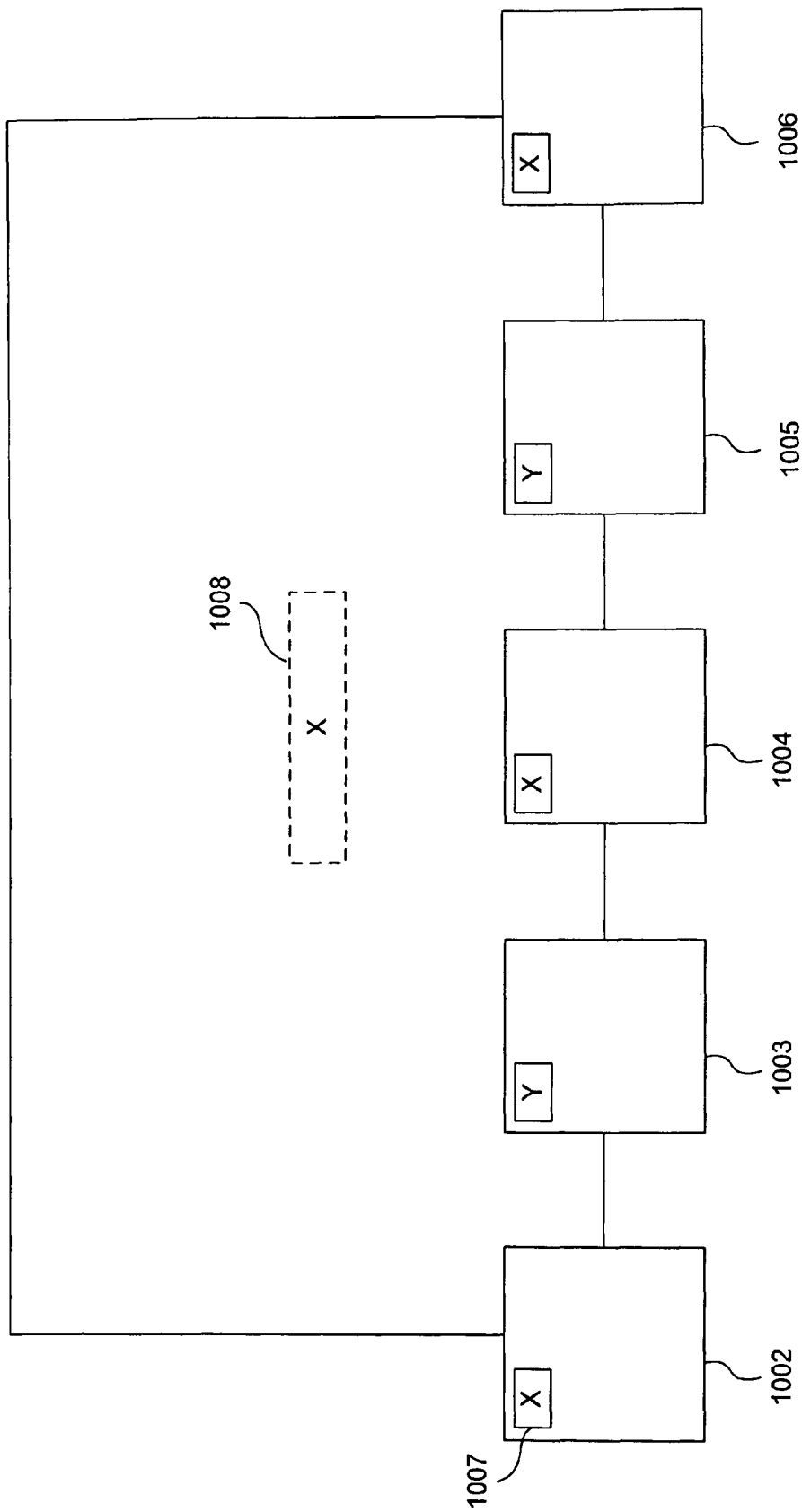
FIG. 10 illustrates determination of the current value of a distributed storage register by means of a quorum.

Operation of the distributed storage register is based on the concept of a quorum. FIG. 10 illustrates determination of the current value of a distributed storage register by means of a quorum. FIG. 10 uses similar illustration conventions as used in FIGS. 2-8. In FIG. 10, each of the processes or processing entities 1002-1006 maintains the local variable, val-ts, such as local variable 1007 maintained by process or processing entity 1002, that holds a local time-stamp value for the distributed storage register. If, as in FIG. 6, a majority of the local values maintained by the various processes and/or processing entities that collectively implement the distributed storage register currently agree on a time-stamp value val-ts, associated with the distributed storage register, then the current value of the distributed storage register 1008 is considered to be the value of the variable val held by the majority of the processes or processing entities. If a majority of the processes and processing entities cannot agree on a time-stamp value val-ts, or there is no single majority-held value, then the contents of the distributed storage register are undefined. However, a minority-held value can be then selected and agreed upon by a majority of processes and/or processing entities, in order to recover the distributed storage register.

FIG. 11 shows pseudocode implementations for the routine handlers and operational routines shown diagrammatically in FIG. 9. It should be noted that these pseudocode implementations omit detailed error handling and specific details of low-level communications primitives, local locking, and other details that are well understood and straightforwardly implemented by those skilled in the art of computer programming. The routine "majority" 1102 sends a message, on line 2, from a process or processing entity $P_i$ to itself and to all other processes or processing entities $P_{j \ne i}$ that, together with $P_i$, collectively implement a distributed storage register. The message is periodically resent, until an adequate number of replies are received, and, in many implementations, a timer is set to place a finite time and execution limit on this step. Then, on lines 3-4, the routine "majority" waits to receive replies to the message, and then returns the received replies on line 5. The assumption that a majority of processes are correct, discussed above, essentially guarantees that the routine "majority" will eventually return, whether or not a timer is used. In practical implementations, a timer facilitates handling error occurrences in a timely manner. Note that each message is uniquely identified, generally with a timestamp or other unique number, so that replies received by process $P_i$ can be correlated with a previously sent message.

The routine "read" 1104 reads a value from the distributed storage register. On line 2, the routine "read" calls the routine "majority" to send a READ message to itself and to each of the other processes or processing entities $P_{j \ne i}$. The READ message includes an indication that the message is a READ message, as well as the time-stamp value associated with the local, current distributed storage register value held by process $P_i$, val-ts. If the routine "majority" returns a set of replies, all containing the Boolean value "TRUE," as determined on line 3, then the routine "read" returns the local current distributed-storage-register value, val. Otherwise, on line 4, the routine "read" calls the routine "recover."

The routine "recover" 1106 seeks to determine a current value of the distributed storage register by a quorum technique. First, on line 2, a new timestamp ts is obtained by calling the routine "newTS." Then, on line 3, the routine "majority" is called to send ORDER&READ messages to all of the processes and/or processing entities. If any status in the replies returned by the routine "majority" are "FALSE," then "recover" returns the value NIL, on line 4. Otherwise, on line 5, the local current value of the distributed storage register, val, is set to the value associated with the highest value timestamp in the set of replies returned by routine "majority." Next, on line 6, the routine "majority" is again called to send a WRITE message that includes the new timestamp ts, obtained on line 2, and the new local current value of the distributed storage register, val. If the status in all the replies has the Boolean value "TRUE," then the WRITE operation has succeeded, and a majority of the processes and/or processing entities now concur with that new value, stored in the local copy val on line 5. Otherwise, the routine "recover" returns the value NIL.

The routine "write" 1108 writes a new value to the distributed storage register. A new timestamp, ts, is obtained on line 2. The routine "majority" is called, on line 3, to send an ORDER message, including the new timestamp, to all of the processes and/or processing entities. If any of the status values returned in reply messages returned by the routine "majority" are "FALSE," then the value "NOK" is returned by the routine "write," on line 4. Otherwise, the value val is written to the other processes and/or processing entities, on line 5, by sending a WRITE message via the routine "majority." If all the status vales in replies returned by the routine "majority" are "TRUE," as determined on line 6, then the routine "write" returns the value "OK." Otherwise, on line 7, the routine "write" returns the value "NOK." Note that, in both the case of the routine "recover" 1106 and the routine "write," the local copy of the distributed-storage-register value val and the local copy of the timestamp value val-ts are both updated by local handler routines, discussed below.

Next, the handler routines are discussed. At the onset, it should be noted that the handler routines compare received values to local-variable values, and then set local variable values according to the outcome of the comparisons. These types of operations may need to be strictly serialized, and protected against race conditions within each process and/or processing entity for data structures that store multiple values. Local serialization is easily accomplished using critical sections or local locks based on atomic test-and-set instructions. The READ handler routine 1110 receives a READ message, and replies to the READ message with a status value that indicates whether or not the local copy of the timestamp val-ts in the receiving process or entity is equal to the timestamp received in the READ message, and whether or not the timestamp ts received in the READ message is greater than or equal to the current value of a local variable ord-ts. The WRITE handler routine 1112 receives a WRITE message determines a value for a local variable status, on line 2, that indicates whether or not the local copy of the timestamp val-ts in the receiving process or entity is greater than the timestamp received in the WRITE message, and whether or not the timestamp ts received in the WRITE message is greater than or equal to the current value of a local variable ord-ts. If the value of the status local variable is "TRUE," determined on line 3, then the WRITE handler routine updates the locally stored value and timestamp, val and val-ts, on lines 4-5, both in dynamic memory and in persistent memory, with the value and timestamp received in the WRITE message. Finally, on line 6, the value held in the local variable status is returned to the process or processing entity that sent the WRITE message handled by the WRITE handler routine 1112.

The ORDER&READ handler 1114 computes a value for the local variable status, on line 2, and returns that value to the process or processing entity from which an ORDER&READ message was received. The computed value of status is a Boolean value indicating whether or not the timestamp received in the ORDER&READ message is greater than both the values stored in local variables val-ts and ord-ts. If the computed value of status is "TRUE," then the received timestamp ts is stored into both dynamic memory and persistent memory in the variable ord-ts.

Similarly, the ORDER handler 1116 computes a value for a local variable status, on line 2, and returns that status to the process or processing entity from which an ORDER message was received. The status reflects whether or not the received timestamp is greater than the values held in local variables val-ts and ord-ts. If the computed value of status is "TRUE," then the received timestamp ts is stored into both dynamic memory and persistent memory in the variable ord-ts.

Using the distributed storage register method and protocol, discussed above, shared state information that is continuously consistently maintained in a distributed data-storage system can be stored in a set of distributed storage registers, one unit of shared state information per register. The size of a register may vary to accommodate different natural sizes of units of shared state information. The granularity of state information units can be determined by performance monitoring, or by analysis of expected exchange rates of units of state information within a particular distributed system. Larger units incur less overhead for protocol variables and other data maintained for a distributed storage register, but may result in increased communications overhead if different portions of the units are accessed at different times. It should also be noted that, while the above pseudocode and illustrations are directed to implementation of a single distributed storage register, these pseudocode routines can be generalized by adding parameters identifying a particular distributed storage register, of unit of state information, to which operations are directed, and by maintaining arrays of variables, such as val-ts, val, and ord-ts, indexed by the identifying parameters.

Disk Paxos

Figure 12:
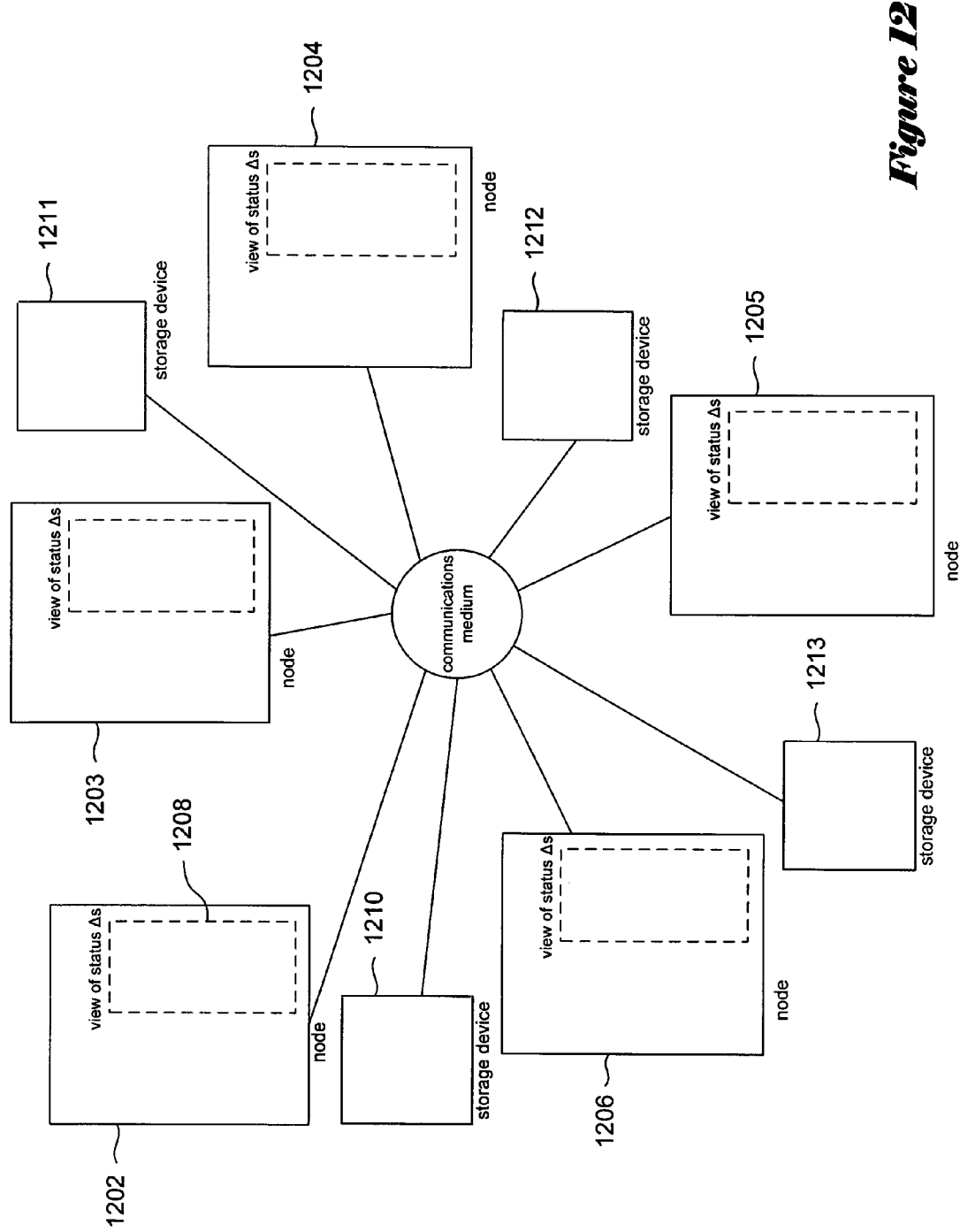
FIG. 12 illustrates a disk-Paxos or active-disk-Paxos distributed computer system.

Disk Paxos and active-disk Paxos are two additional distributed-computing techniques similar to Paxos. However, while Paxos distributes a global, master list of committed state-change requests over the nodes of a distributed computer system, disk Paxos and active-disk Paxos distribute a global list of state changes over a number of mass-storage devices. FIG. 12 illustrates a disk-Paxos or active-disk-Paxos distributed computer system. As shown in FIG. 12, each computing node 1202-1206 includes a view of the global state-change list, such as the view 1208 in node 1202. A global state-change list is distributed across mass-storage devices 1210-1213. In disk Paxos and active disk Paxos, a quorum of mass-storage devices, rather than computing nodes, is required for committing state-change requests. Thus, state-change requests may succeed in a disk Paxos or active disk Paxos system when even a single computing node is active. Active-disk Paxos involves different classes of disk nodes, with the disk nodes of only one class involved in quorums, and with better scalability to large systems. Both disk Paxos and active-disk Paxos provide functionality equivalent to Paxos. All three protocols allow for maintaining a shared, ordered, sequential, global list of committed state changes across the entire distributed computer system, allow individual nodes of a distributed computer system to request state changes, and resolve request-submission contention.

Strong-Leader Self Election

A robust and reliable strong-leader election method within a distributed computer system can be implemented by using a quorum-based distributed consensus system, such as Paxos, along with two additional functionalities included in each node of the distributed system. A strong leader is a leader that, once acquiring a leadership role, continues in the leadership role for an extended period of time or over an extended computational process. By contrast, a weak leader assumes a leadership role only for a particular, well-bounded task or period of time, after which all or a large number of nodes contend for the leadership role for a subsequent, well-bounded task or period of time.

Figure 13:
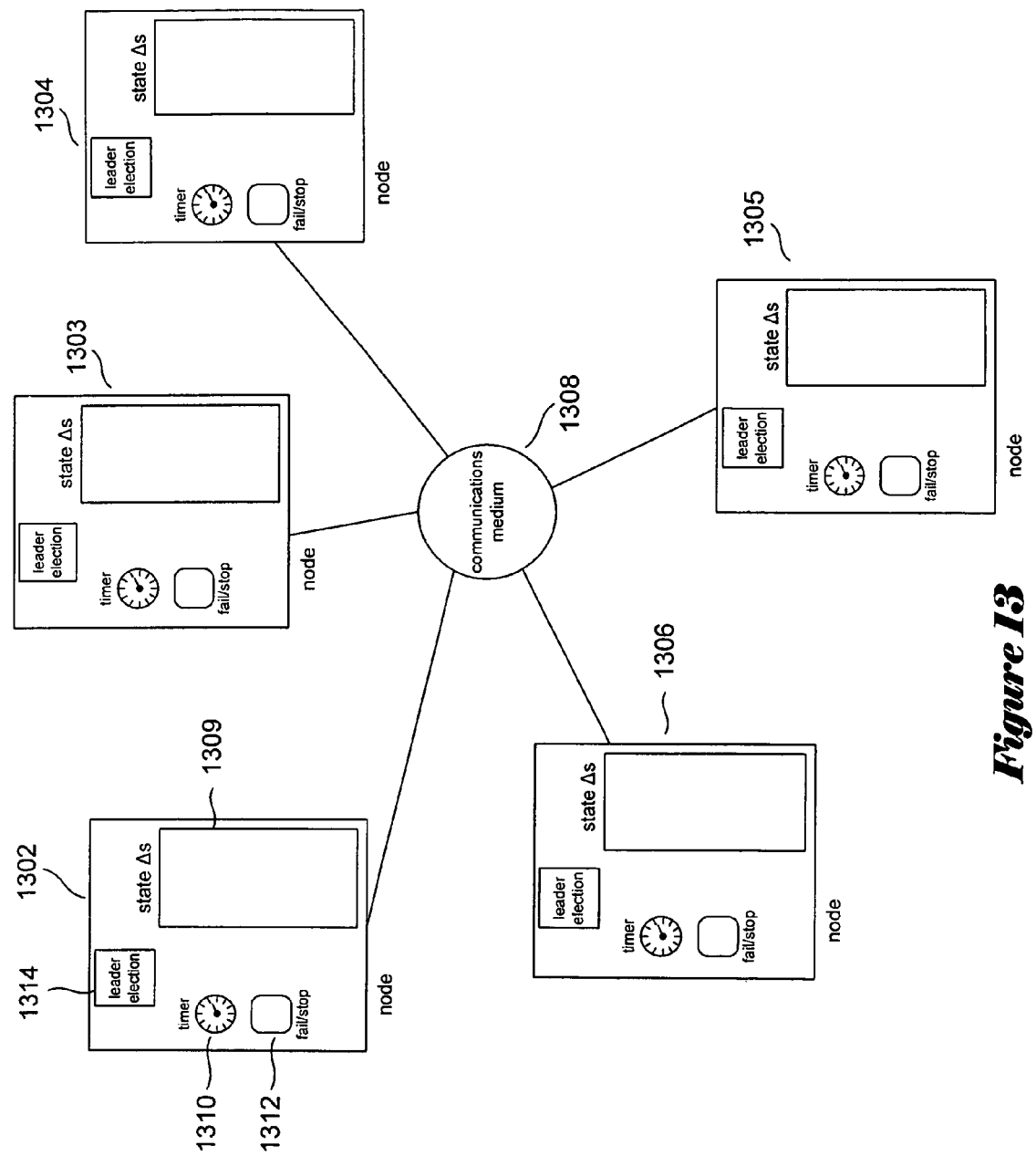
FIG. 13 illustrates an exemplary distributed computer system in which strong-leader election may be practiced.

FIG. 13 illustrates an exemplary distributed computer system in which strong-leader election may be practiced. In FIG. 13, five computing nodes 1302-1306 are linked together by a communications medium 1308. Each node includes a local state-change list or view of a global state-change list, such as state-change list 1309 in node 1302, provided according to a Paxos, disk-Paxos, or Paxos-like distributed consensus service or a distributed-storage-register-based consensus service. Each node also includes timing functionality, such as timing functionality 1310 in node 1302, a fail-stop mechanism, such as fail-stop mechanism 1312 in node 1302, and leader-election functionality, generally implemented in software or firmware, such as leader-election functionality 1314 in node 1302.

The timing functionality includes a node clock that indicates regular intervals in time, such as milliseconds, generally with monotonically increasing values based on an arbitrary starting point. The timing functionalities of all of the nodes are synchronized at some level of precision. In other words, any disparities between times indicated by timing functionalities of the different nodes of a distributed computer system, at any given instant in time, are less than a maximum disparity value. Associated with the timing functionality are software and/or hardware timers that can be set to expire, and to provide notice of expiration, after an arbitrary interval of time.

The fail-stop functionality provides a means to signal a fail-stop condition and discontinue computation related to the signaled fail-stop condition. It is desirable that the fail-stop functionality be implemented at least partially in hardware, to ensure that time lags between recognition of a fail-stop condition and fail-stop signaling are minimized. For example, a fail-stop device may involve high-priority hardware interrupts and non-blocking interrupt handlers.

The leader-election functionality, generally implemented in software, or firmware, or a combination of software and firmware, implements the strong-leader election method of the present invention. The leader-election functionality is described below, using several control-flow diagrams. In general, the strong-leader election methods of the present invention provide for self election by nodes. Nodes issue Paxos or Paxos-like state-change requests to request that they become the leader for a next lease period. The current leader, if still active, is provided an advantage of requesting re-election at time part-way through the current lease period as which the current leader's request for re-election is unopposed.

It is assumed that, upon node initialization or upon re-initialization of a node following failure and recovery of the node, the timing functionality of the node is synchronized with the timing functionalities of the other, active nodes within the distributing computing system. Furthermore, all nodes are initialized or re-initialized to include a constant time value LEASE, which represents the length, in time increments, of a lease period for holding a leadership role, and to include a value n that is used to generate, by division, a fraction of the lease time LEASE at which current leaders request re-election. The leader re-election request period, LEASE/n, needs to be sufficiently less than the lease period that a current leader succeeds in re-election despite network delays, scheduling delays, intra-node timer misalignment, and other such potential sources of delay.

Figure 14:
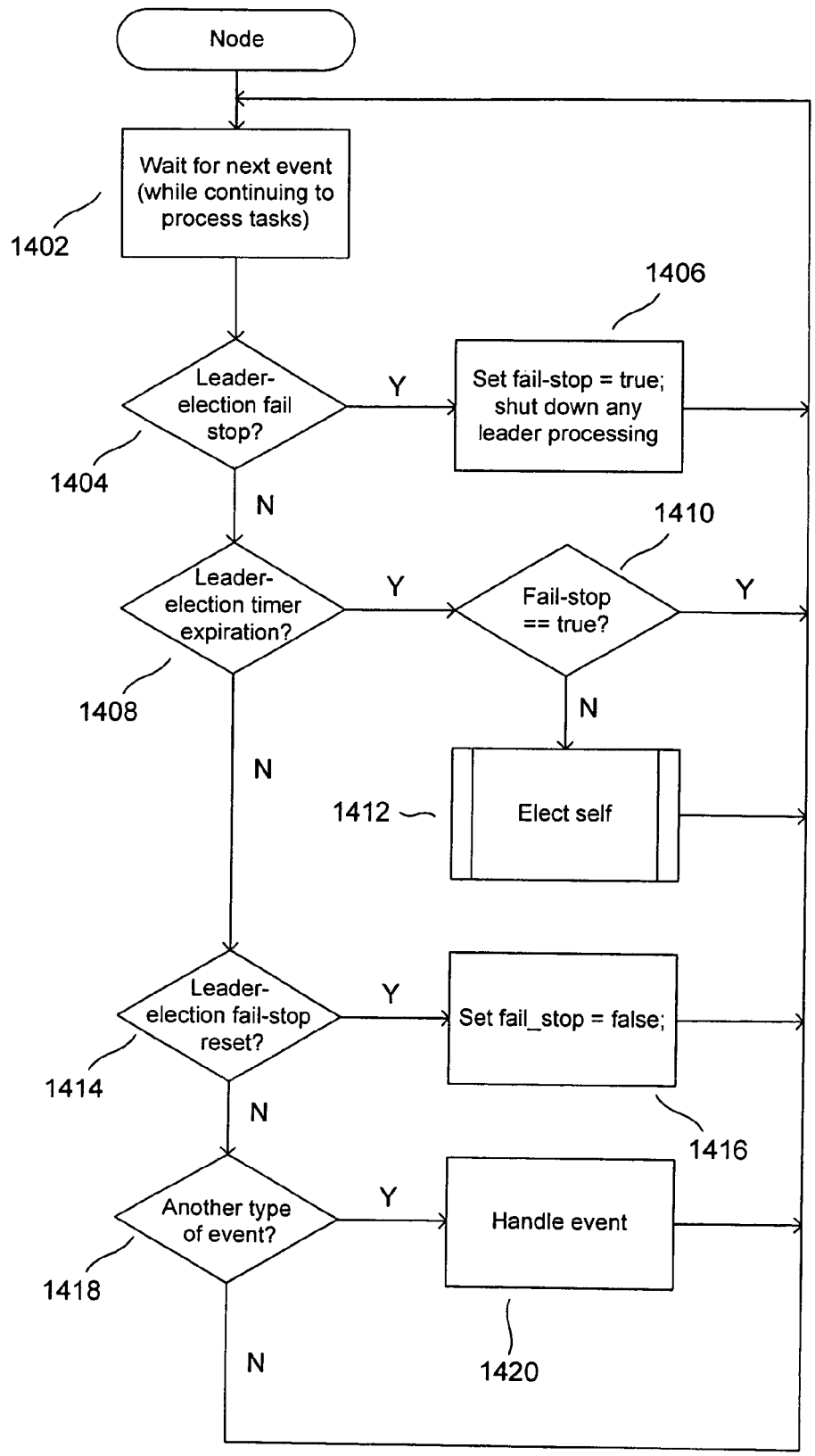
FIG. 14 is a control-flow diagram illustrating general node operation and strong-leader election.

FIG. 14 is a control-flow diagram illustrating general node operation and strong-leader election. Node operation can be considered, at a high level, to be an endless loop in which the node recognizes and handles events. It is assumed that, when events occur simultaneously, event processing hardware and software sequentially order and prioritize the events, such as the interrupt ordering and prioritization that occurs within operating systems. In step 1402 of the endless loop, the node waits for a next event, while continuing to process any computational tasks currently being executed by one or more processes or threads within the node. Upon occurrence of an event, the node first determines, in step 1404, whether a leader-election fail-stop event has occurred. If so, then in step 1406, the node sets a node global variable fail_stop to TRUE, and may additionally actively shut down any current processing activities related to a leadership role previously assumed by the node. In alternative embodiments, in which it is important that a leader that has failed to re-elect itself immediately halt any leader-role-related processing, a hardware-reset may instead be generated by a hardware timer, to immediately halt leader operation. If a leadership-election fail-stop event has not occurred, then in step 1408, the node checks whether a leader-election timer has expired. If a leader-election timer has expired, then, in step 1410, the node determines whether the global node variable fail_stop is TRUE. If so, then no action is taken. Otherwise, the node executes the "elect self" routine, in step 1412, to be discussed below. If a leader-election timer expiration has not occurred, then, in step 1414, the node determines whether a leader-election fail-stop-reset event has occurred. If so, then the global node variable fail_stop is set to FALSE, in step 1416. If a leader-election fail-stop-reset event has not occurred then, in step 1418, another event has been detected, then that event is handled in step 1420. In other words, step 1420 represents handling of myriad non-leader-election-related events that occur within a node during node operation. In summary, a node carries out computational tasks while, at the same time, monitoring for the occurrence of leader-election fail-stop events, leader-election fail-stop-reset events, and expiration of leader-election timers. When a leader-election fail-stop event occurs, the node discontinues processing any leader-related tasks. When a leader-election timer expires, the node calls the routine "elect self," described below, to attempt to elect itself to a leadership role.

Figure 15:
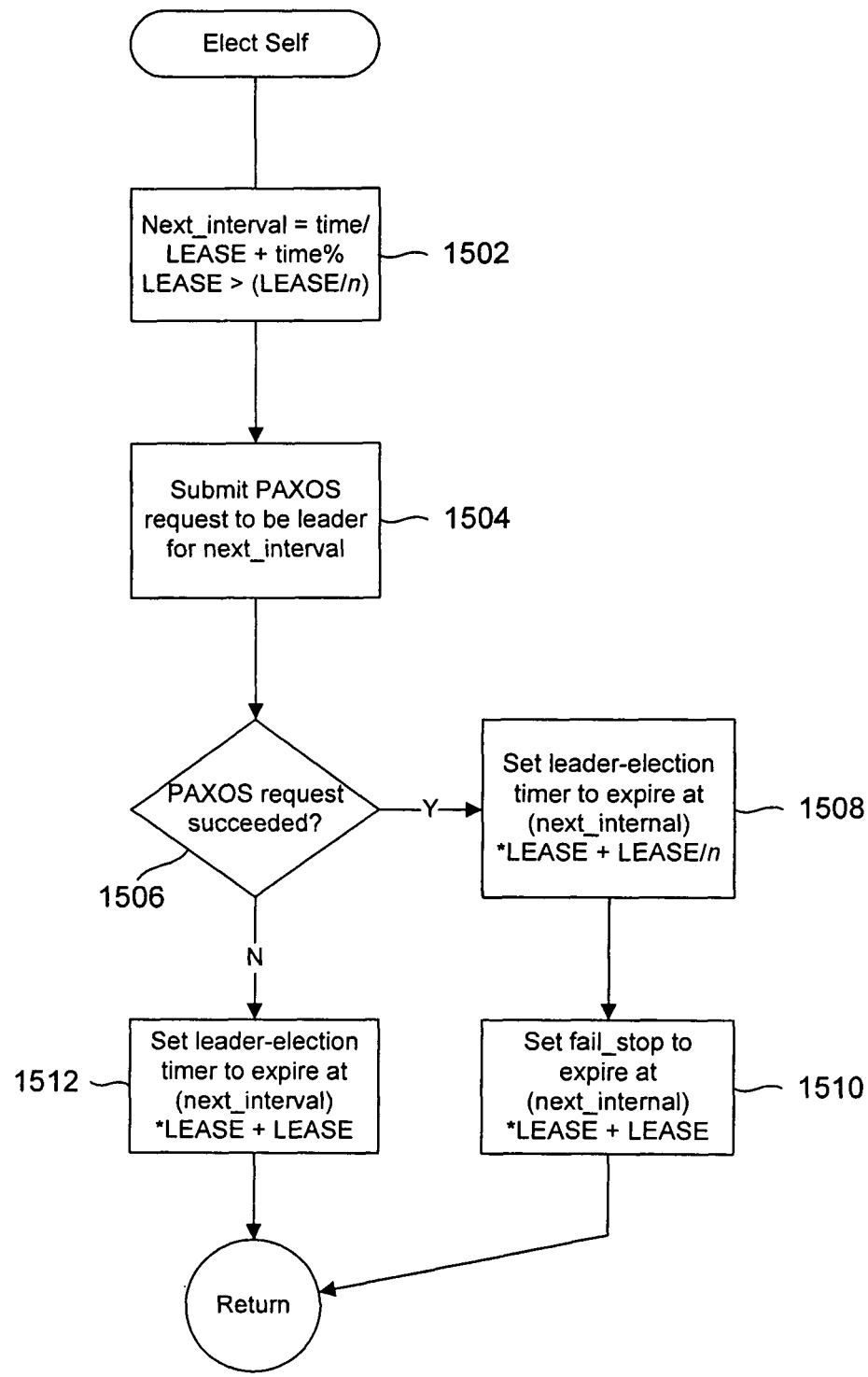
FIG. 15 is a control-flow diagram illustrating the routine "elect self."

FIG. 15 is a control-flow diagram illustrating the routine "elect self." In step 1502, the routine determines the value for a next lease interval next_interval. In the embodiment shown in FIG. 15, a next-interval value is determined by integer division of the current time by the LEASE period, with the value incremented when the current time is closer to onset of a subsequent lease interval than to onset of the current lease interval. Next, in step 1504, the routine issues a Paxos state-change request requesting that the node be designated leader for the lease period indicated by the value of the variable next_interval. If the request succeeds, as determined in step 1506, then the node has become the leader for the next lease period, and sets the leader-election timer to expire at a fraction LEASE/n of the next lease interval in step 1508. The node then sets the fail-stop functionality to expire at the end of the next lease period in step 1510. The node then assumes a leadership role for the next lease time period. Otherwise, if the Paxos request does not succeed, then, in step 1512, the node sets the leader-election timer to expire at the end of the next lease period. By setting the leader-election timers to a fraction of the next lease period, in step 1508, when the node is the leader, the node ensures that, should the node continue to be active, the node will always request re-election unopposed by other nodes within the distributed computer system.

Figure 16A:
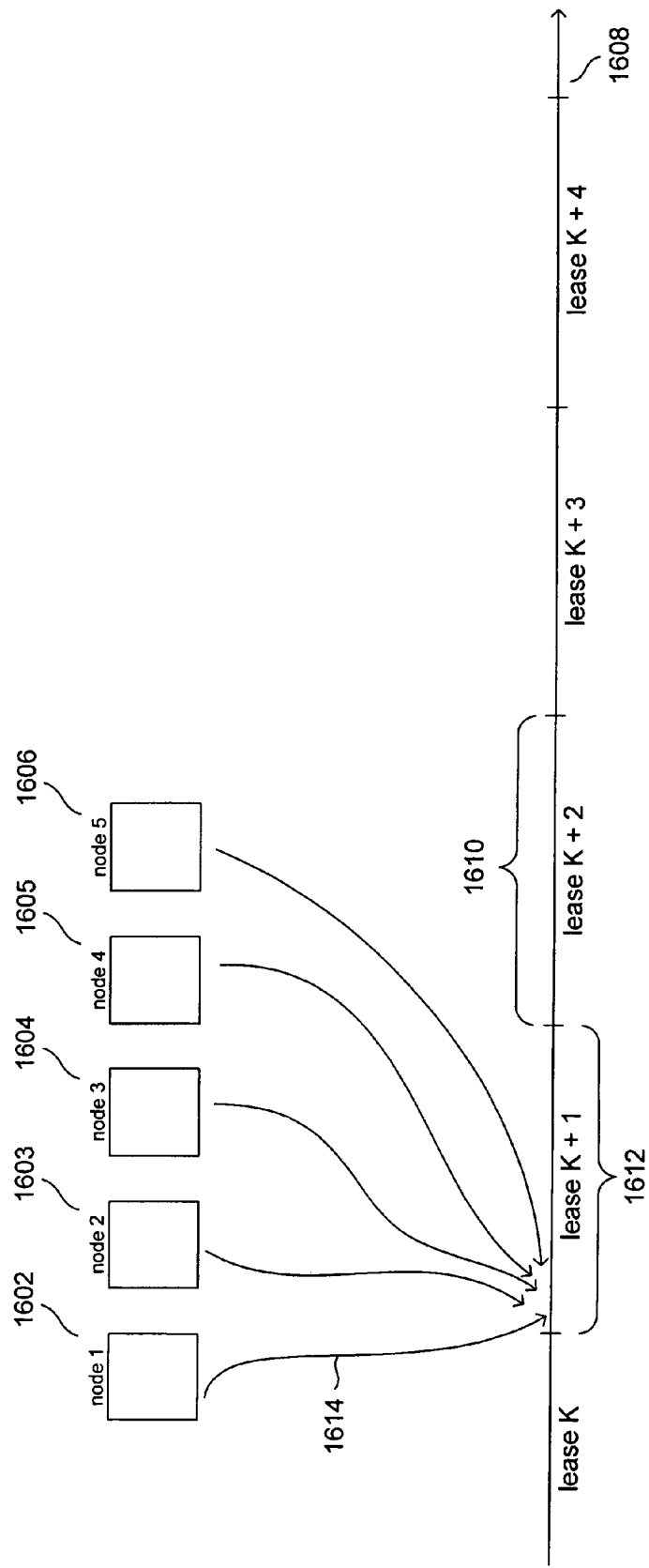

FIGS. 16A-G illustrate the strong-leader election method. FIGS. 16A-G all use the same illustration conventions, next described with reference to FIG. 16A. In FIG. 16A, there are five nodes (nodes 1-5) 1602-1606. Events are discussed with respect to a time line 1608 that is divided into discrete, contiguous lease periods, such as lease period 1610. In FIG. 16A, no node is currently leader, and all nodes have been initialized to contend for a leadership role as soon as the lease period k+1 1612 begins. The request for a leadership role is represented for each node by an arrow pointing to the time line, such as arrow 1614 representing a request for the leadership role made by node 1602.

Figure 16B:
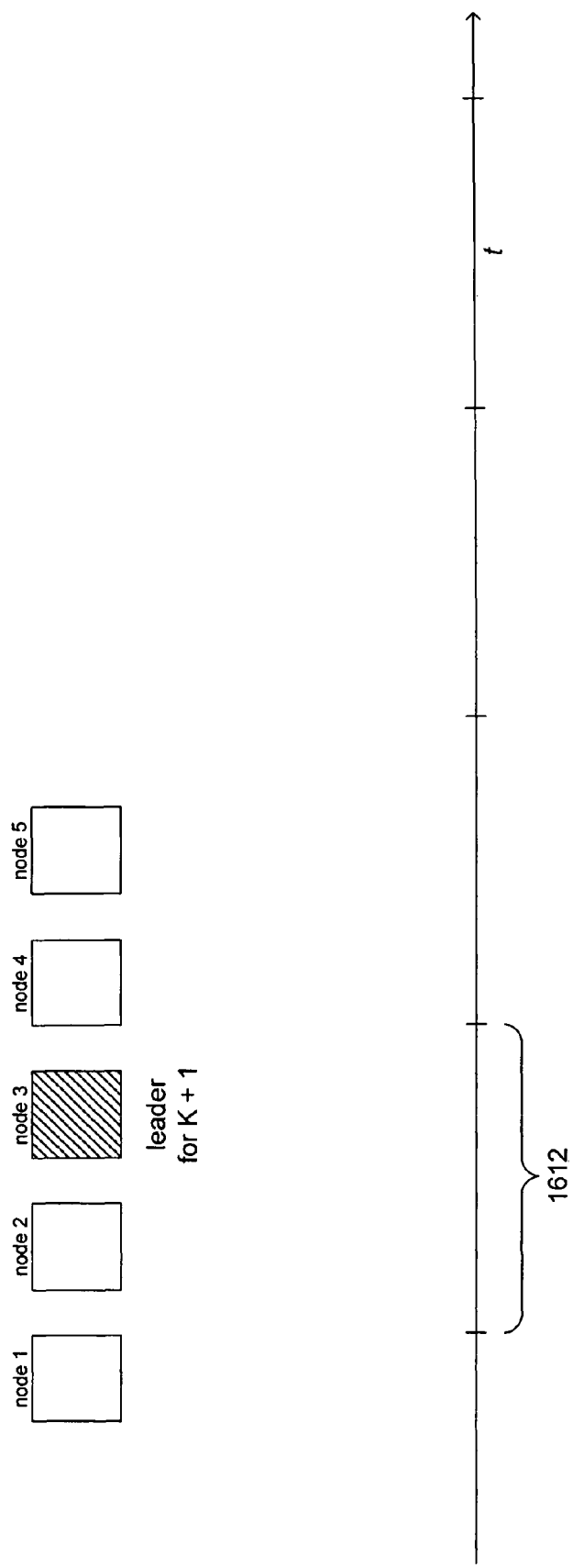

According to the Paxos protocol, only one of the simultaneous or close-to-simultaneous requests for the leadership role, shown in FIG. 16A, succeeds. Assuming that the request issued by node 3 1604 succeeds, then, as shown in FIG. 16B, node 3 is designated as the leader for lease period k+1 1612, and immediately begins to execute leader-related processing.

Figure 16C:
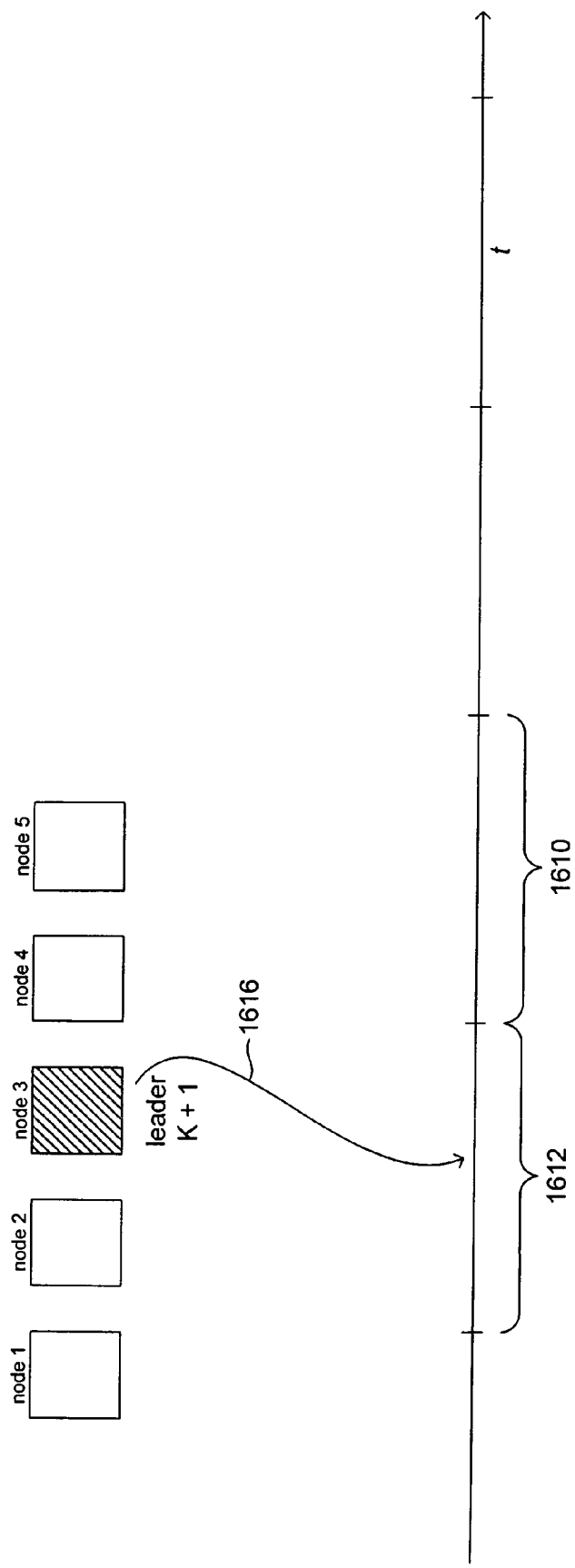
Figure 16E:
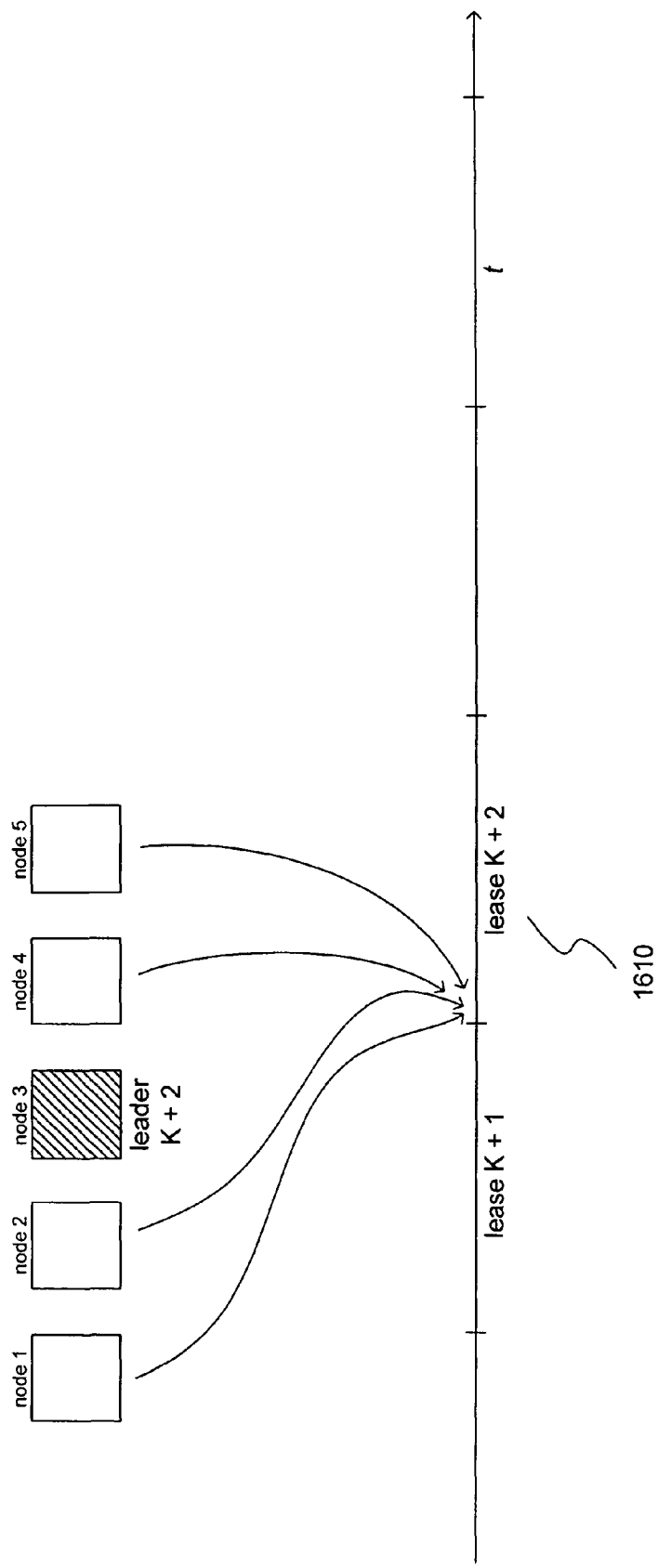

As shown in FIG. 16C, assuming n is equal to 2, node 3 requests the leadership role for the next lease period k+2 1610 halfway through the current lease period 1612, as represented by arrow 1616. Because all other, non-leader nodes wait until the start of the next lease period to request a leadership role, the request by node 3 proceeds unopposed, and therefore succeeds. Node 3 is designated the leader both for the current lease period k+1 and for the subsequent lease period k+2. At the beginning of lease period k+2 1610, as shown in FIG. 16E, the remaining nodes issue leadership-role requests, following the expiration of their leader-election timers. However, node 3 has already succeeded in obtaining leadership for lease period n+2, so these requests fail. Although not shown in a control-flow diagram, a Paxos, Paxos-like, or distributed-storage-register protocol is supplemented so refuse a second and any additional, subsequent requests for the leadership role for a particular lease period. Disk Paxos and active-disk Paxos do not need to be so supplemented, since these distributed consensus services fail a request made by a node or process that is not locally updated to see all recent state changes made by other nodes or processes. As long as node 3 continues to operate, node 3 remains the leader.

Figure 16G:
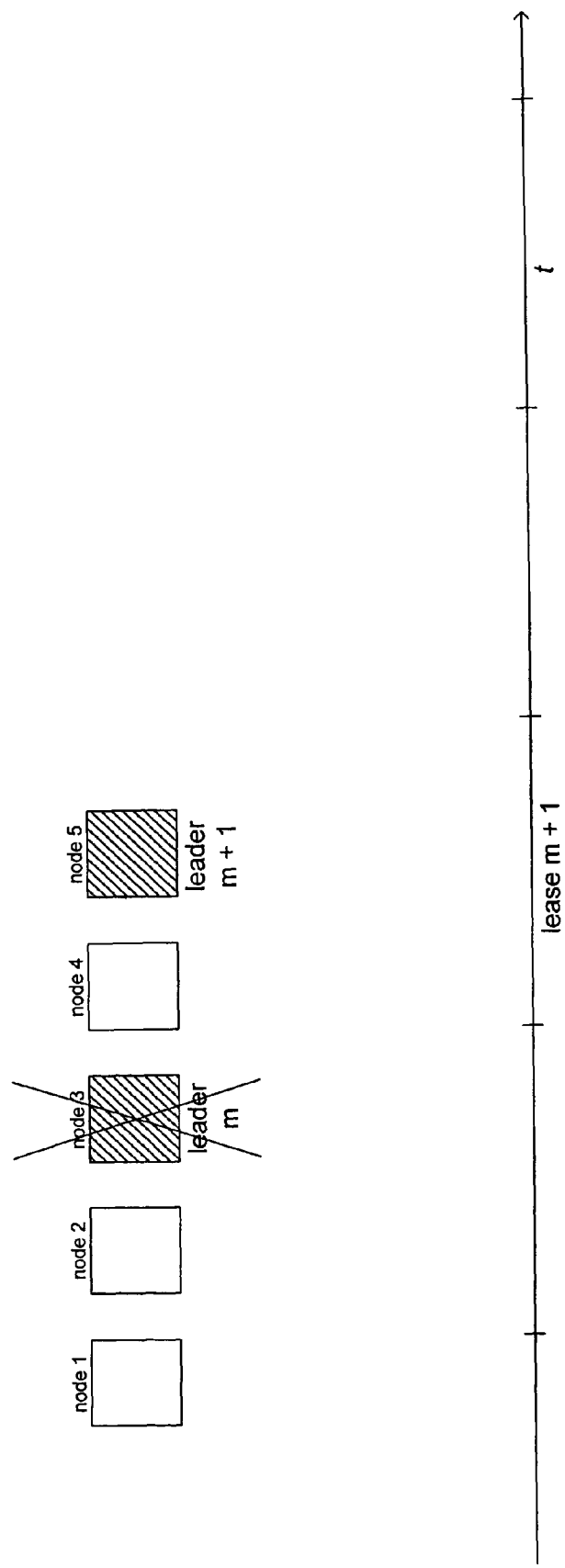

If, as shown in FIG. 16F, node 3 fails prior to the point LEASE/n within lease period m, then node 3 will fail to request a leadership role for lease period m+1 1622. Therefore, when the remaining non-leader nodes request a leadership role at the beginning of lease period m+1, one of the other nodes will assume leadership for lease period m+1 as shown in FIG. 16G.

The strong-leader-election method therefore ensures that, even when a leader node fails, the leadership role resumes at most after a period equal to the lease period plus the fractional lease period at which leader nodes request re-election. Furthermore, once elected to a leadership role, a node can retain the leadership role as long as the node remains active and desires the leadership role. At any point in time, the leader node may surrender the leadership role by failing to request the leadership role for the subsequent lease period and optionally disabling fail-safe functionality.

While the above-described embodiment employs roughly synchronized, absolute-time-reflecting node clocks, alternative implementations use unsynchronized delay timers in each node. FIG. 17 illustrates, in similar fashion to FIG. 13, an alternative distributed computer system in which strong-leader election may be practiced. In FIG. 17, six computing nodes 1702-1707 are linked together by a communications medium 1708. Each node includes a local view of a global variable indicating the current leader node, such as local view 1709 in node 1702, provided according to a Paxos, disk-Paxos, or Paxos-like distributed consensus service or a distributed-storage-register-based consensus service. Each node also includes a local delay timer, such as local delay timer 1710 in node 1702, a fail-stop mechanism, such as fail-stop mechanism 1712 in node 1702, and leader-election functionality, generally implemented in software or firmware, such as leader-election functionality 1714 in node 1702. The delay timers of the nodes are not synchronized with one another, unlike the node clocks of the above, first-described embodiment of the present invention. By contrast, the fail-stop mechanisms and leader-election functionalities are similar to, and play similar roles, as the fail-stop mechanisms and leader-election functionalities in the above, first-described embodiment of the present invention. As with the above, first-described embodiment of the present invention, each node includes, or has access to, a lease period defined by a constant LEASE and a fractional lease period defined by a value n used to compute the fractional lease period as LEASE/n. The control-flow diagram illustrating general node operation shown in FIG. 14 is applicable to the alternative embodiments of the present invention, with the exception that a different routine is called in step 1412.

Figure 18A:
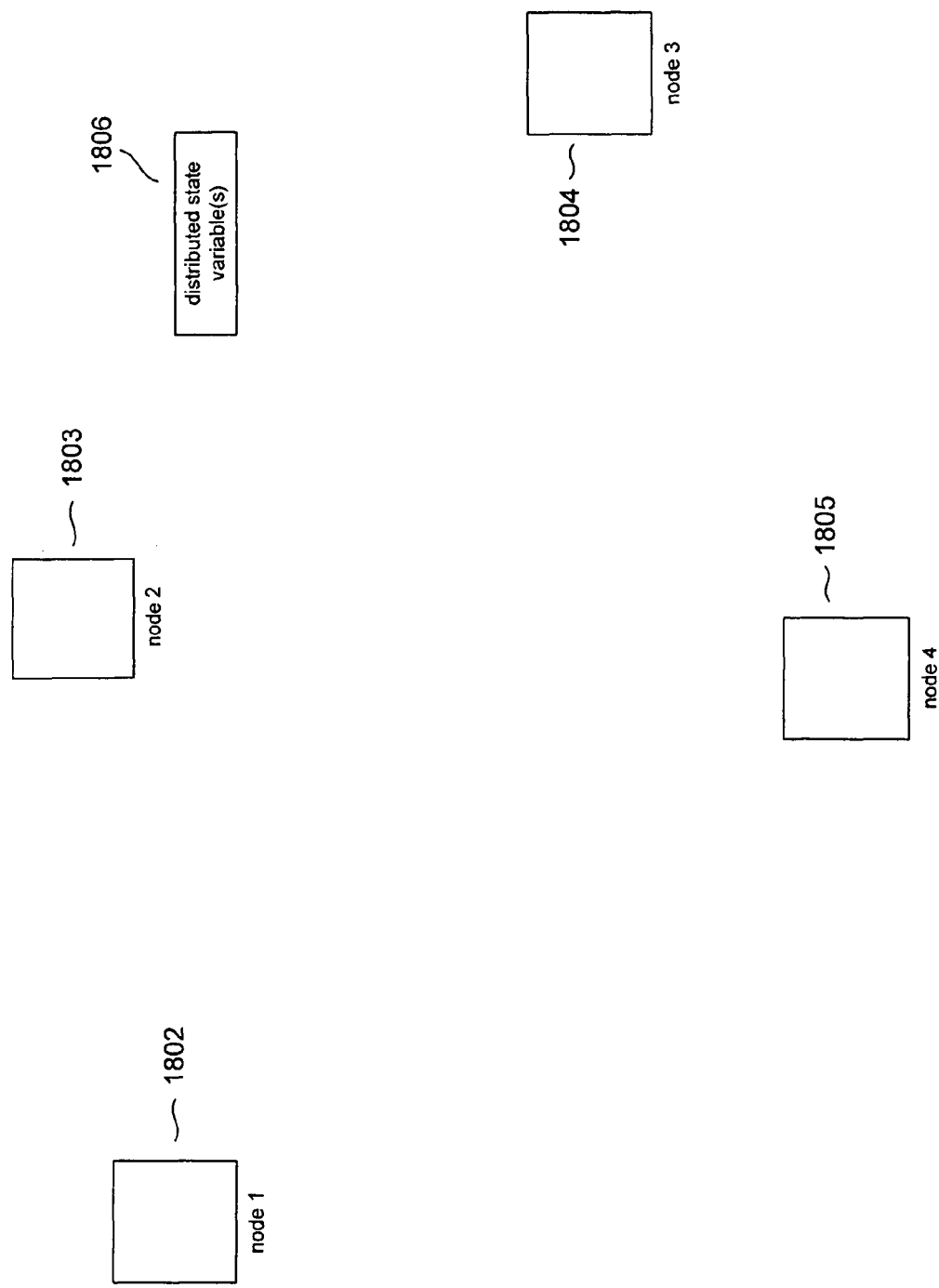
FIGS. 18A-D illustrate operation of delay-timer-based strong-leader election.
Figure 18B:
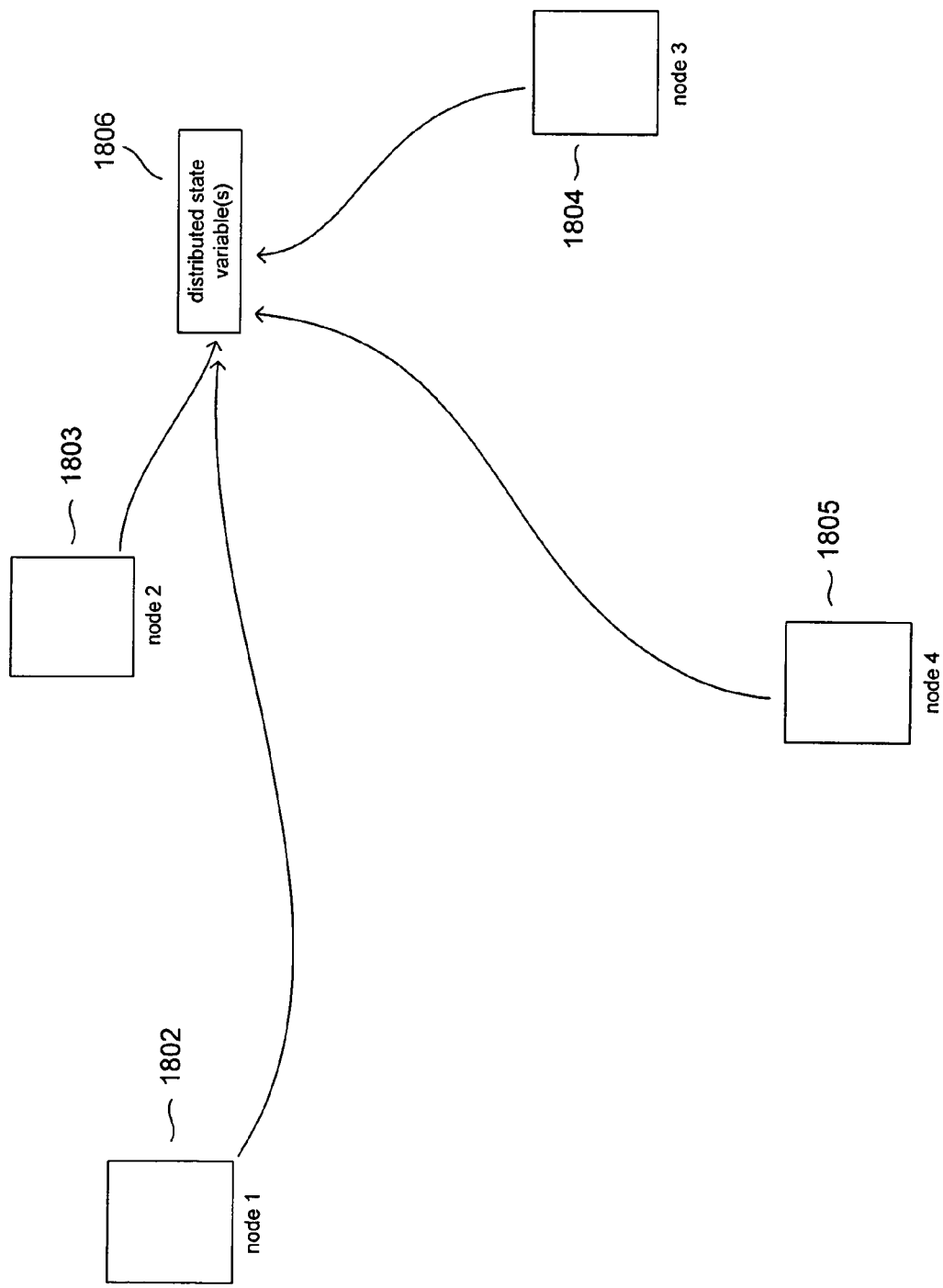
Figure 18C:
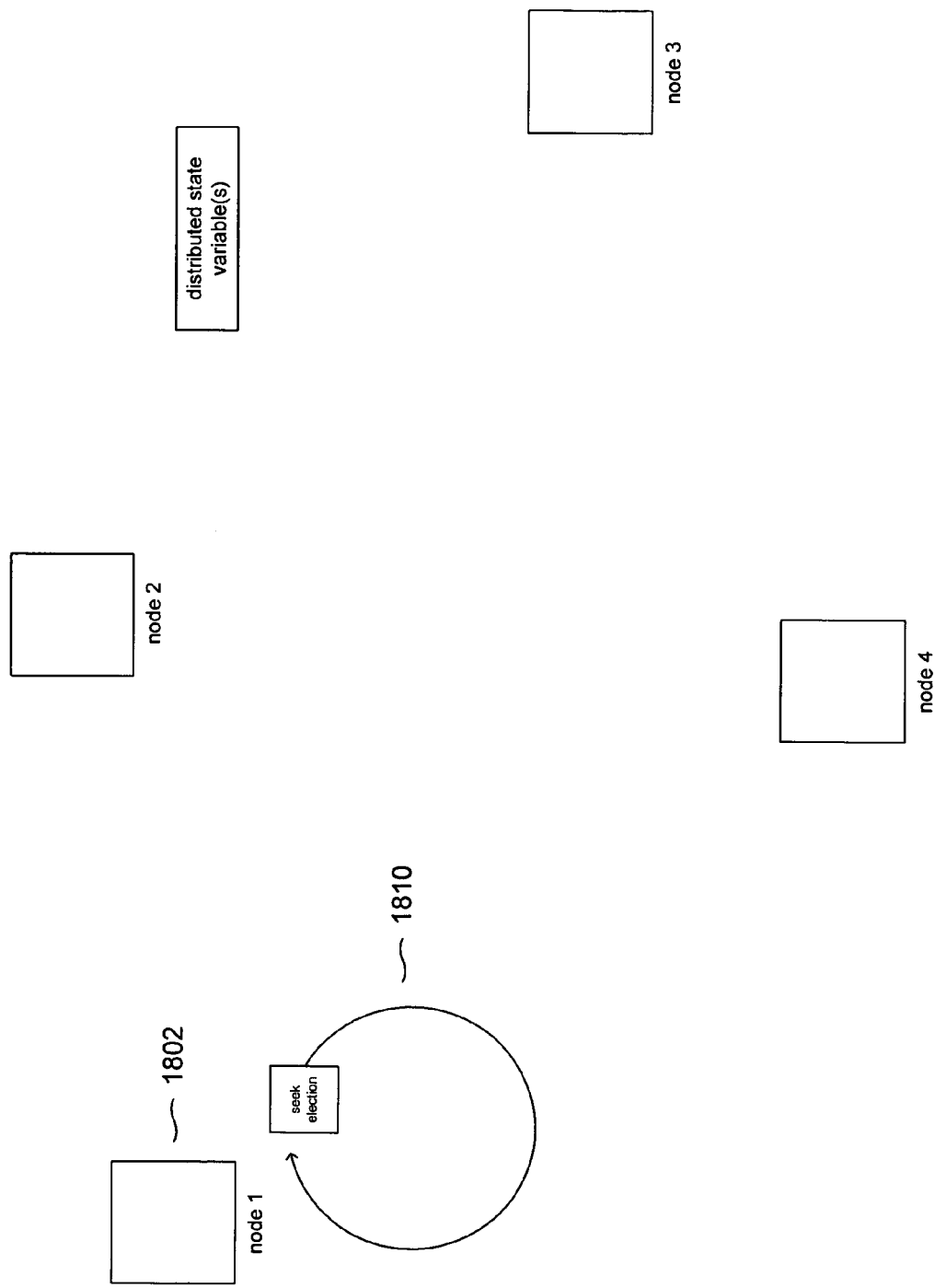
Figure 18D:
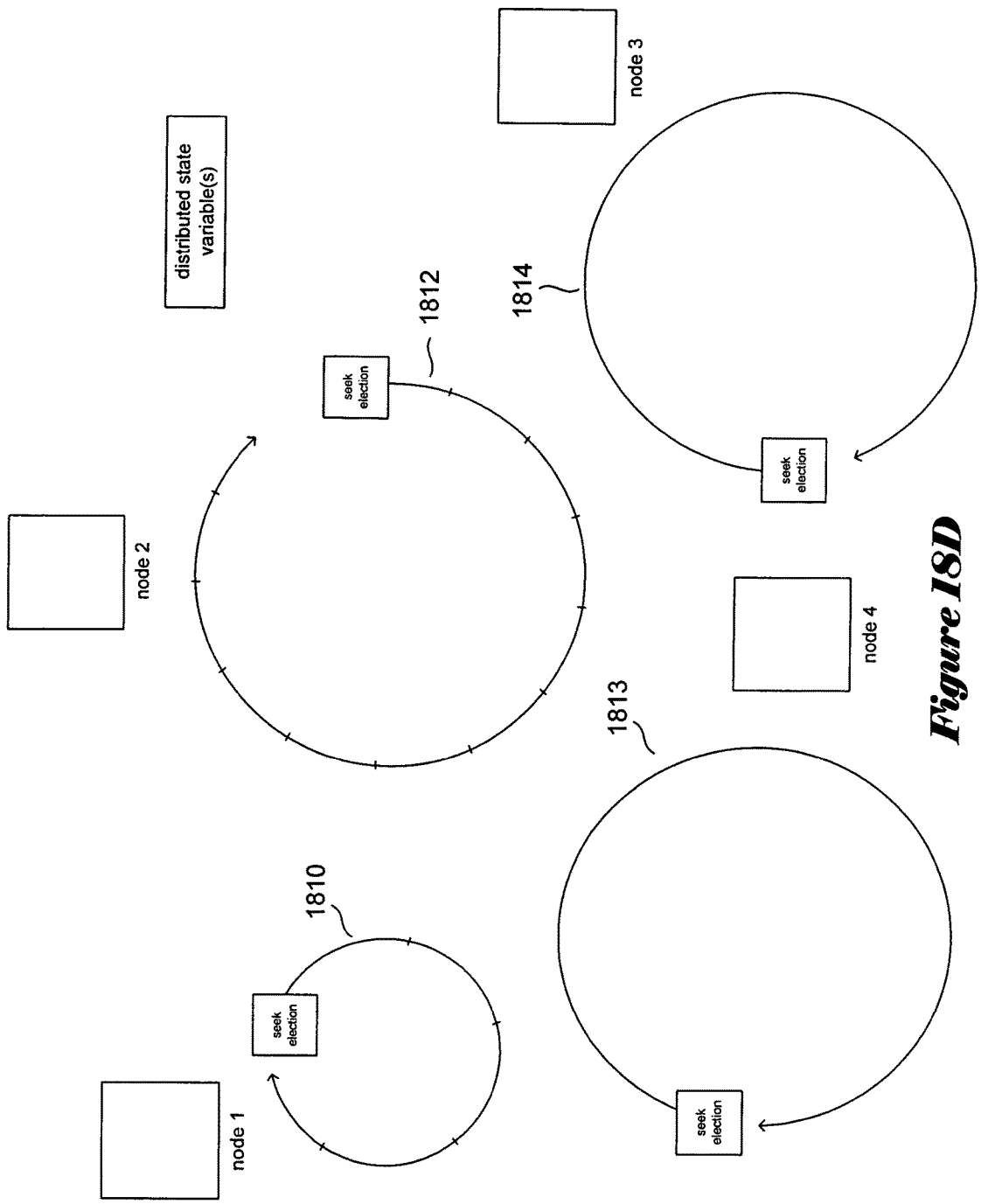

FIGS. 18A-D illustrate operation of delay-timer-based strong-leader election. In FIG. 18A, four computing nodes 1802-1805 that together employ a distributed consensus system to implement a distributed state variable or state variables 1806 that store a value indicative of the current leader node, and, in certain embodiments, other related information. At power-on, after failure of a leader node, and at other such points, some or all of the computing nodes may attempt to change the state variable in order to acquire leadership, as shown in FIG. 18B. As shown in FIG. 18C, one of the competing computing nodes is guaranteed, by the distributed consensus service, to acquire leadership, while the others' requests for leadership fail. In FIG. 18C, node 1 (1802) successfully acquired leadership, and has established a re-election cycle 1810 in which the node seeks re-election following each period of time LEASE/n. The remaining nodes 1803-1805 failed to acquire leadership, as shown in FIG. 18D, and therefore establish election cycles 1812-1814 in which each non-leader node seeks election following each period of time LEASE. In FIG. 18D, and in subsequent figures, the longer non-leader election cycles are shown as circles with larger diameters than the re-election cycle 1810 of the current leader node. In the alternative embodiments, the absolute time of each node's actions is irrelevant. Because, in the alternative embodiments, a nodes reference a local delay timer to decide when to seek election or re-election, rather than a node clock, each node may seek election at any time with respect to the actions taken by the remaining nodes, rather than within some range of times about an absolute time recognized by all nodes.

Figure 19:
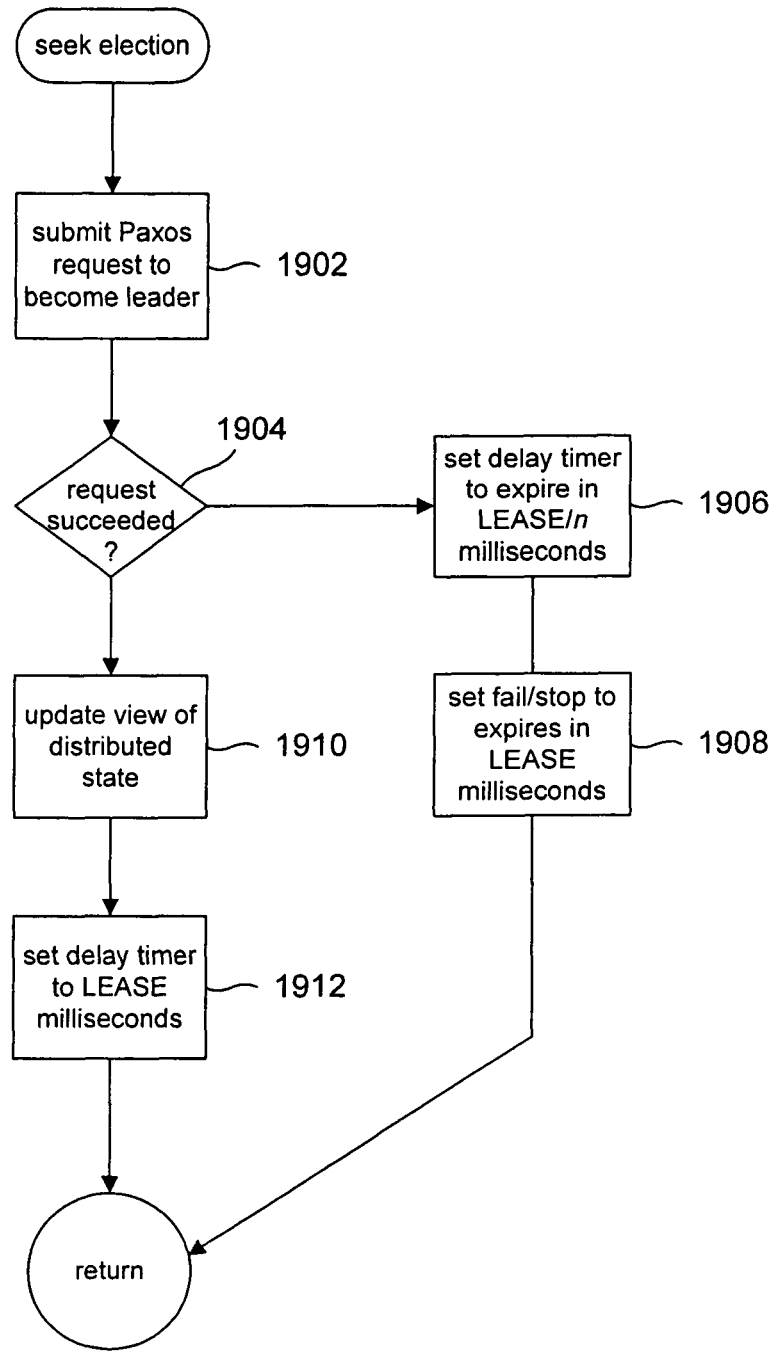
FIG. 19 is a control-flow diagram illustrating an alternative strong-leader election method.

FIG. 19 is a control-flow diagram illustrating an alternative strong-leader election method. In step 1902, the routine issues a Paxos or Paxos-like state-change request requesting that the node be designated leader. If the request succeeds, as determined in step 1906, then the node has become the leader for the next lease period, and sets the local delay timer to expire at a fraction LEASE/n of the next lease period in step 1906. The node then sets the fail-stop functionality to expire at the end of the next lease period in step 1908. Otherwise, if the Paxos or Paxos-like request does not succeed, then, in step 1910, the node updates the node's local view of the distributed state variable. Finally, in step 1912, the current node sets the current node's delay timer to the lease period LEASE, in order to again seek election for a next lease period. Otherwise, the current node has acquired leadership, and executes steps 1906 and 1908, as described above. In this embodiment of the present invention, a new leader is elected within a time of (2*LEASE)−LEASE/n.

Figure 20A:
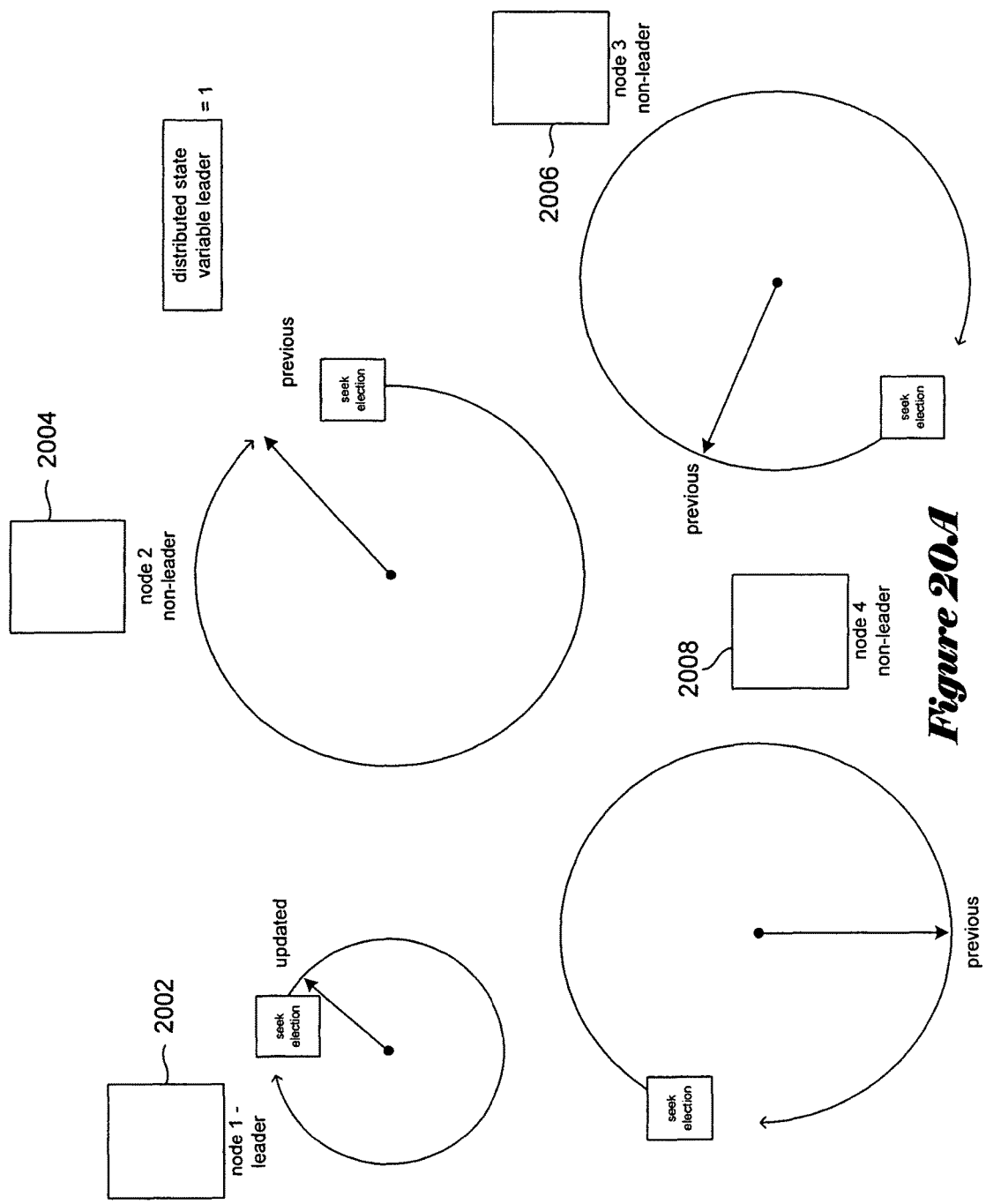
Figure 20C:
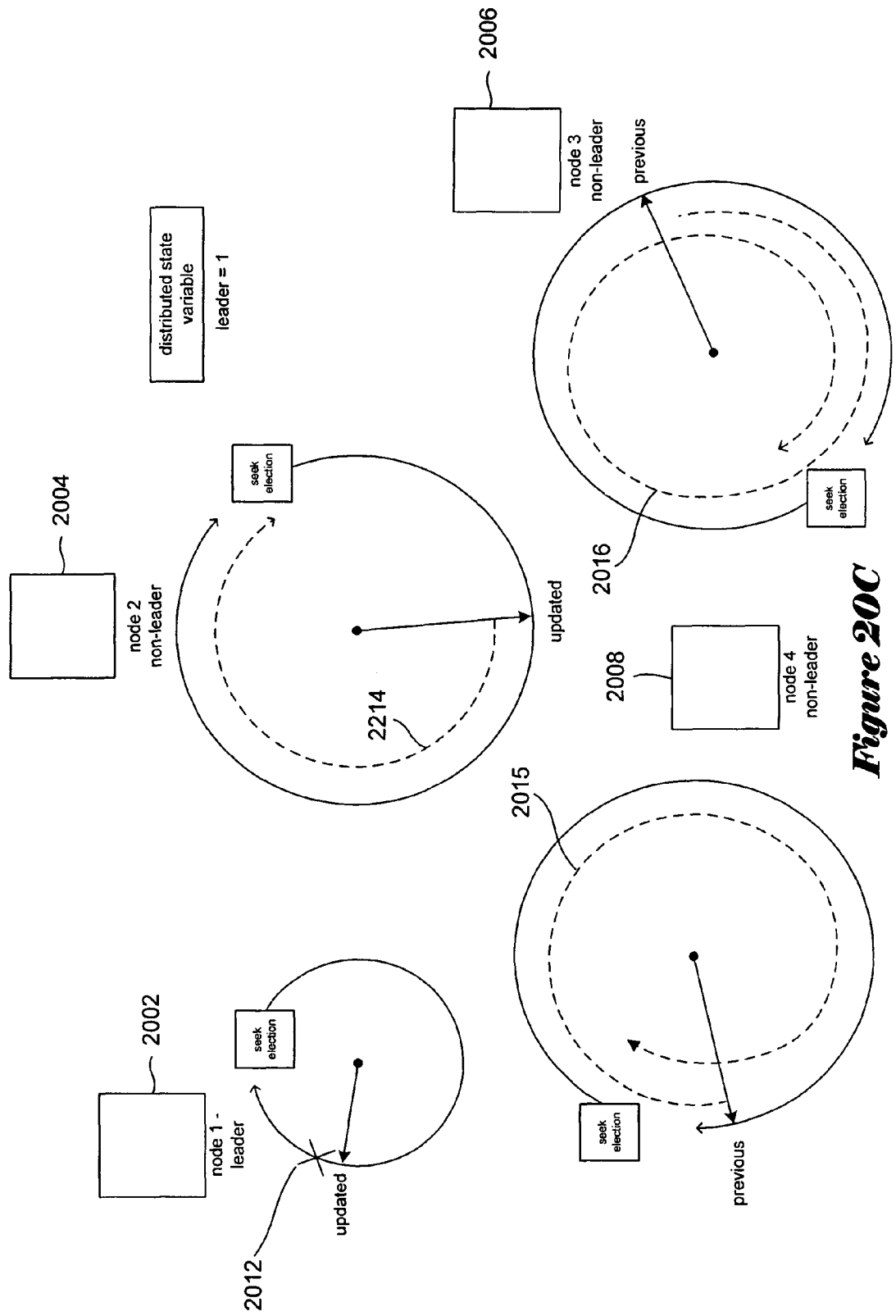

FIGS. 20A-C illustrate operation of the alternative strong-leader-election method, described above. In FIG. 20A, the current leader node 2002 has just been re-elected, and therefore has a fully updated local view of the distributed state variable. Node 2004 is just about to seek election, but does not have an updated local view of the distributed state variable. Nodes 2006 and 2008 are in different points in their respective election cycles, and do not have an updated local view of the distributed state variable. FIG. 20B shows the four-node system of FIG. 20A following additional lapse of time. The delay timers for all four nodes have advanced, with node 2004 having unsuccessfully sought election, and, as a result, having an updated local view of the distributed state variable. In FIG. 20C, the delay timers have further advanced, and the current leader node 2002 has failed, as indicated by the "X" symbol 2012 in the re-election cycle. As shown in FIG. 20C by dashed lines 2014-2016, the various non-leader nodes need different periods of time to be elected to the leadership role. Node 2004 may become the new leader in the shortest period of time 2014, since node 2004 has an updated local view of the distributed state variable. Nodes 2006 and 2008 both need to first update their local views of the distributed state variable before waiting for a lease period in order to seek election.

Embodiments of the Present Invention

The strong-leader-election method and system discussed in the previous subsection may be replicated in order to provide strong-leader election for multiple, different roles within a distributed computer system. However, in more complex distributed computer systems, there may be a great number of different roles for which leaders may need to be elected on a relatively continuous basis, with roles allocated to processes within nodes of the distributed computer system, rather than assigned to nodes. In such cases, a higher-level leader-election service may be desirable.

Figure 21:
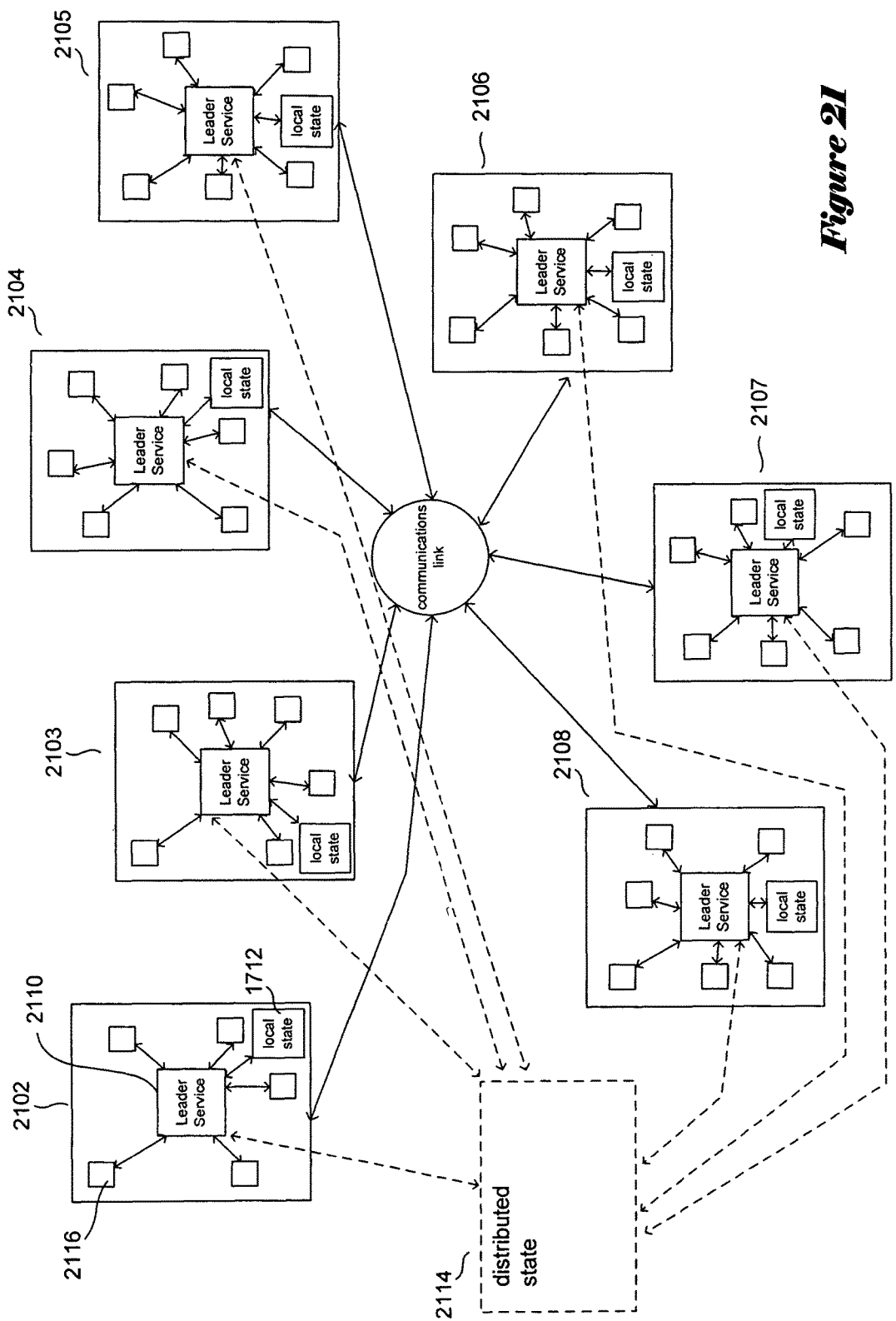
FIG. 21 illustrates a leader-election-service-based distributed computer system that represents one embodiment of the present invention.

FIG. 21 illustrates a leader-election-service-based distributed computer system that represents one embodiment of the present invention. In FIG. 21, seven nodes 2102-2108 are shown together composing a distributed computer system. Each node includes a leader-election-service process, such as leader-election-service process 2110 within node 2102. Each leader-election-service process maintains local state information 2112 within a node, and cooperates with the leader-election-service processes of the remaining nodes in order to maintain distributed state information 2114 via a distributed consensus service, such as Paxos or Disk Paxos. Client processes, such as client process 2116 within node 2102, interface to the leader-election-service process 2110 within the same node to request election to leadership roles for particular roles within the distributed computer system, as well as to renounce leadership roles assigned to them, request leadership and role information, and to carry out other leader-election-service-related activities, discussed in detail below. The leader-election-service process within each node therefore represents a centralized leader-election service to which various processes in the node may interface. The leader-election-service processes of all of the nodes of the distributed computer system cooperate to maintain distributed state information and to collect and distribute client requests to current leaders for each role within the distributed computer system.

In the described embodiment, each leader-election-service process is a distinct, continuously running process within each node. However, in alternative embodiments, the leader-election service may be implemented by library routines that run in the context of client processes. In the current discussion, the leader-election-service processes manage election of client processes within nodes to leadership of distributed-computer-system-wide roles. In alternative embodiments, the leader-election service may also manage allocation of leadership to client processes within a node with respect to intra-node roles. For intra-node roles, the leader-election service needs to access only local state information.

Figure 22:
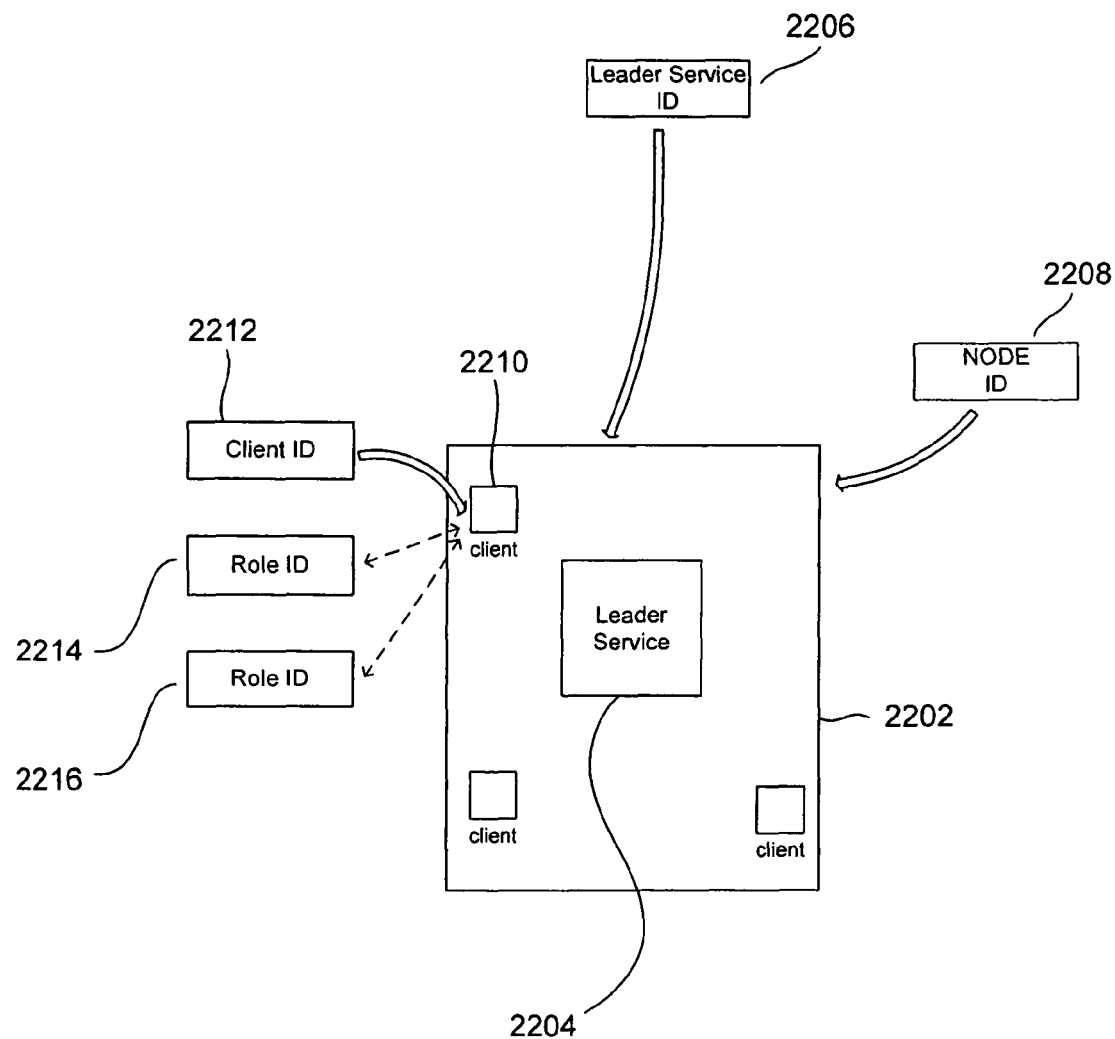
FIG. 22 illustrates the basic components of the leadership-election service that represents one embodiment of the present invention.

FIG. 22 illustrates the basic components of the leadership-election service that represents one embodiment of the present invention. As discussed above, each node 2202 includes a leader-election service 2204, in the described embodiment a continuously running process that services leader-election-service-related requests from client processes within the node and, in certain situations, receives and forwards requests forwarded to the leader-election service from leader-election-service processes in external nodes. A leader-election-service identifier ("ID") 2206 is associated with, and identifies, a leader-election-service process. Each node is identified by a node ID 2208. Each client process, such as client process 2210, is identified by a client ID 2212 and may currently be a leader for one or more roles identified by role IDs 2214 and 2216. In general, the leader-election service 2204 cooperates with leader-election-service processes in external nodes to distribute leadership for system-wide roles among client processes within the distributed computer system.

FIG. 23 illustrates a portion of the distributed state information maintained cooperatively by leader-election services within a distributed computer system according to one embodiment of the present invention. The distributed state information is shown as two relational-database tables, and relational-database tables are also used, below, to illustrate local state information locally maintained by each leader-election service within a node. In alternative embodiments, any number of different types of databases, file systems, or other information-storage systems and methods may be employed to store both global, distributed state information and local state information by leader-election services.

The information stored in the distributed state information maintained within the distributed computer system includes specific leadership allocations to client processes running on nodes within the distributed computer system. The specific leadership allocations are stored, in the described embodiment, in the table "Global Role Assignments" 2302. Each row in the table, such as row 2304, represents a particular leadership assignment. For example, row 2304 indicates that the role identified by the role ID "A" has been allocated to a process within the node identified by node ID "X." The leader-election-service process within node identified by node ID "X" is identified by the leader-election-service ID "PROC3204." The time which the leadership role was assumed by the current leader is represented by a large integer 2306. Thus, in the described embodiment, a leadership allocation is identified by a four-element tuple: {role ID, node ID, leader-election-service ID, time assumed}. In alternative embodiments, any number of different tuples with different element types having different element-type value ranges may be used to represent leadership-role allocations.

In certain embodiments, the distributed state information may include constant information, such as descriptions of the various roles within the distributed computer system stored in the table "Roles" 2310 shown in FIG. 23. In this table, each row, such as row 2312, represents each role that can be allocated to a client process within the distributed computer system as the association of a role ID with a role description. For example, in FIG. 23, the role identified by role ID "A" is described by the text string "software installation manager." Additional dynamic and constant information may be stored within the distributed state information managed by the leader-election services of a distributed computer system. Such additional state information may include information used for synchronizing role transfer between client processes and nodes, synchronization of request collection and request distribution on behalf of client leaders, and other such information.

Figure 24:
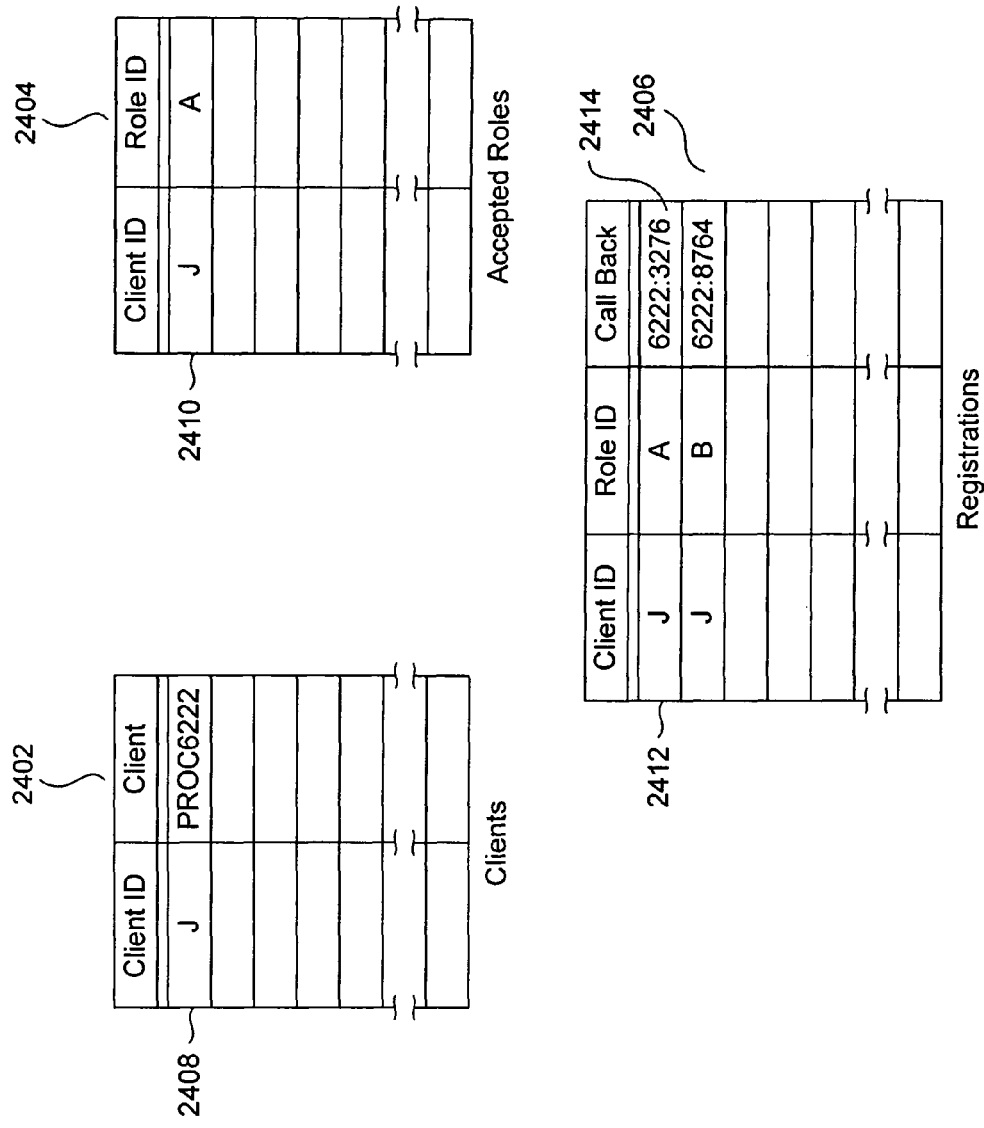
FIG. 24 illustrates the local state information maintained by the leader-election-service process within a node of a distributed computer system, according to one embodiment of the present invention.

FIG. 24 illustrates the local state information maintained by the leader-election-service process within a node of a distributed computer system, according to one embodiment of the present invention. In one embodiment, the information includes: (1) identifications of all client processes, currently running within a node, that are able to accept a leadership role, stored in the table "Clients" 2402; (2) indications of the roles currently allocated to each client, stored in the table "Accepted Roles" 2404; and (3) indications of the roles that each client process is willing to accept, stored in the table "Registrations" 2406. The table "Clients"

stores associations between client IDs and a process identifier identifying the client within a node. For example, in row 2408 in the table "Clients," the client process identified by client ID "J" corresponds to a process running within a node identified by the process number "PROC 6222." Row 2410 in the table "Accepted Roles" indicates that the client process identified by client ID "J" is currently the leader for the role identified by role ID "A." Row 2412 in table "Registrations" indicates that the client identified by client ID "J" registered a willingness to accept leadership of the role identified by role ID "A," and has furnished a callback routine identified by an alphanumeric string 2414 for receiving requests and callbacks from the leader-election service related to the client's willingness to accept the role.

Next, the distributed-leader-election service that represents one embodiment of the present invention is described in a series of control-flow diagrams representing the client/leader-election-service interface. These control-flow diagrams are divided into two parts: (1) a client portion, shown on the left side of the diagram; and (2) a leader-election-service portion, on the right side of the diagram. These control-flow diagrams cover the basic aspects of the client/leader-election-service interface, but, in most embodiments, additional types of interactions are generally provided for. Moreover, the leader-election-service processes in a distributed computer system interact, primarily through a distributed consensus service, such as Paxos, to provide a consistent allocation of leadership among client processes within the distributed computer system. Leader-election-service processes avail themselves of any of a number of different types of distributed system management systems in order to detect node and process failures within a distributed computer system in order to update the distributed state information and, in certain embodiments, to anticipate the need for electing new leaders for roles, the leaders for which are terminated or were running on nodes that failed. In alternative embodiments, node and process failure may be discovered by client processes, which can then use the client/leader-election service interface to restore leadership for roles abandoned due to process, node, or system-component failures on an as-detected-and-as-needed basis.

Figure 25:
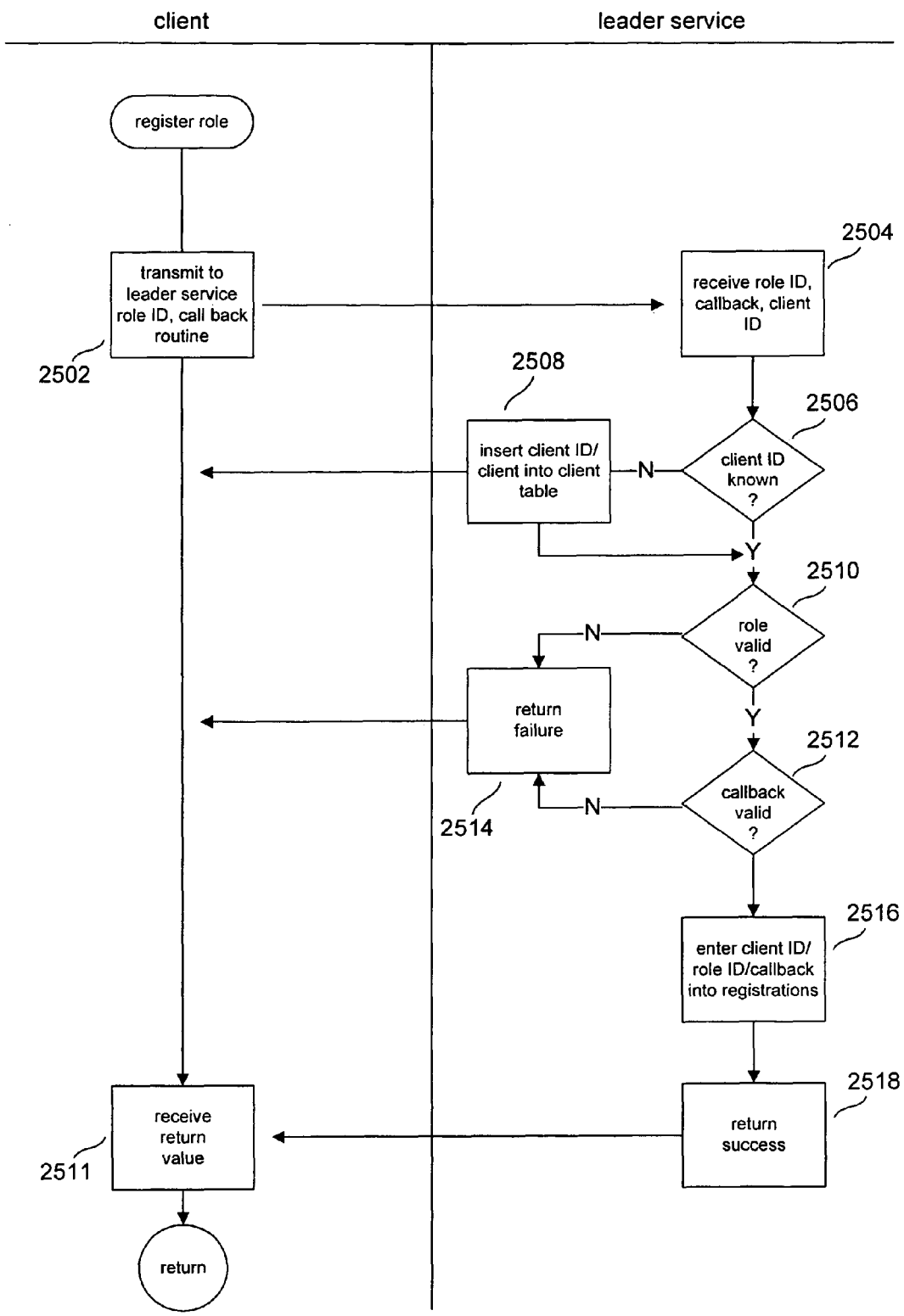
FIG. 25 is a control-flow diagram illustrating the client/leader-election-service-interface routine "Register."

FIG. 25 is a control-flow diagram illustrating the client/leader-election-service-interface routine "Register." In a first step 2502, the client transmits to the leader-election service a role ID for the role that the client is willing to accept leadership of as well as a callback routine by which the client can receive requests related to the role, once leadership of the role is allocated to the client, and by which the leader-election service can communicate with the client process with regard to the allocation of leadership for the role. The leader-election service receives the transmitted information 2504, including the client ID for the client that transmitted the message. In certain embodiments, the client ID is automatically transferred as part of the messaging system, while in alternative embodiments, the leader-election service uses information received from the messaging service to look up the client ID in the table "Clients" in the local state information maintained by the leader-election service. In still additional embodiments, the client ID may be explicitly furnished by the client. If the client ID is known to the leader-election service or, in other words, an entry for the client ID exists in the table "Clients," then the leader-election service can proceed to register the client for the particular role. Otherwise, in step 2508, the leader-election service inserts a client ID/client handle tuple into the table "Clients," in step 2508. If the role identified by the role ID transmitted by the client is valid, as determined in step 2510 by accessing the table "Roles" in the distributed state information, and if the callback routine furnished by the client is valid, as determined in step 2512, then registration proceeds. Otherwise, in step 2514, a failure is returned to the client. In step 2516, the leader-election service enters a new client ID/role ID/callback tuple into the table "Registrations" and then, in step 2518, returns a success status to the client. In step 2520, the client receives the return value from the leader-election service, and undertakes any additional processing based on that return value. Thus, successful execution of the register-role interface routine results in a new entry in the table "Registrations" (2406 in FIG. 24) indicating that the client is willing to accept a leadership role for the role identified by the role ID transmitted to the leader-election service by the client. In alternative embodiments, the client may specify multiple role IDs in a single call to the register-role routine. In yet additional embodiments, the client may additionally specify a length of time for which the client wishes to assume a role, specify various role-termination conditions, specify a time following which the client is willing to accept leadership roles, and other such parameters, constraints, and options.

Figure 26:
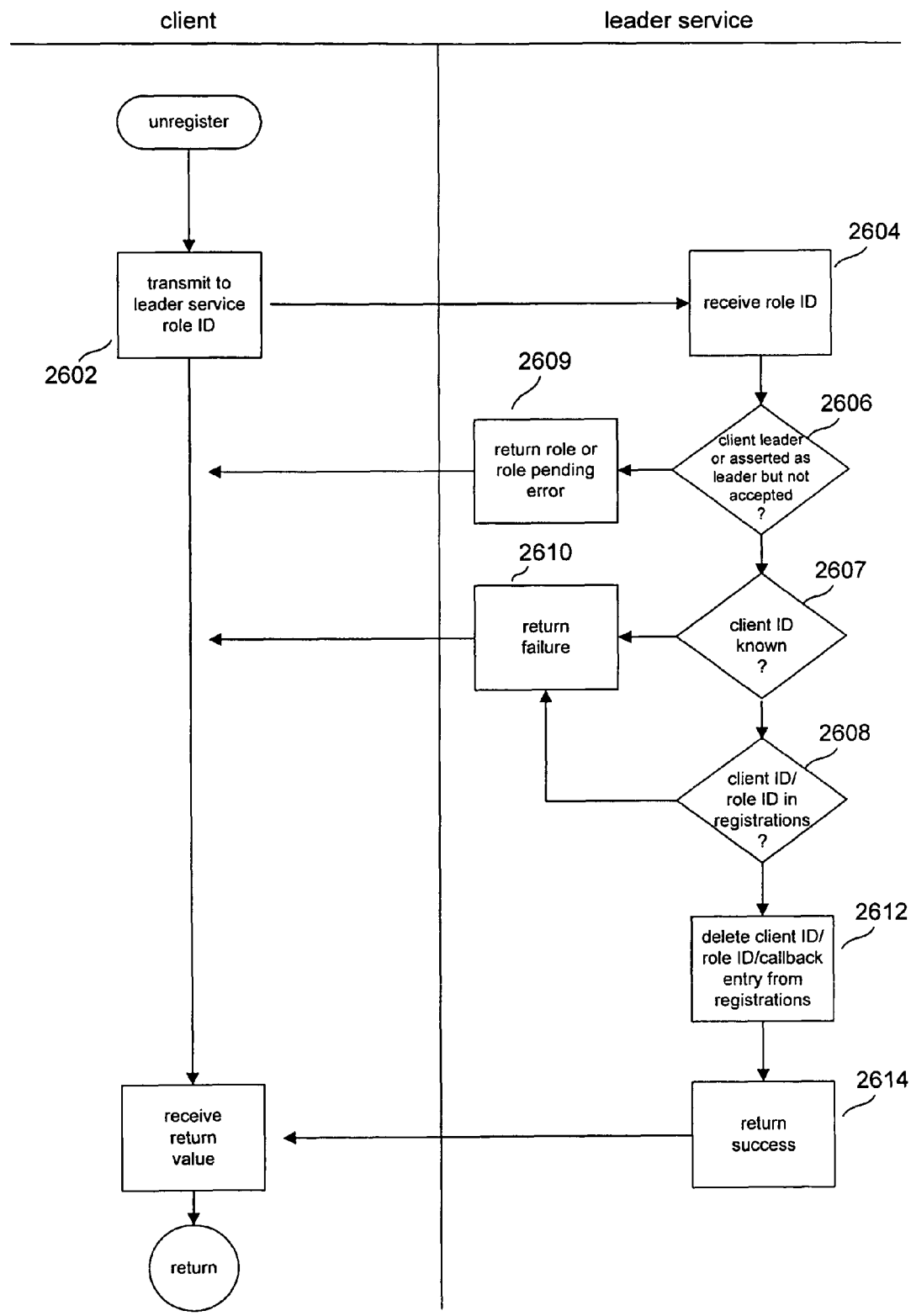
FIG. 26 is a control-flow diagram illustrating the client/leader-election-service-interface routine "Unregister."

FIG. 26 is a control-flow diagram illustrating the client/leader-election-service-interface routine "Unregister." This routine allows a client to indicate that the client is no longer willing to accept a leadership role with respect to a role identified by a role ID. In step 2602, the client sends the role ID to the leader-election service. The leader-election service receives the information, in step 2604, and then, in steps 2606-2610, and verifies that the unregister request is valid, returning a failure status or failure code when the request is not valid. When the request is valid, the leader-election service deletes the client ID/role ID/callback tuple corresponding to the unregister request from the table "Registrations" in step 2612 and returns a success status in step 2614. An unregister request may be invalid for a variety of reasons, including lack of an entry corresponding to the requesting client in the table "Clients" or lack of a corresponding entry in the table "Registrations." As determined in step 2606, when the leader-election service has asserted allocation to the client of leadership for the role identified by the supplied role ID, or the client is already allocated leadership for that role, then the leader-election service returns a failure status so that the client first relinquishes the leadership role or waits until the assertion has failed before unregistering with the leader-election service.

Figure 27:
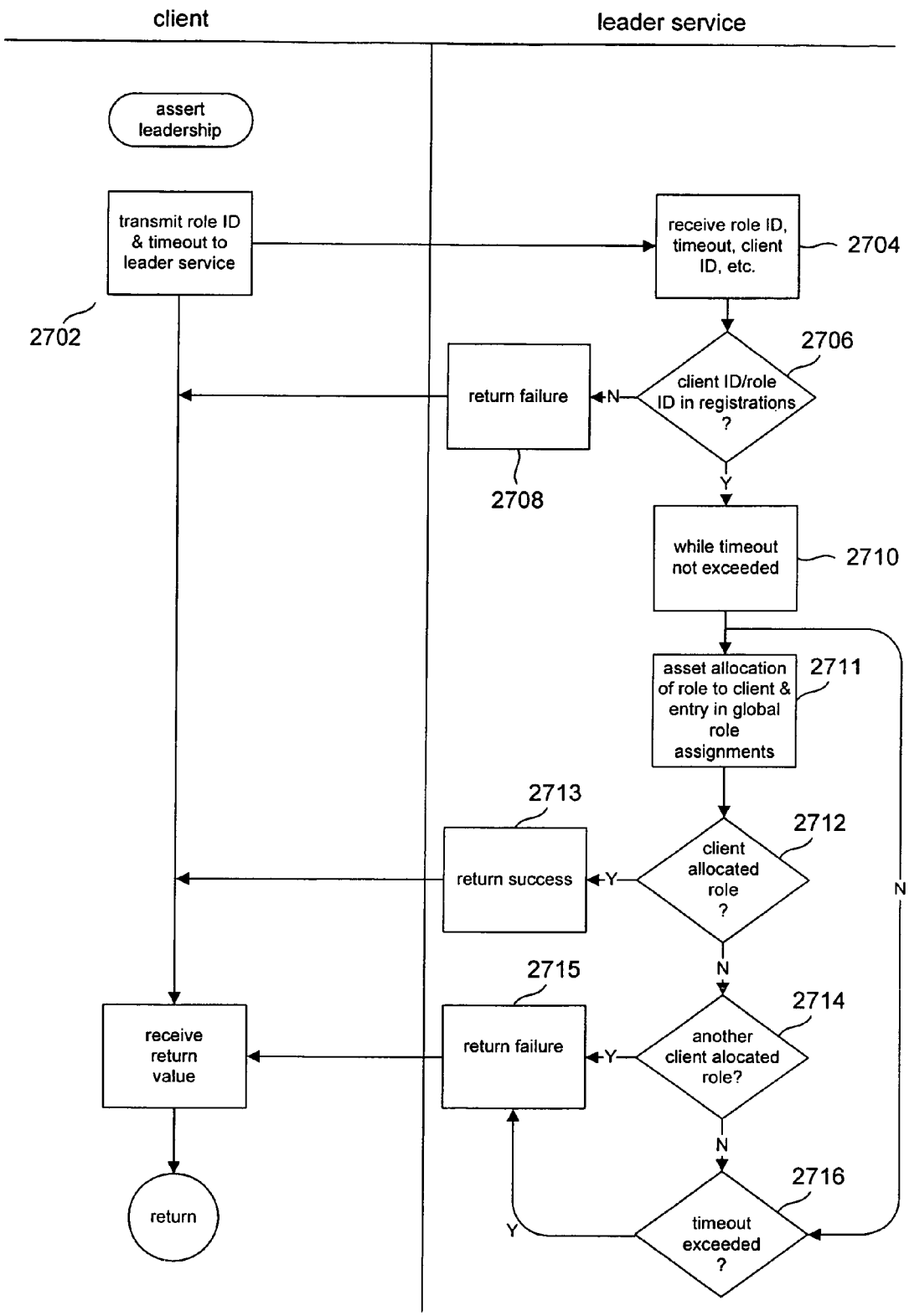
FIG. 27 is a control-flow diagram illustrating the client/leader election-service-interface routine "Assert Leadership."

FIG. 27 is a control-flow diagram illustrating the client/leader election-service-interface routine "Assert Leadership." In step 2702, the client transmits a role ID and timeout to the leader-election service. In step 2704, the leader-election service receives the transmitted role ID and timeout. The routine "Assert Leadership" allows a client to request leadership for a specified role, providing a timeout value indicating an amount of time for which the leader-election service should attempt to assert leadership of the specified role on behalf of the client before failing. If an entry for the client and specified role is not present in the table "Registrations" as detected in step 2706, then the leader-election service returns a failure in step 2708. Otherwise, in the while-loop of steps 2710-2716, the leader-election service continues to assert allocation of a leadership role for the specified role to the requesting client, in step 2711, until either the client is allocated the role, as determined in step 2712, and a success status is returned in step 2713, or until another client is allocated the role or the timeout period is exceeded, as determined in steps 2714 and 2716, in which case a failure status is returned in step 2715. The leader-election service asserts allocation of the leadership role to the client by attempting to add an entry to the table "Global Role Assignments." The attempt fails when an entry for the specified role already exists in the table "Global Role Assignments." The assertion is made through a distributed consensus service, such as Paxos or Disk Paxos, as discussed above in previous subsections.

Figure 28:
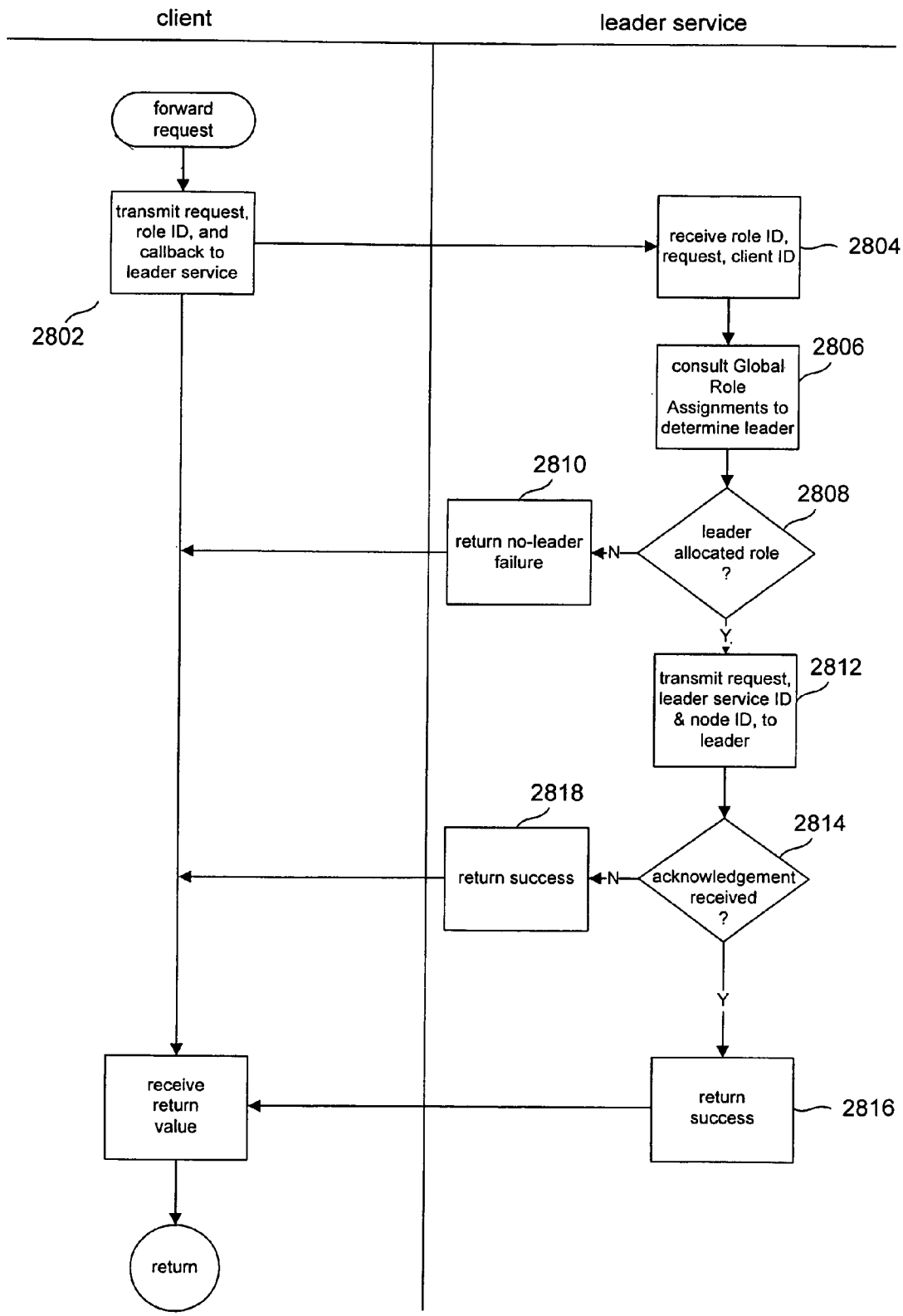
FIG. 28 is a control-flow diagram illustrating the client/leader-election-service-interface routine "Forward Request."

FIG. 28 is a control-flow diagram illustrating the client/leader-election-service-interface routine "Forward Request." This routine allows a client to forward a request or condition related to a particular role to the current leader for that role. In step 2802, the client forwards the request, a role ID, and a callback routine to the leader-election service. In step 2804, the leader-election service receives the transmitted information, and, in addition, the client ID of the requesting client, as discussed above. In step 2806, the leader-election service accesses the table "Global Role Assignments" to determine the process currently allocated leadership for the specified role. If no such leader can be found, as determined in step 2808, then failure is returned in step 2810. Otherwise, in step 2812, the leader-election service transmits the request, the leader-election-service ID for the leader-election service and a node ID to the leader-election service to which the leader process interfaces, in the case of a leader process executing on an eternal node, or transmits the request to a local client via the local client's callback routine, in the case that leadership for the specified role has been allocated to a local client. If the leader-election service receives an acknowledgement for the transmitted request, as determined in step 2814, then the leader-election service routine returns a success status, in step 2816. Otherwise, the leader-election service returns failure in step 2818. Once the request has been successfully forwarded to the process to which leadership for the role has been allocated, that process executes the request and, if necessary, communicates with the requesting client via the requesting client's call back furnished by the requesting client in step 2802. The details of request processing and communications between the leader process and the requesting client is beyond the scope of the current application, and is dependent on the specific type of role within a specific type of distributed computer system.

Figure 29:
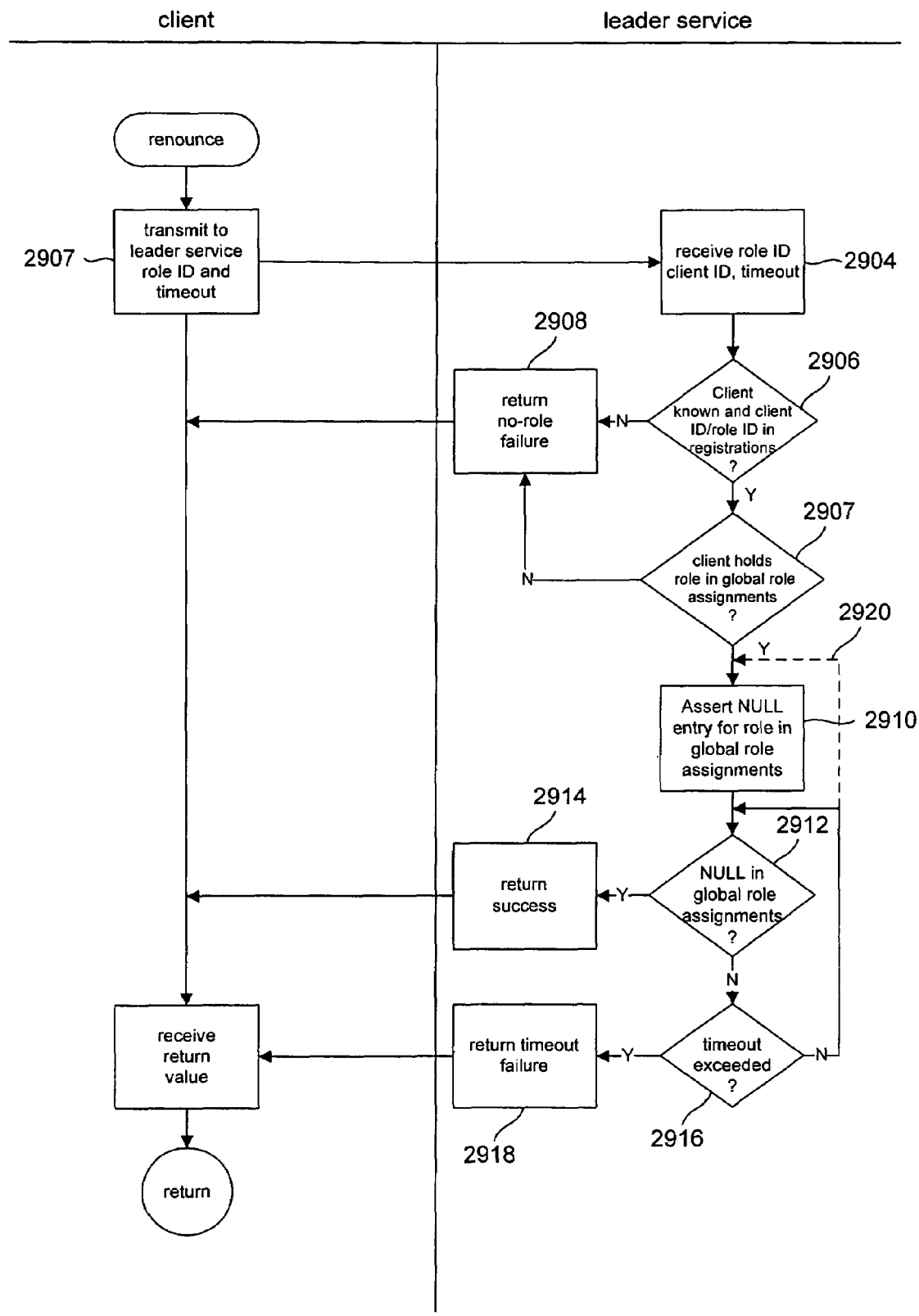
FIG. 29 is a control-flow diagram illustrating the client/leader-election-service-interface routine "Renounce."

FIG. 29 is a control-flow diagram illustrating the client/leader-election-service-interface routine "Renounce." This routine allows a client process to renounce a leadership role previously assumed by the client process. In step 2902, the client transmits to the leader-election service a role ID and timeout value. In step 2904, the leader-election service receives the transmitted role ID and timeout value. In steps 2906-2908, the leader-election service determines whether the renounce request is valid, returning a no-role failure status, in step 2908, when the client is unknown or has not been allocated leadership for the specified role. In step 2910, the leader-election service asserts a NULL entry for the role in the table "Global Role Assignments" via the distributed consensus service. In other words, the leader-election service attempts to delete the entry for the client ID/role ID in order to deallocate the leadership role. If the leader-election service is successful in deleting the role from the table "Global Role Assignments," as determined in step 2912, then a success status is returned in step 2914. Otherwise, the leader-election service continues to wait for indication of a successful assertion until the timeout is exceeded, as determined in step 2916, before returning a failure in step 2918. In certain embodiments, as represented by dashed line 2920, the leader-election service may need to continuously reassert deletion of the entry from the table "Global Role Assignments" until deletion occurs. Of course, a successful deletion followed by entry of a new leadership allocation by another leader-selection service may also need to be detected, and when detected, elicit return of a success status, in the case that a new entry can be added by the distributed consensus service prior to detection of successful deletion.

Figure 30:
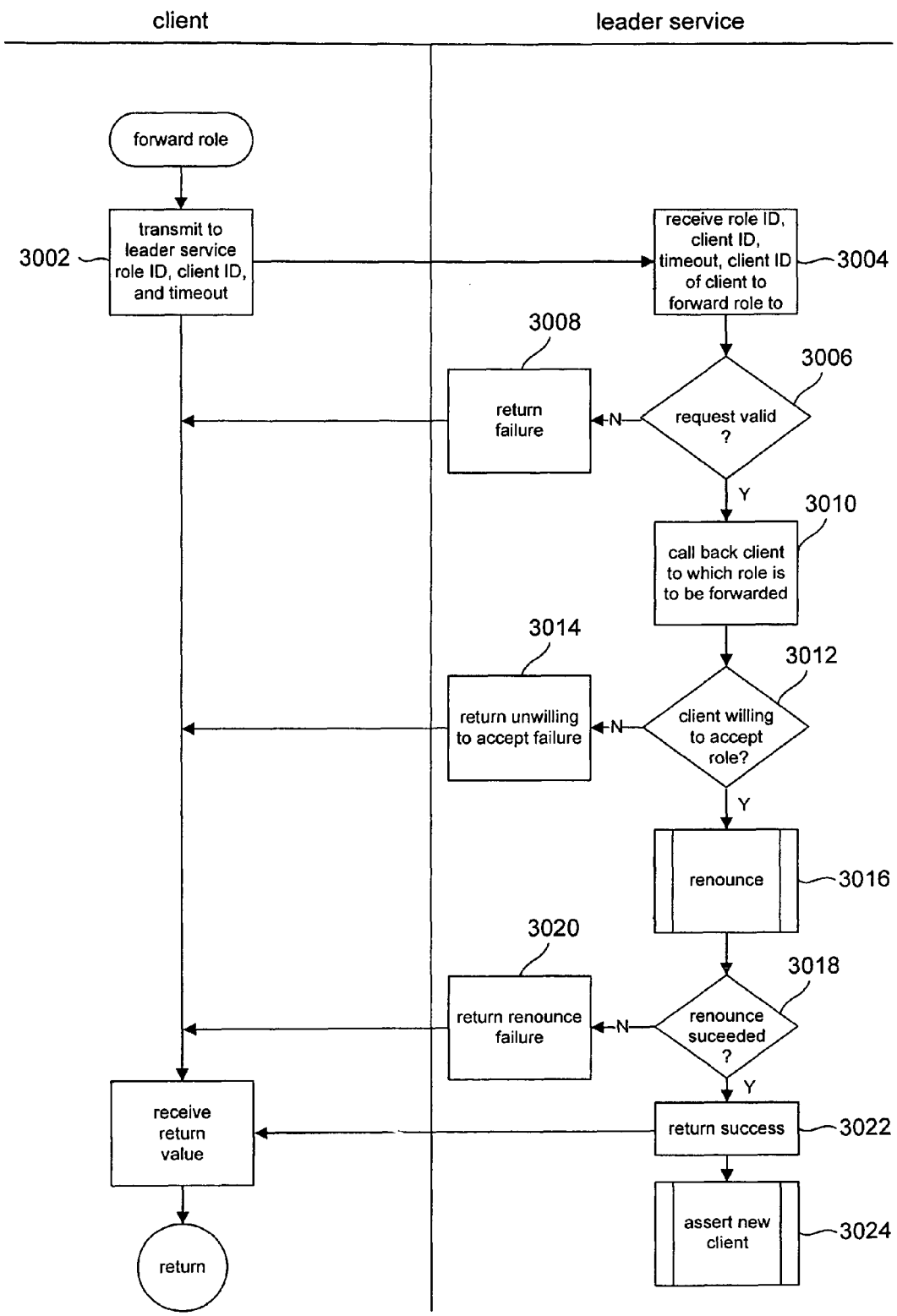
FIG. 30 is a control-flow diagram for the client/leader-election-service-interface routine "Forward Role."

FIG. 30 is a control-flow diagram for the client/leader-election-service-interface routine "Forward Role." The routine "forwardRole" allows a client to forward leadership of a role to another client. In various embodiments, the routine "Forward Role" may allow a client to forward a role to another client process within the same node, to a leader-election service running on an external node, or both. In step 3002, the client forwards a role ID, timeout value, and client ID or leader-election-service ID and node ID to the leader service. In step 3004, the leader service receives the transmitted information, as well as the ID of the client that transmitted the request. If the request is invalid, as determined in step 3006 in similar fashion to the more detailed request-validation diagrams described above, then the leader-election service returns failure in step 3008. Otherwise, in step 3010, the leader-election service calls a callback routine of the client to which the role is to be forwarded, if the specified client is local, or sends a request to the specified leader-election service, in those embodiments in which a role can be forwarded between nodes, to determine whether the client to which the role is being requested to be forwarded is willing to accept the role. When the client is not willing to accept leadership of the role, as determined in step 3012, then a failure status is returned in step 3014. Otherwise, in step 3016, the leader-election service executes a renounce request on behalf of the requesting client and, when the renounce request does not succeed, as determined in step 3018, returns a failure status to the requesting client in step 3020. Otherwise, in step 3022, the leader-election service returns success to the client and then carries out an assert-leadership request on behalf of the client to which the role is to be forwarded, in step 3024. In alternative embodiments, once a client has indicated a willingness to accept a role from another client, as detected in step 3012, then the leadership-accepting client issues an assert-leadership request to that client's local leader-election service.

Figure 31:
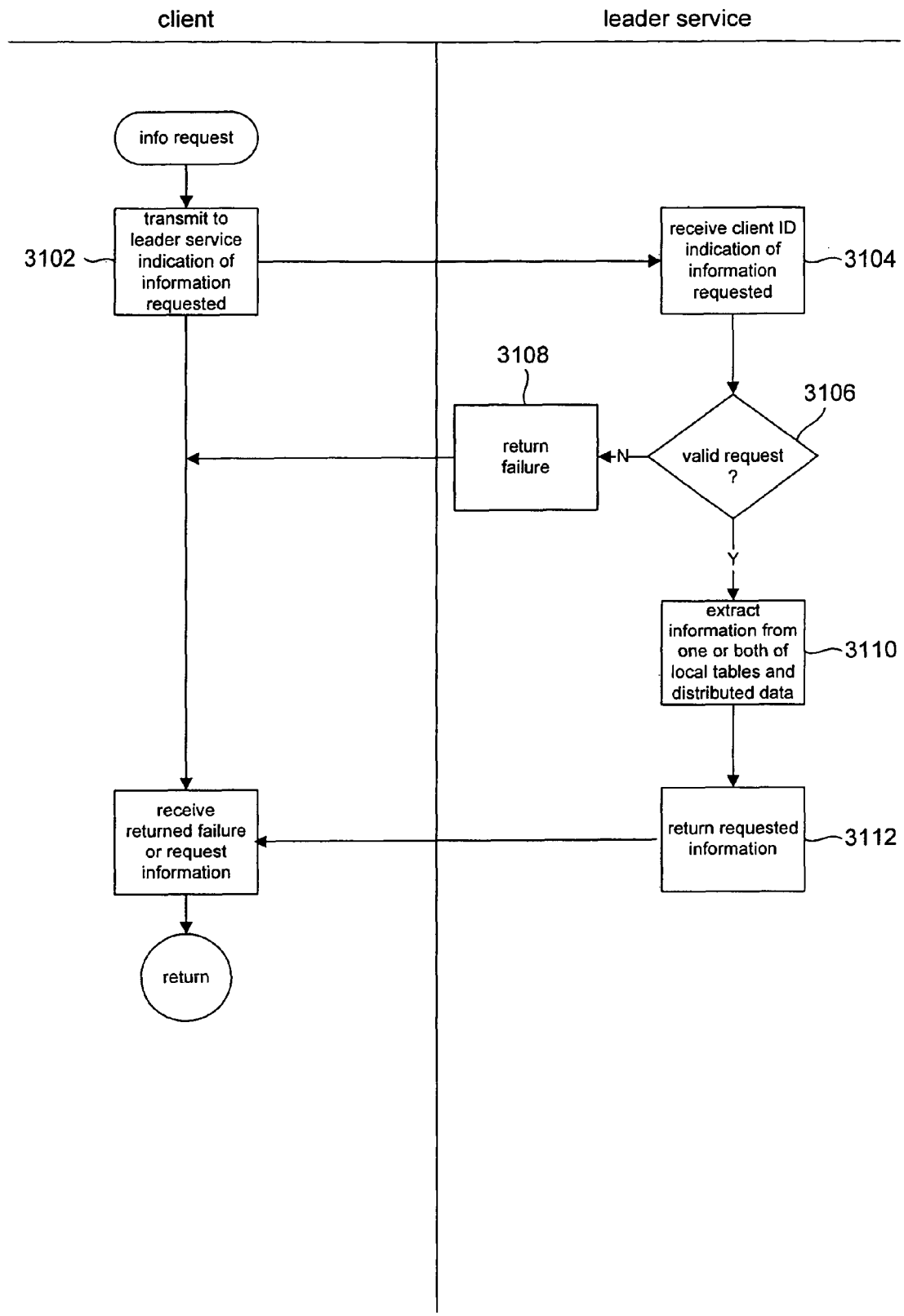
FIG. 31 is a control-flow diagram illustrating the client/leader-election-service-interface routine "Info Request."

FIG. 31 is a control-flow diagram illustrating the client/leader-election-service-interface routine "Info Request." This routine allows a client to obtain various types of information related to allocation of leadership roles within the distributed computer system. In step 3102, the client transmits to the leader-election service an indication of the information which the client wishes to receive. In step 3104, the leader-election service receives the indication of the information which the client wishes to receive. If the request is invalid, as determined in step 3106, then a failure status is returned in step 3108. Otherwise, in step 3110, the leader-election service extracts the desired information from one or both of the local state information and the global, distributed state information and returns the information to the client in step 3112. An information request may be invalid if the client is unknown to the leader-election service, if the information requested is privileged and inaccessible to the client, and for other reasons.

Figure 32:
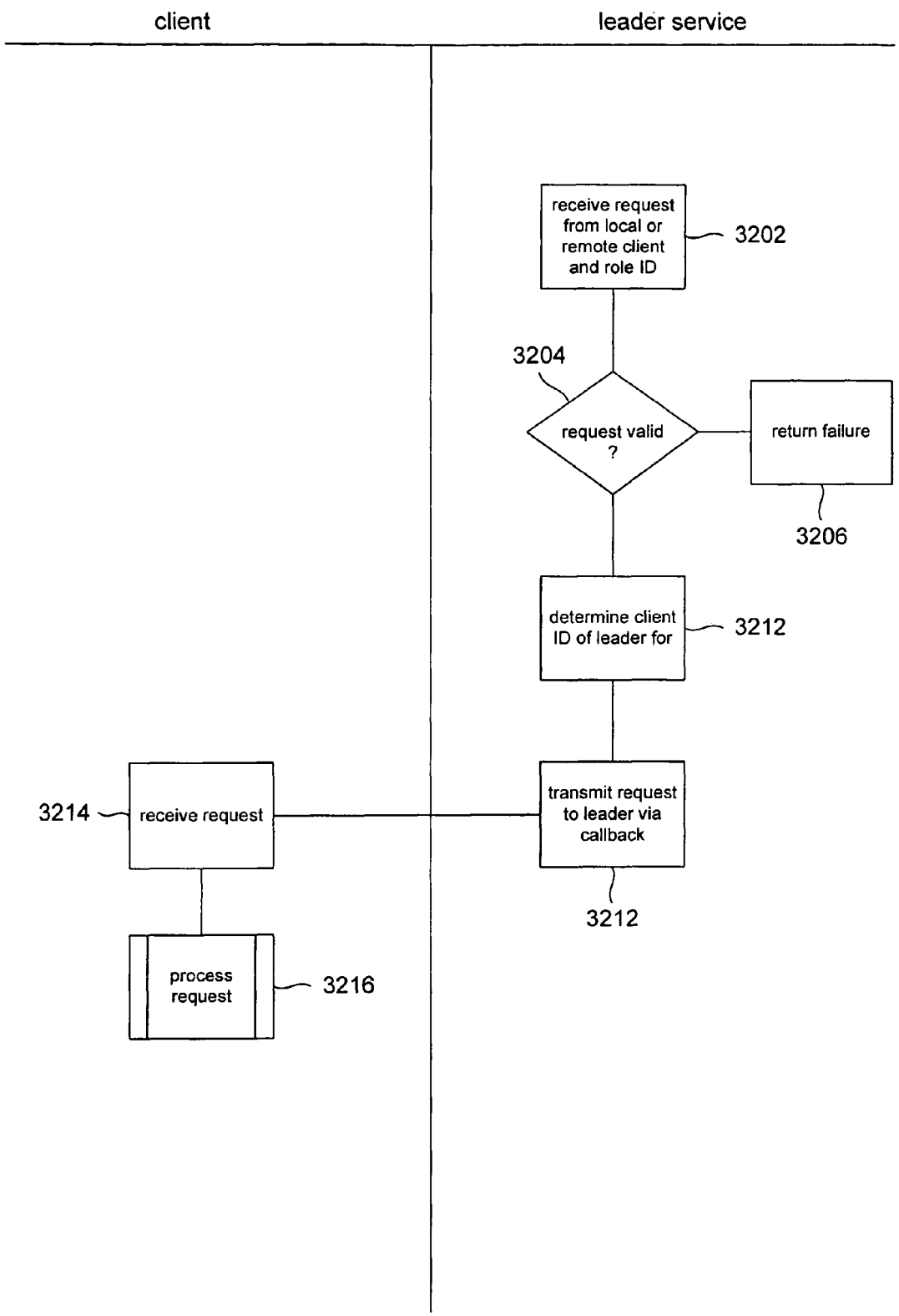
FIG. 32 is a control-flow diagram illustrating callback of a client by the leader-election service.

FIG. 32 is a control-flow diagram illustrating callback of a client by the leader-election service. FIG. 32 illustrates one particular type of callback, although the client processes and leader-election service employ callbacks for various types of communication between a leader-election service and the client processes, particularly in the case that the communication is asynchronous. In step 3202, the leader-election service receives a request from a local or remote client that is to be directed to the leader of the role related to the request. If the request is invalid, as determined in step 3204, then the leader-election service returns failure in step 3206. Otherwise, in step 3210, the leader-election service determines the client ID of the leader for the specified role. The leader-election service then transmits the request to the leader via the leader's previously submitted callback mechanism, in step 3212. The leader receives the request forwarded from the leader-election service, in step 3214, and processes the request in step 3216. Additional error checking may occur by the leader-election service. For example, leader-election service may check for an invalid request related to a role for which no leader is currently allocated.

Thus, the distributed-leader-election service that represents an embodiment of the present invention allows for allocation and distribution of leadership roles among processes running on nodes of a distributed computer system in a distributed, but relatively centralized manner. The leadership-election service avoids obligating each process to cooperate with all other processes within a distributed computer system to maintain distributed state information, and may lead to a vast economy of communications overhead, synchronization overhead, and other computational and time overheads associated with maintaining and managing a distributed-leader-election service.

Although the present invention has been described in terms of particular embodiments, it is not intended that the invention be limited to these embodiments. Modifications within the spirit of the invention will be apparent to those skilled in the art. For example, strong-leader-election functionality can be implemented in any number of different programming languages, using any number of different modularizations, routines, control structures, variables, data structures, and by varying other such programming parameters. As discussed above, the leader-election service may be implemented as a separate, continuously running process within each node of the distributed computer system, or may alternatively be implemented as library routines that run in the context of client processes. A distributed-leader-election service may employ any of a variety of different types of distributed consensus services, including Paxos, Disk Paxos, Active Disk Paxos, or a global data service such as the distributed storage register described above. The distributed-leader-election service may manage allocation of leadership roles for any of an essentially limitless number of types of roles that may be designated for distribution within a distributed computer system.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purpose of illustration and description. They are not intended to be exhaustive or to limit the invention to the precise forms disclosed. Obviously many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents:

The invention claimed is:

1. A distributed computer system comprising:
   multiple nodes;
   client processes running within the multiple nodes of the distributed computer system;
   multiple distributed-computer-system-wide roles for each of which leadership is assigned by a distributed leader-election service to a client process executing within a node of the distributed computer system, with at least two different client processes each assigned leadership for one of at least two different distributed-computer-system-wide roles, wherein at least one of at least two different distributed-computer-system-wide roles comprises a system management process that manages distributed state changes that apply to the entire distributed computer system; and
   a local leader-election service that operates as a local component of the distributed leader-election service in each node of the distributed computer system and provides a client/leader-election-service interface to client processes within the node through which each of multiple client processes executing within the node requests that the client process be assigned leadership of a distributed-computer-system-wide role;
   wherein, via the local leader-election service, two or more nodes issue a leadership request to the distributed leader-election service, wherein the leadership request is a request to be elected as the leader for a same role of the multiple distributed-computer-system-wide roles for a next lease period.

2. The distributed computer system of claim 1 wherein distributed-computer-system-wide roles correspond to tasks within the distributed computer system for which a single client process needs to allocated leadership, including:
   coordinator-type tasks in which a single client process needs to be responsible for distributed state changes related to distributed-system management;
   distributed-system-updating tasks, including installation of software or software updates on nodes within the distributed system;
   system-state-reporting tasks involving accessing and reporting the distributed state of the distributed computer system;
   scheduling tasks;
   distribution tasks;
   and control tasks.

3. The distributed computer system of claim 1 wherein the local leader-election service is one of:
   an independent process running on each node; and
   library routines that run in the context of one or more client-process threads within each node.

4. The distributed computer system of claim 1, wherein the distributed consensus service is one of:
   Paxos;
   Disk Paxos;
   Active-Disk Paxos; and
   a distributed-storage-register service.

5. The distributed computer system of claim 1, wherein the distributed consensus service employs a quorum-based consensus technique to manage distributed updates to distributed state information.

6. The distributed computer system of claim 1, wherein the local leader-election services within the nodes of the distributed computer system together manage distributed state information related to leadership allocations to client processes running within the distributed computer system, the distributed state information including role information and current leadership assignments.

7. The distributed computer system of claim 6 wherein each current leadership assignment is a logical tuple that includes a role identifier and a leader-election-service identifier.

8. The distributed computer system of claim 1, wherein the local leader-election service within each node of the distributed computer system manages local state information related to leadership allocations to client processes running within the node, the local state information including identifications of client processes running within the node that can accept leadership for roles, indications of the roles currently allocated to client processes running within the node, and indications of particular roles for which client processes can accept leadership.

9. The distributed computer system of claim 1, wherein the client/leader-election-service interface includes an interface routine that allows a client process to indicate to the client/leader-election service that the client process can accept leadership for a particular role, providing to the client/leader-election service a callback routine by which the client can receive requests related to the role, once leadership of the role is allocated to the client.

10. The distributed computer system of claim 1, wherein the client/leader-election-service interface includes an interface routine that allows a client process to indicate that the client process is no longer willing to accept a leadership role with respect to a particular role.

11. The distributed computer system of claim 1, wherein the client/leader-election-service interface includes an interface routine that allows a client process to request that leader-election service attempt to allocate leadership for a particular role to the client process.

12. The distributed computer system of claim 1, wherein the client/leader-election-service interface includes an interface routine that allows a client process to forward a request or condition related to a particular role to the current leader for that role.

13. The distributed computer system of claim 1, wherein the client/leader-election-service interface includes an interface routine that allows a client process to renounce a leadership role previously assumed by the client process.

14. The distributed computer system of claim 1, wherein the client/leader-election-service interface includes an interface routine that allows a client process to forward leadership of a role to another client.

15. The distributed computer system of claim 1, wherein the client/leader-election-service interface includes an interface routine that allows a client process to obtain information related to allocation of leadership roles within the distributed computer system.

16. The distributed computer system of claim 15, wherein the information obtained by the client process includes:
   indications of roles within the distributed computer system;
   indications of leadership allocation for each role in the distributed computer system; and
   indications of client processes that can accept leadership for particular roles.

17. The distributed computer system of claim 1, wherein the client/leader-election-service communicates with client processes via a callback routine provided to the client/leader-election service by the client process.

18. The distributed computer system of claim 1, wherein a leader client process for a particular role communicates with a client process that forwarded a request or condition related to the particular role via a callback routine provided to the client/leader-election service.

* * * * *